United States Patent
Koreeda et al.

(10) Patent No.: US 8,699,312 B2
(45) Date of Patent: *Apr. 15, 2014

(54) OPTICAL INFORMATION RECORDING/REPRODUCING APPARATUS AND OBJECTIVE OPTICAL SYSTEM FOR THE SAME

(71) Applicant: Hoya Corporation, Tokyo (JP)

(72) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,074

(22) Filed: Jul. 30, 2013

(65) Prior Publication Data

US 2013/0315047 A1 Nov. 28, 2013

Related U.S. Application Data

(63) Continuation of application No. 13/050,146, filed on Mar. 17, 2011, now Pat. No. 8,514,686.

(30) Foreign Application Priority Data

Mar. 19, 2010 (JP) ................................. 2010-064974

(51) Int. Cl.
*G11B 7/00* (2006.01)

(52) U.S. Cl.
USPC ............ 369/112.03; 369/112.23; 369/112.07; 369/112.11

(58) Field of Classification Search
USPC ............. 369/112.03, 112.01, 112.05, 112.12, 369/112.23, 112.04, 112.06, 112.07, 112.11
See application file for complete search history.

(56) References Cited

U.S. PATENT DOCUMENTS

| | | | | |
|---|---|---|---|---|
| 5,886,970 | A * | 3/1999 | Tachibana et al. | 369/112.07 |
| 6,043,912 | A * | 3/2000 | Yoo et al. | 359/19 |
| 6,118,594 | A * | 9/2000 | Maruyama | 359/719 |
| 6,992,838 | B2 * | 1/2006 | Park | 359/719 |
| 7,227,704 | B2 * | 6/2007 | Koike | 359/719 |
| 7,839,752 | B2 * | 11/2010 | Koreeda et al. | 369/112.08 |
| 8,514,686 | B2 * | 8/2013 | Koreeda et al. | 369/112.03 |
| 2002/0003767 | A1 * | 1/2002 | Ota et al. | 369/112.09 |
| 2002/0034010 | A1 * | 3/2002 | Maruyama | 359/566 |

(Continued)

FOREIGN PATENT DOCUMENTS

| | | |
|---|---|---|
| EP | 2043094 | 4/2009 |
| JP | 2004-247025 | 9/2004 |
| JP | 2006-164498 | 6/2006 |
| WO | 2008/007552 | 1/2008 |

*Primary Examiner* — Thomas Alunkal

(74) *Attorney, Agent, or Firm* — Greenblum & Bernstein, P.L.C.

(57) ABSTRACT

An objective optical system for information recording/reproducing, at least one of optical surfaces of the objective optical system comprising a diffraction surface including a first region contributing to converging first, second and third beams and including a diffraction structure formed such that use diffraction orders for the first, second and third beams are 1st-orders and a condition $0.03<(\lambda B_{11}-\lambda 1)/\lambda 1<0.40$ is satisfied; a second region contributing to converging only the first and second beams and including a diffraction structure formed such that the use diffraction orders are 1st-orders and a condition: $-0.35<(\lambda B_{12}-\lambda B_{11})/\lambda 1<0.35$ is satisfied; and a third region contributing to converging only the first beam and including a diffraction structure formed such that the use diffraction order for the first beam is an odd order and a condition: $-0.23<m_{13}((\lambda B_{13}-\lambda 1)/\lambda 1)<0.23$ is satisfied.

19 Claims, 23 Drawing Sheets

(56) References Cited

U.S. PATENT DOCUMENTS

| | | | |
|---|---|---|---|
| 2002/0037667 A1* | 3/2002 | Oguchi | 439/630 |
| 2003/0185134 A1* | 10/2003 | Kimura et al. | 369/112.08 |
| 2004/0047269 A1* | 3/2004 | Ikenaka et al. | 369/112.08 |
| 2005/0078593 A1* | 4/2005 | Maruyama et al. | 369/112.23 |
| 2005/0122882 A1 | 6/2005 | Kimura | |
| 2005/0180295 A1* | 8/2005 | Mimori | 369/112.07 |

* cited by examiner

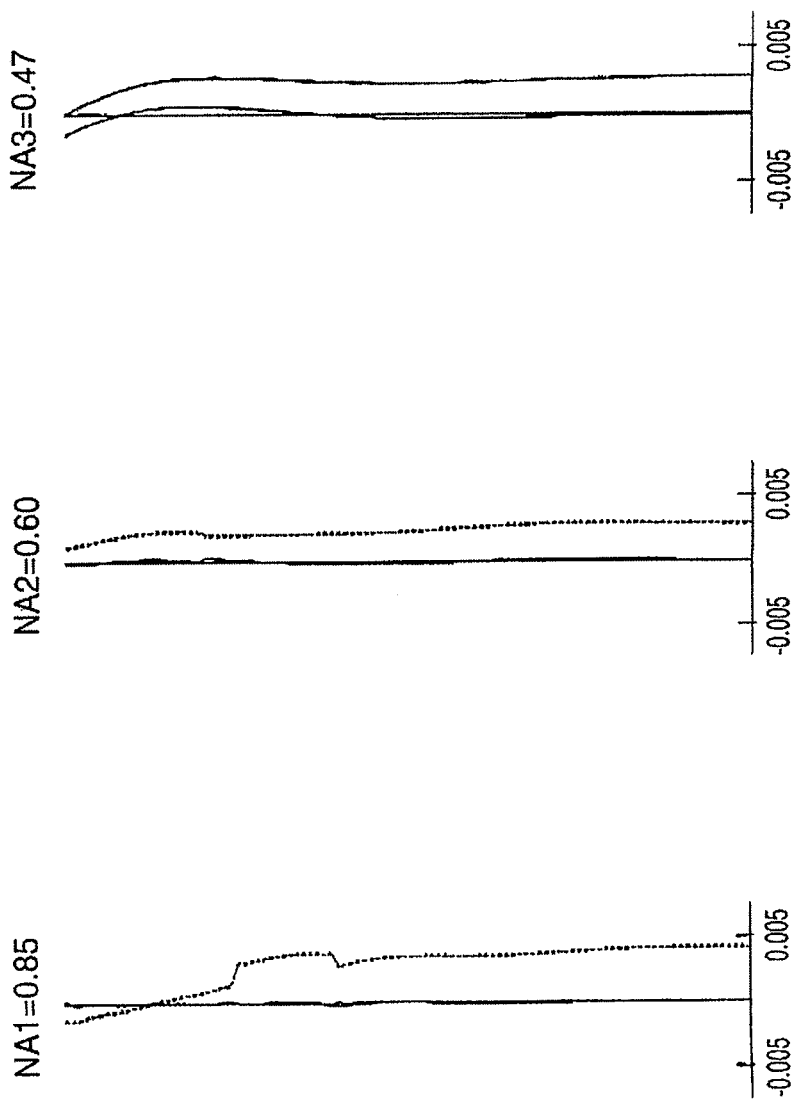

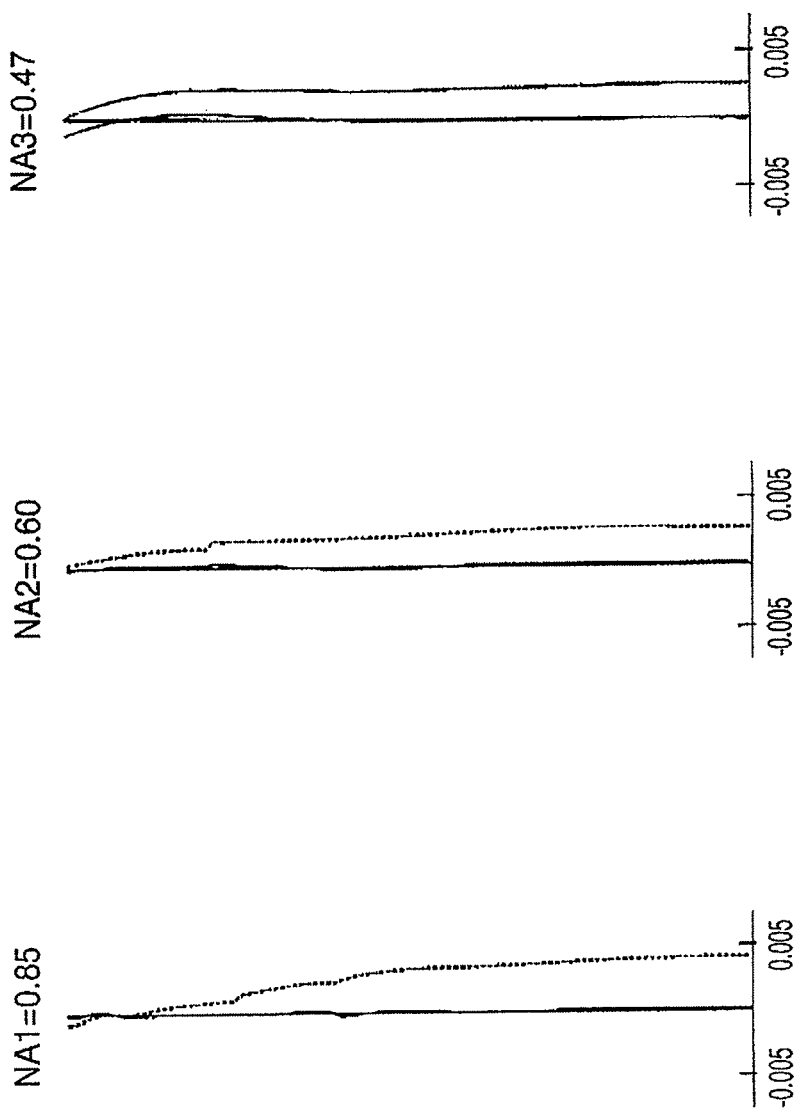

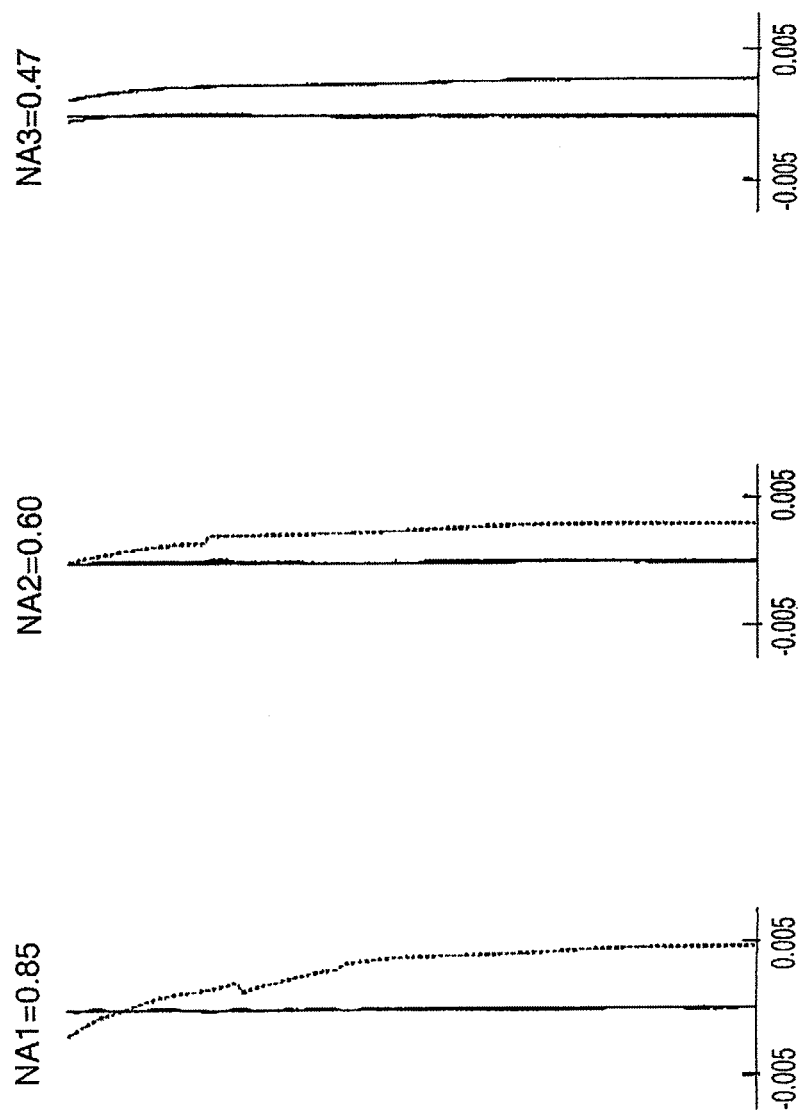

OPTICAL INFORMATION RECORDING/REPRODUCING APPARATUS AND OBJECTIVE OPTICAL SYSTEM FOR THE SAME

CROSS-REFERENCE TO RELATED APPLICATIONS

This application is a continuation of pending U.S. patent application Ser. No. 13/050,146, filed on Mar. 17, 2011, which claims priority to Japanese Application No. 2010-064974, filed on Mar. 19, 2010, the disclosures of which are expressly incorporated herein by reference in their entireties.

BACKGROUND OF THE INVENTION

The present invention relates to an objective optical system for an optical information recording/reproducing apparatus configured to suitably record information to and/or reproduce information from a plurality of types of optical discs based on different standards, and to an optical information recording/reproducing apparatus on which such an objective optical system is mounted.

There exist various standards of optical discs, such as DVD (Digital Versatile Disc) and BD (Blu-ray Disc), differing in recording density, protective layer thickness, etc. Therefore, an objective optical system mounted on the optical information recording/reproducing apparatus is required to have a compatibility with a plurality of types of optical discs. In this case, the term "compatibility" means to guarantee realizing information recording and information reproducing without the need for replacement of components even when the optical disc being used is changed. Incidentally, in this specification, the "optical information recording/reproducing apparatuses" include apparatuses for both information reproducing and information recording, apparatuses exclusively for information reproducing, and apparatuses exclusively for information recording.

In order to have the compatibility with the plurality of types of optical discs based on the different standards, it is necessary to correct the spherical aberration which changes depending on the difference in protective layer thickness (i.e., a distance between a recording surface and a surface of a protective layer on an optical disc) between the optical discs and to form a suitable beam spot in accordance with the difference in recording density between the optical discs by changing the numerical aperture NA for information recording or information reproducing. In general, an optical information recording/reproducing apparatus is configured to selectively use one of a plurality of laser beams having different wavelengths depending on the recording density of the optical disc being used. The optical information recording/reproducing apparatus uses, for example, light having the wavelength of approximately 790 nm (i.e., so-called near-infrared laser light) for information recording or information reproducing for CD, light having the wavelength of approximately 660 nm (i.e., so-called red laser light) for information recording or information reproducing for DVD and light having the wavelength of approximately 405 nm (i.e., so-called blue laser light) for information recording or information reproducing for BD.

Each of Japanese Patent Provisional Publication No. 2006-164498A (hereafter, referred to as JP2006-164498A) and Published International Patent Application WO2008/007552 discloses a concrete example of an optical information recording/reproducing apparatus having the compatibility with three types of optical discs.

The optical information recording/reproducing apparatus disclosed in JP2006-164498A has an objective optical system including an optical surface on which different diffraction structures are provided in respective regions so as to enhance the light use efficiency for each laser beam. The diffraction structures are formed such that the diffraction efficiency is low in an inner region and is high in an outer region. Therefore, a beam spot formed on a recording surface of an optical disc is reduced to a level considerably smaller than an expected size due to the super-resolution, and the side lobe increases. For this reason, there is a concern that the information recording or the information reproducing might not be suitably performed.

In the optical information recording/reproducing apparatus disclosed in WO2008/007552, the diffraction efficiency during use of the blue laser light is low in an inner region and is high in an outer region. Therefore, as in the case of JP2006-164498A, the spot size is reduced excessively and the side lobe increases. In this case, the information recording or the information reproducing for an optical disc can not be suitably performed.

SUMMARY OF THE INVENTION

The present invention is advantageous in that it provides an objective optical system configured to suitably record information to and/or reproduce information from a plurality of types of optical discs based on different standards, such as BD, DVD and CD, and an optical information recording/reproducing apparatus on which such an objective optical system is mounted.

According to an aspect of the invention, there is provided an objective optical system for an optical information recording/reproducing apparatus for recording information to and/or reproducing information from three types of optical discs including first, second and third optical discs differing in recording density by selectively using three types of light beams including first, second and third light beams respectively having first, second and third wavelengths. When $\lambda 1$ (unit: nm) represents the first wavelength, $\lambda 2$ (unit: nm) represents the second wavelength and $\lambda 3$ (unit: nm) represents the third wavelength, the first, second and third wavelengths satisfy a condition: $\lambda 1 < \lambda 2 < \lambda 3$. When t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfy conditions: $t1 < t2 < t3$; and $t3 \geq 1.0$. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfy a condition: $NA1 > NA2 > NA3$.

In this configuration, the objective optical system comprises an objective lens. At least one of optical surfaces of the objective optical system comprises a diffraction surface hav ing a diffraction structure defined by an optical path difference function:

$$\phi ik(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where h (unit: mm) represents a height from an optical axis, $P_{ik2}, P_{ik4}, P_{ik6} \ldots$ (i, k: natural numbers) represent optical path difference coefficients of $2^{nd}$ order, $4^{th}$ order, $6^{th}$ order, of an i-th optical path difference function in a k-th region, $m_{ik}$, represents a diffraction order at which diffraction efficiency is maximized for an incident light beam in regard to the i-th optical path difference function of the k-th region, and λ (unit: nm) represents a use wavelength of the incident light beam. The diffraction surface includes a first region contributing to converging the first, second and third light beams onto recording surfaces of the first, second and third optical discs, respectively. The first region includes a diffraction structure defined by a first optical path difference function defined such that diffraction orders at which diffraction efficiencies are maximized respectively for the first, second and third light beams are 1st-orders. When $\lambda B_{ik}$ represents a blazed wavelength of the i-th optical path difference function in the k-th region, the diffraction structure in the first region satisfies a condition: $0.03 < (\lambda B_{11} - \lambda 1)/\lambda 1 < 0.40 \ldots$ (1). The diffraction surface includes a second region located outside the first region, the second region contributing to converging the first and second light beams onto the recording surfaces of the first and second optical discs, respectively, and not contributing to converging of the third light beam. The second region comprises a diffraction structure defined by a first optical path difference function defined such that diffraction orders at which diffraction efficiencies are maximized respectively for the first and second light beams are 1st-orders. the diffraction structure in the second region satisfies a condition: $-0.35 < (\lambda B_{12} - \lambda B_{11})/\lambda 1 < 0.35 \ldots$ (2). The diffraction surface includes a third region located outside the second region, the third region contributing to converging the first light beam on to the recording surface of the first optical disc and not contributing to converging each of the second and third light beams. The third region comprises a diffraction structure defined by a first optical path difference function defined such that a diffraction order at which a diffraction efficiency is maximized for the first light beam is an odd order. The diffraction structure in the third region satisfies a condition: $-0.23 < m_{13} \times ((\lambda B_{13} - \lambda 1)/\lambda 1) < 0.23 \ldots$ (3).

Bt satisfying the above described conditions (use diffraction orders in the regions and the conditions (1) to (3)), the optical information recording/reproducing apparatus is able to obtain an adequate diffraction efficiency for information recording or information reproducing for each of the first to third optical discs, and to form a suitable beam spot on the recording surface of each of the first to third optical discs.

When the intermediate term of the condition (1) gets smaller than the lower limit of the condition (1), the diffraction efficiency defined when the third light beam having the wavelength λ3 is used becomes low. When the intermediate term of the condition (1) gets larger than the upper limit of the condition (1), the diffraction efficiency defined when the first light beam having the wavelength λ1 is used becomes low. If the diffraction efficiency is thus decreased, it becomes difficult to perform high speed recording or high speed reproducing. In order to compensate for the decrease of the diffraction efficiency, a designer might consider employing a light source of a high power output capability, which is disadvantageous in regard to cost. Furthermore, when the diffraction efficiency decreases, a problem arises that the S/N ratio of a signal, such as a reproduction signal, decreases.

When the intermediate term of the condition (2) gets smaller than the lower limit of the condition (2), a spot size formed on the recording surface of the second optical disc cannot not be reduced to a size suitable for information recording or information reproducing for the second optical disc. When the intermediate term of the condition (2) gets larger than the upper limit of the condition (2), the size of the beam spot formed on the recording surface of the second optical disc is reduced excessively by the effect of the super-resolution and in this case the side lobe increases.

When the intermediate term of the condition (3) gets smaller than the lower limit of the condition (3), the diffraction efficiency defined when the laser beam having the wavelength λ1 is used becomes low, and the undesired diffraction order light (e.g., 0-th order diffracted light) of each of the second and third light beams having the wavelengths λ2 and λ3 increases, which raises concerns that convergence of the light beam may be badly affected (i.e., a desired beam spot shape cannot be obtained). When the intermediate term of the condition (3) gets larger than the upper limit of the condition (3), the diffraction efficiency defined when the laser beam having the wavelength λ1 is used becomes low, and the undesired diffraction order light (e.g., the $1^{st}$-order diffracted light) of each of the second and third light beams having the wavelengths λ2 and λ3 increases, which raises concerns that convergence of the light beam may be badly affected.

In at least one aspect, the diffraction surface may satisfy a condition:

$$0.14 < (\lambda B_{11} - \lambda 1)/\lambda 1 < 0.37 \quad (4).$$

In this case, it is possible to further enhance the diffraction efficiency for the third light beam having the wavelength λ3 while further suppressing deterioration of the diffraction efficiency for the first light beam having the wavelength λ1.

In at least one aspect, the diffraction surface may satisfy a condition:

$$-0.14 < m_{13} \times ((\lambda B_{13} - \lambda 1)/\lambda 1) < 0.14 \quad (5).$$

In this case, it is possible to further enhance the diffraction efficiency for the first laser beam having the wavelength λ1.

In at least one aspect, the diffraction surface may satisfy a condition:

$$-0.17 < (\lambda B_{12} - \lambda B_{11})/\lambda 1 < 0.17 \quad (6).$$

In this case, it is possible to obtain the more suitable spot property for the second light beam having the wavelength λ2.

In at least one aspect, the first region of the diffraction surface may further comprise a diffraction structure defined by a second optical path difference function defined such that diffraction orders at which diffraction efficiencies are maximized for the first, second and third light beams are $2^{nd}$ order, $1^{st}$ order and $1^{st}$ order, respectively. In this case, the diffraction surface satisfies a condition:

$$-0.12 < (\lambda B_{21} - \lambda 1)/\lambda 1 < 0.12 \quad (7).$$

By satisfying the condition (7), it becomes possible to avoid deterioration of the diffraction efficiency for the first light beam having the wavelength λ1 more reliably. When the intermediate term of the condition (7) gets smaller than the lower limit of the condition (7), the diffraction efficiency for the first light beam having the wavelength λ1 becomes low. When the intermediate term of the condition (7) gets larger than the upper limit of the condition (7), the diffraction efficiency for each of the first and second light beams having the wavelengths λ1 and λ2 becomes low.

In view of easiness of manufacturing and suppressing of fluctuation of the diffraction efficiency caused by the wavelength variation, in at least one aspect, the diffraction surface may be configured such that in the diffraction structure defined by the first optical path difference function in the third region, a diffraction order at which a diffraction efficiency is maximized for the first light beam is a $1^{st}$ order.

In at least one aspect, the second region of the diffraction surface may further comprise a diffraction structure defined by a second optical path difference function defined such that a diffraction order at which a diffraction efficiency is maximized for the first light beam is an odd order. In this case, the diffraction surface satisfies a condition (8):

$$-0.28 < m_{22} \times ((\lambda B_{22} - \lambda 1)/\lambda 1) < 0.28 \qquad (8).$$

By satisfying the condition (8), it becomes possible to avoid deterioration of the diffraction efficiency for each of the first and second light beams having the wavelengths $\lambda 1$ and $\lambda 2$. When the intermediate term of the condition (8) falls outside the range defined by the condition (8), the diffraction efficiency for the first light beam having the wavelength $\lambda 1$ becomes low, which is undesirable.

In view of easiness of manufacturing and suppressing of fluctuation of the diffraction efficiency caused by the wavelength variation, the diffraction surface may be configured such that in the diffraction structure defined by the second optical path difference function in the second region, a diffraction order at which a diffraction efficiency is maximized for the first light beam is one of $3^{rd}$ order, $5^{th}$-order and $7^{th}$ order. It is possible to achieve an adequate diffraction efficiency and a spot property for each of the first and second optical discs, by satisfying the following condition (9) when the diffraction order at which a diffraction efficiency is maximized for the first light beam is $3^{rd}$ order, by satisfying the following condition (10) when the diffraction order at which a diffraction efficiency is maximized for the first light beam is $5^{th}$ order, or by satisfying the following condition (11) when the diffraction order at which a diffraction efficiency is maximized for the first light beam is $7^{th}$ order.

$$-0.02 < (\lambda B_{22} - \lambda 1)/\lambda 1 < 0.08 \qquad (9)$$

$$0.05 < (\lambda B_{22} - \lambda 1)/\lambda 1 < 0.05 \qquad (10)$$

$$-0.03 < (\lambda B_{22} - \lambda 1)/\lambda 1 < 0.02 \qquad (11)$$

According to another aspect of the invention, there is provided an objective optical system for an optical information recording/reproducing apparatus for recording information to and/or reproducing information from three types of optical discs including first, second and third optical discs differing in recording density by selectively using three types of light beams including first, second and third light beams respectively having first, second and third wavelengths. When $\lambda 1$ (unit: nm) represents the first wavelength, $\lambda 2$ (unit: nm) represents the second wavelength and $\lambda 3$ (unit: nm) represents the third wavelength, the first, second and third wavelengths satisfy a condition: $\lambda 1 < \lambda 2 < \lambda 3$. When t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfy conditions: t1<t2<t3; and t3-t1≤1.0. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition: NA1>NA2>NA3.

In this configuration, the objective optical system comprises an objective lens. At least one of optical surfaces of the objective optical system is formed to be a phase shift surface having a phase shift structure configured to have a plurality of concentrically divided refractive surface zones and to give different optical path length differences to an incident light beam at boundaries of adjacent ones of the plurality of refractive surface zones. The phase shift surface includes a first region contributing to converging the first, second and third light beams onto recording surfaces of the first, second and third optical discs, respectively. The first region comprises a phase shift structure having a first step satisfying a condition: $1.03 < |\Delta PD_{11}/\lambda 1| < 1.50$ ... (12) where $\Delta OPD_{ik}$ represents an optical path length difference given by an i-th step in a k-th region. The phase shift structure includes a second region outside the first region, the second region contributing to converging the first and second light beams onto the recording surfaces of the first and second optical discs, respectively, and not contributing to converging the third light beam. The second region comprises a phase shift structure having a first step satisfying a condition: $-0.38 < |\Delta OPD_{12}/\lambda 1| - |\Delta OPD_{11}/\lambda 1| < 0.33$ ... (13). The phase shift structure includes a third region outside the second region, the third region contributing to converging the first light beam onto the recording surface of the first optical disc and not contributing to converging each of the second and third light beams. The third region comprises a phase shift structure having a first step satisfying a condition: $2L+0.75 < |\Delta OPD_{13}/\lambda 1| < 2L+1.25$ ... (14) where L is an integer.

By satisfying the conditions (12) to (14), the optical information recording/reproducing apparatus is able to obtain an adequate diffraction efficiency for information recording or information reproducing for each of the first to third optical discs, and to form a suitable beam spot on the recording surface of each of the first to third optical discs.

When the intermediate term of the condition (12) gets smaller than the lower limit of the condition (12), the light use efficiency for the third light beam having the wavelength $\lambda 3$ becomes low, which is undesirable. When the intermediate term of the condition (12) gets larger than the upper limit of the condition (12), the light use efficiency for the first light beam having the wavelength $\lambda 1$ becomes low, which is undesirable. Specifically, since the light use efficiency is low, it becomes difficult to perform high speed recording or high speed reproducing. In order to compensate for the decrease of the light use efficiency, it is necessary to employ a light source of a high power output capability, which is disadvantageous in regard to cost. Furthermore, due to increase of the undesired diffraction order light caused by decrease of the light use efficiency, a problem arises that the S/N ratio of a signal, such as a reproduction signal, decrease.

When the intermediate term of the condition (13) gets smaller than the lower limit of the condition (13), the size of the beam spot formed on the second optical disc cannot be reduced to an appropriate size for suitably performing the information recording or information reproducing. When the intermediate term of the condition (13) gets larger than the upper limit of the condition (13), the spot size of the beam spot formed in the recording surface of the third optical disc is reduced excessively by the effect of the super resolution, and the side lobe increases.

In at least one aspect, the phase shift surface may satisfy a condition (15):

$$1.16 < |\Delta OPD_{11}/\lambda 1| < 1.40 \tag{15}$$

In this case, it is possible to more appropriately suppress decrease of the light use efficiency of the first light beam having the wavelength λ1 and to more appropriately secure the light use efficiency for the third light beam having the wavelength λ3.

In at least one aspect, the phase shift surface may satisfy a condition (16):

$$2L + 0.82 < |\Delta OPD_{13}/\lambda 1| < 2L + 1.18 \tag{16}$$

where L is an integer.

In this case, it is possible to more appropriately secure the light use efficiency for the first light beam having the wavelength λ1.

In at least one aspect, the phase shift surface may satisfy a condition (17):

$$-0.19 < |\Delta OPD_{12}/\lambda 1| - |\Delta OPD_{11}/\lambda 1| < 0.19 \tag{17}$$

In this case, it is possible to obtain an suitable spot property particularly for the second light beam having the wavelength λ2.

In at least one aspect, the first region of the phase shift surface may further comprise a phase shift structure having a second step. In this case, the phase shift surface satisfies a condition:

$$1.75 < |\Delta OPD_{21}/\lambda 1| < 2.25 \tag{18}$$

By satisfying the condition (18), it becomes possible to avoid more reliably decrease of the light use efficiency for the first light beam having the wavelength λ1. When the intermediate term of the condition (18) falls outside of the range defined by the condition (18), the light use efficiency for the first light beam having the wavelength λ1 decreases, which is undesirable.

In view of easiness of manufacturing and suppressing of fluctuation of the diffraction efficiency caused by the wavelength variation, in at least one aspect, the phase shift surface may satisfy a condition (19):

$$0.83 < |\Delta OPD_{13}/\lambda 1| < 1.17 \tag{19}$$

In at least one aspect, the second region of the phase shift surface may further comprise a phase shift structure having a second step. In this case, the phase shift surface satisfies a condition (20):

$$2L + 0.68 < |\Delta OPD_{22}/\lambda 1| < 2L + 1.32 \tag{20}$$

where L is an integer.

By satisfying the condition (20), it becomes possible to avoid more reliably decrease of the light use efficiency for each of the first and second light beams having the wavelengths λ1 and λ2. When the intermediate term of the condition (20) falls outside of the range defined by the condition (20), the light use efficiency for the first light beam having the wavelength λ1 decreases, which is undesirable.

In view of easiness of manufacturing and suppressing of fluctuation of the diffraction efficiency caused by the wavelength variation, and further in view of obtaining an adequate light use efficiency and an adequate spot property when each of the first and second optical discs, the phase shift surface may satisfy one of the following conditions (21) to (23):

$$2.94 < |\Delta OPD_{22}/\lambda 1| < 3.27 \tag{21}$$

$$4.73 < |\Delta OPD_{22}/\lambda 1| < 5.27 \tag{22; and}$$

$$6.75 < |OPD_{22}/\lambda 1| < 7.17 \tag{23}$$

The objective optical system may comprise an optical element provided separately from the objective lens. In this case, at least one of surfaces of the optical element has the diffraction surface or the phase shift surface.

In the objective optical system, at least one of surfaces of the objective lens may have the diffraction surface or the phase shift surface.

The objective optical system satisfy a condition:

$$35 \leq vd \leq 80 \tag{24}$$

where vd represents Abbe number of the objective lens at d-line.

According to another aspect of the invention, there is provided an optical information recording/reproducing apparatus for recording information to and/or reproducing information from three types of optical discs including first, second and third optical discs differing in recording density by selectively using three types of light beams including first, second and third light beams respectively having first, second and third wavelengths. When λ1 (unit: nm) represents the first wavelength, λ2 (unit: nm) represents the second wavelength and λ3 (unit: nm) represents the third wavelength, the first, second and third wavelengths satisfy a condition: λ1<λ2<λ3. When t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfy conditions: t1≈0.1; t2≈0.6; and t3≈1.2. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfy a condition: NA1>NA2>NA3.

In this configuration, the optical information recording/reproducing apparatus comprises light sources respectively emitting the first second and third light beams, at least one coupling lens converting a degree of divergence or convergence of each of the first, second and third light beams, and one of the above described objective optical systems. When n1 and n3 respectively represent refractive indexes of the objective lens with respect to the first and third wavelengths, the optical information recording/reproducing apparatus satisfies a condition (25):

$$0.4 < (\lambda 1/(n3-1))/(\lambda 3/(n1-1)) < 0.6 \tag{25}$$

BRIEF DESCRIPTION OF THE ACCOMPANYING DRAWINGS

FIG. 1 is a block diagram generally illustrating a configuration of an optical information recording/reproducing apparatus according to an embodiment of the invention.

FIGS. 2A and 2B generally illustrate a configuration of an objective lens according to the embodiment of the invention.

FIGS. 22A to 22C are graphs illustrating the spherical aberration caused in the first or second example.

FIGS. 23A to 23C are graphs illustrating the spherical aberration caused in the third example.

FIGS. 24A to 24C are graphs illustrating the spherical aberration caused in the fourth example.

DETAILED DESCRIPTION OF THE EMBODIMENTS

Figure 1:
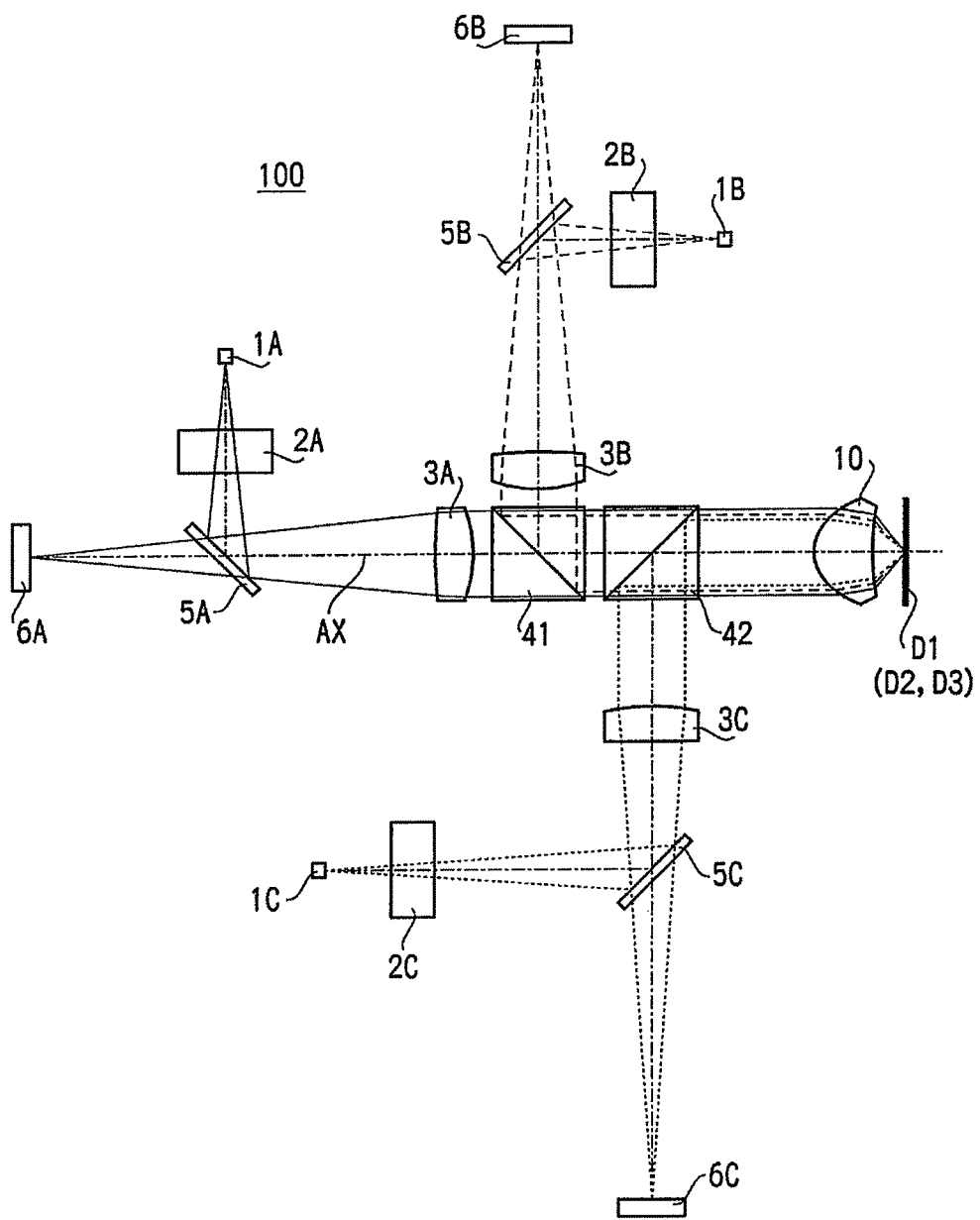

Hereinafter, an embodiment according to the invention is described with reference to the accompanying drawings. An optical information recording/reproducing apparatus 100 (see FIG. 1) according to the embodiment is configured to have the compatibility with three types of optical discs differing in protective layer thickness, recording density and etc. In the following, of the three types of optical discs, a high-recording density optical disc (e.g. BD) is referred to as an optical disc D1, an optical disc (e.g., DVD and DVD-R) having the recording density lower than that of BD is referred to as an optical disc D2, and an optical disc (e.g., CD) having a lower recording density than DVD is referred to as an optical disc D3.

When the protective layer thicknesses of the optical discs D1, D2 and D3 are defined as t1, t2 and t3 (unit: mm) respectively, the following relationship holds.

$t1 < t2 < t3$ $t3 - t1 \geq 1.0$ $t1 \approx 0.1$ $t3 \approx 1.2$

When information recording or information reproducing is performed for the optical discs D1 to D3, it is required to change the numerical aperture NA so that a suitable beam spot can be formed depending on the difference in recording density between the optical discs D1 to D3. When the optimal design numerical apertures required for information recording or information reproducing for the optical discs D1, D2 and D3 are defined as NA1, NA2 and NA3, respectively, the following relationship holds.

$NA1 > NA2 > NA3$

That is, when the optical disc D1 having the highest recording density is used, it is required to form a beam spot smaller than beam spots for the optical discs D2 and D3, and therefore the largest NA is required for the optical disc D1. On the other hand, when the optical disc D3 having the lowest recording density is used, a beam spot larger than beam spots for the optical discs D1 and D2 is required, and therefore the smallest NA is required for the optical disc D3.

For information recording or information reproducing for the optical discs D1 to D3 differing in recording density, laser beams having different wavelengths are used in the optical information recording/reproducing apparatus 100 so that suitable beam spots respectively corresponding to the different recording densities of the optical discs D1 to D3 can be obtained. Specifically, when the optical disc D1 is used, a laser beam (first laser beam) having a wavelength $\lambda 1$ (unit: nm) is emitted from a light source to form a smallest beam spot on a recording surface of the optical disc D1. When the optical disc D2 is used, a laser beam (second laser beam) having a wavelength $\lambda 2$ (unit: mm) longer than the wavelength $\lambda 1$ is emitted from a light source to form a beam spot larger than that for the optical disc D1 can be formed on a recording surface of the optical disc D2. When the optical disc D3 is used, a laser beam (third laser beam) having a wavelength $\lambda 3$ (unit: nm) longer than the wavelength $\lambda 2$ is emitted from a light source so that a beam spot larger than that for the optical disc D2 can be formed on a recording surface of the optical disc D3. That is, regarding the wavelengths $\lambda 1$, $\lambda 2$ and $\lambda 3$, the following relationship holds.

$\lambda 1 < \lambda 2 < \lambda 3$

FIG. 1 is a block diagram generally illustrating a configuration of the optical information recording/reproducing apparatus 100 according to the embodiment. The optical information recording/reproducing apparatus 100 includes a light source 1A which emits a laser beam having the wavelength $\lambda 1$, a light source 1B which emits a laser beam having the wavelength $\lambda 2$, a light source 1C which emits a laser beam having the wavelength $\lambda 3$, diffraction gratings 2A-2C, coupling lenses 3A-3C, beam splitters 41 and 42, half mirrors 5A-5C, photoreceptors 6A-6C and an objective lens 10. In FIG. 1, a chain line represents a reference axis AX of the optical information recording/reproducing apparatus 100. The laser beams indicated by a solid line, a dashed line and a dotted line respectively represent the laser beams having the wavelengths λ1, λ2 and λ3. In a normal state, an optical axis of the objective lens 10 coincides with the reference axis AX. However, there is a case where the optical axis of the objective lens 10 shifts from the reference axis by a tracking operation where the objective lens 10 is moved in a radial direction of an optical disc by a tracking mechanism.

As described above, in the optical information recording/reproducing apparatus 100, required NAs for the optical discs D1-D3 are different from each other. Therefore, the optical information recording/reproducing apparatus 100 may be provided with aperture stops (not shown) respectively limiting the beam diameters of the laser beams having the wavelengths of λ1, λ2 and λ3.

When the optical disc D1 is used, the laser beam having the wavelength λ1 is emitted from the light source 1A. When the optical disc D2 is used, the laser beam having the wavelength λ2 is emitted from the light source 1B. When the optical disc D3 is used, the laser beam having the wavelength λ3 is emitted from the light source 1C. The laser beams having the wavelengths λ1, λ2 and λ3 respectively pass through the diffraction gratings 2A, 2B and 2C, and thereafter optical paths of the laser beams having the wavelengths λ1, λ2 and λ3 are bent by the half mirrors 5A, 5B and 5C, respectively. Then, the laser beams having the wavelengths λ1, λ2 and λ3 are incident on the coupling lenses 3A, 3B and 3C, respectively. Each of the coupling lenses 3A-3C converts the laser beam incident thereon into a collimated beam. The laser beams (collimated beams) having the wavelengths λ1 and λ2 are incident on the objective lens 10 via the beam splitters 41 and 42, and the laser beam (collimated beam) having the wavelength λ3 is incident on the objective lens 10 via the beam splitter 42. The objective lens 10 converges the collimated laser beams having the wavelengths λ1, λ2 and λ3 at positions in the vicinities of the recording surfaces of the optical discs D1 to D3, respectively. The converged laser beams form beam spots on the recording surfaces of the optical discs D1 to D3, respectively. The laser beams respectively reflecting from the optical discs D1 to D3 return along the same optical paths along which the laser beams respectively proceed to the optical discs D1 to D3, and are respectively detected by the photoreceptors 6A to 6C after passing through the half mirrors 5A to 5C. Each of the photoreceptors 6A to 6C outputs a detection signal to a signal processing circuit (not shown). The signal processing circuit processes the outputs of the photoreceptors 6A to 6C to detect a focus error signal, a tracking error signal and a reproduction signal of information recorded on each optical disc.

As described above, each of the laser beams emerging from the coupling lenses 3A to 3C is a collimated laser beam. That is, each of the coupling lenses 3A to 3C functions as a collimator lens. By thus configuring the optical information recording/reproducing apparatus 100 such that a collimated beam is incident on the objective lens 10, no off-axis aberration (e.g., a coma) is caused even when the objective lens 10 is shifted by the tracking operation. However, the embodiment of the invention is not limited to such a configuration. For example, a configuration (i.e., a finite optical system) where a diverging beam having a low degree of divergence is incident on the optical disc D3 may be employed. By employing such a finite optical system, it becomes possible to easily secure an adequate working distance while correcting the spherical aberration which remains during use of the optical disc D3.

Incidentally, when laser beams having wavelengths different from each other are used for the optical discs D1 to D3, respectively, the relative spherical aberration is caused depending on the difference in refractive index of the objective lens 10 or the difference in protective layer thickness between the optical discs D1-D3. In order to configure the optical information recording/reproducing apparatus 100 to have the compatibility with the optical discs D1-D3, it is required to suitably correct the spherical aberration of such a type. It is also required to form a beam spot having a suitable spot size corresponding the recording density (a pit size) of each optical disc while suppressing the side lobe so that an S/N ratio of the reproduction signal can be enhanced. In order to satisfy such requirements, the objective lens 10 according to the embodiment is configured as follows.

Figures 2A, 2B:
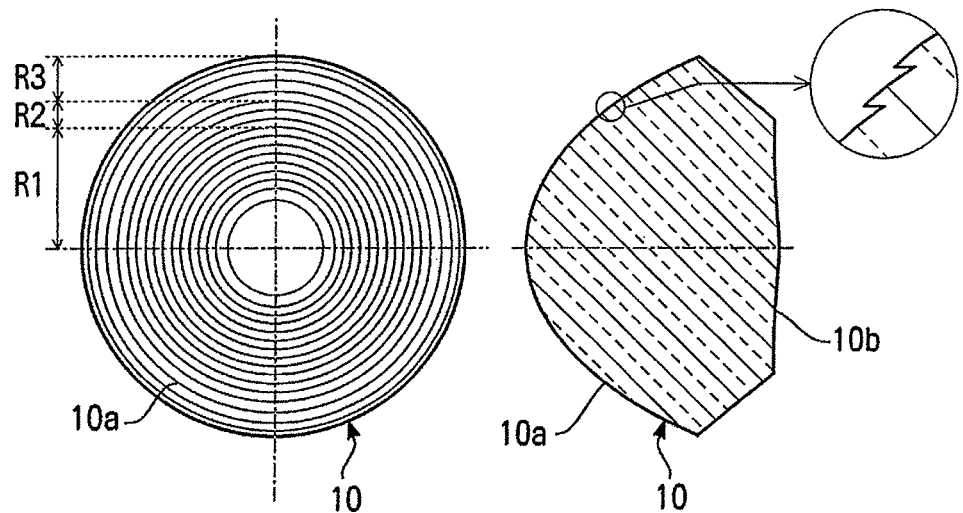
Figure 3A:
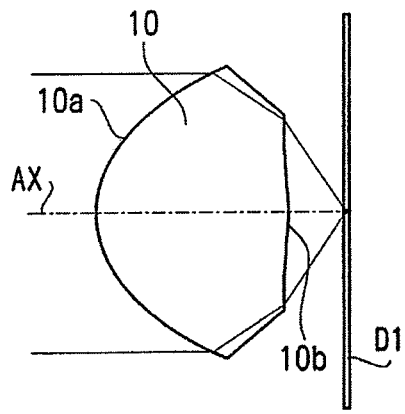
FIGS. 3A to 3C illustrate cross sections of the objective lens respectively defined for first to third optical discs (D1 to D3) based on different standards.
Figure 3B:
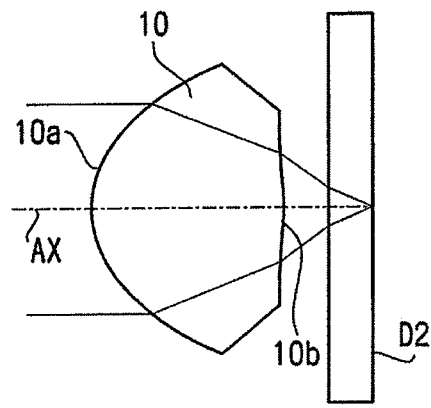
Figure 3C:
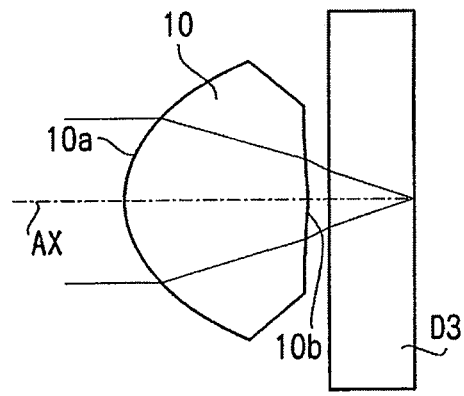

FIG. 2A is a front view of the objective lens 10, and FIG. 2B s a side cross section of the objective lens 10. FIG. 3A illustrates a cross section of the objective lens 10 in a situation where the optical disc D1 is used, FIG. 3B illustrates a cross section of the objective lens 10 in a situation where the optical disc D2 is used, and FIG. 3C illustrates a cross section of the objective lens 10 in a situation where the optical disc D3 is used. As described above, the objective lens 10 is mounted on the optical head of the optical information recording/reproducing apparatus 100 having the compatibility with a plurality of types of optical discs based different standards (i.e., the optical discs D1 to D3), and the objective lens 10 has the function of converging each of the laser beams having different wavelengths emitted from semiconductor lasers (the light sources 1A to 1C) onto the recording surface of each optical disc.

The objective lens 10 is a biconvex single element lens made of resin, and has a first surface 10a facing the beam splitter 42 and a second surface 10b facing the optical disc. Each of the first and second surfaces 10a and 10b of the objective lens 10 is an aspherical surface. A shape of an aspherical surface is expressed by a following equation:

$$SAG = \frac{\frac{h^2}{r}}{1 + \sqrt{1-(1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), κ is a conical coefficient, and $A_4, A_6, \ldots$ represent aspherical coefficients larger than or equal to the fourth order. By forming each surface of the objective lens 10 as an aspherical surface, it becomes possible to appropriately control the aberrations (e.g., the spherical aberration and the coma).

As shown in FIG. 2A, the first surface 10a of the objective lens 10 includes a circular first region R1 whose center coincides with the position of the optical axis, a ring-shaped second region R2 located outside the first region R1, and a ring-shaped third region R3 located outside the second region R2. Effective radiuses of the first, second and third regions R1, R2 and R3 are determined based on NA3, NA2 and NA1, respectively. In the entire region including the first, second and third regions R1, R2 and R3, an annular zone structure is formed. As shown in FIG. 2A and a circled enlarged illustration in FIG. 2B, the annular zone structure includes a plurality of refractive surface zones (annular zones) which are concentrically formed about the optical axis, and minute steps each of which is formed between adjacent ones of the plurality of refractive surface zones to extend in parallel with the optical axis of the objective lens 10. In this embodiment, the annular zone structure is formed on the first surface 10a of the objective lens 10. However, in another embodiment, the annular zone structure may be provided only on the second surface 10b of the objective lens 10, or may be provided separately on both of the first and second surfaces 10a and 10b of the objective lens 10.

By providing the annular zone structure on the first surface 10a (not on the second surface 10b) of the objective lens 10, the following advantages can be achieved. For example, it becomes possible to increase the minimum annular zone width of the annular zone structure. In this case, loss of light amount by each step portion formed between adjacent ones of the annular zones can be suppressed. Furthermore, even when the objective lens 10 is brushed with a lens cleaner, the objective lens 10 is not worn.

Figure 26:
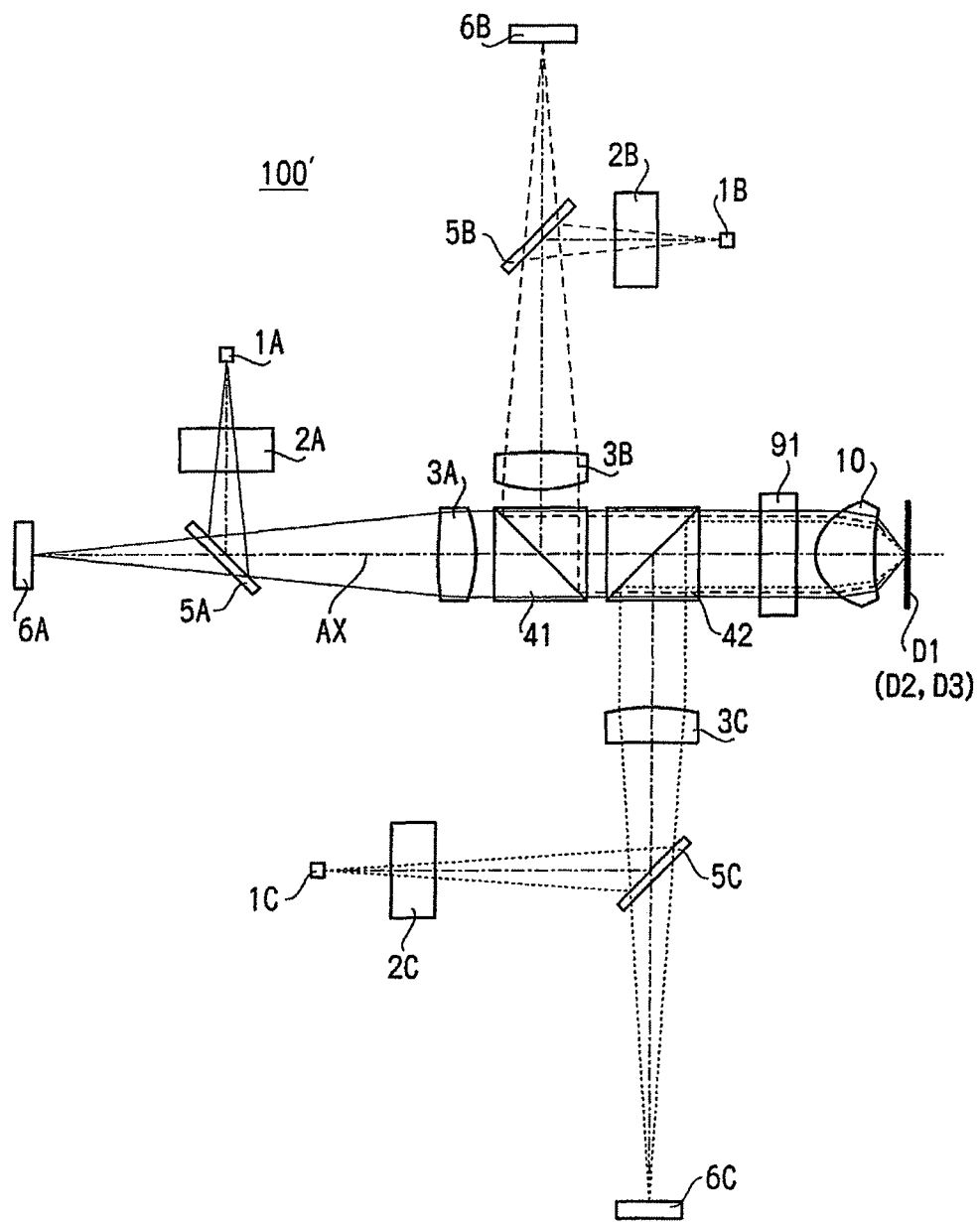
FIG. 26 illustrates a variation of the optical information recording/reproducing apparatus.

The annular zone structure may be provided on another optical element (see an optical element 91 in FIG. 26 which illustrates a variation of the apparatus 100) provided separately from the objective lens 10. As shown in FIG. 26, the optical element 91 having the annular zone structure may be arranged between the objective lens 10 and the beam splitter 42. In this case, the annular zone structure may be provided on at least one of surfaces of the separate optical element 91 or may be provided separately on both of the surfaces of the optical element 91. However, considering the case where the aberrations are caused when optical axes of the optical element 91 and the objective lens 10 shift with respect to each other, it is preferable to arrange the optical element 91 to shift together with the objective lens 10.

Each step of the annular zone structure is formed to cause a predetermined optical path length difference between a light beam passing through the inside of a boundary (step) between adjacent ones of the annular zones and a light beam passing through the outside of the boundary. In general, such an annular zone structure can be expressed as a diffraction structure. The annular zone structure formed such that the predetermined optical path length difference is n-times (n: integer) as large as a particular wavelength a can be expressed as an n-th order diffraction structure having the blazed wavelength a. A diffraction order of diffracted light, at which the diffraction efficiency is maximized when a light beam having a particular wavelength $\lambda\beta$ passes through the diffraction structure, can be obtained as an integer m which is closest to a value defined by dividing an optical path length difference given to the light beam having the wavelength $\lambda\beta$ by the wavelength $\lambda\beta$.

In addition, the fact that an optical path length difference is caused between a light beam passing through the inside of a boundary formed between adjacent ones of the annular (refractive) zones and a light beam passing through the outside of the boundary can be considered as a phenomenon that phases of the light beams are shifted with respect to each other by the effect of each step of the annular zone structure. Therefore, the annular zone structure can be expressed as a structure for shifting phases of incident light beams (i.e., a phase shift structure).

The annular zone structure can be expressed by an i-th optical path difference function $\phi ik(h)$ in a k-th region. In this case, each of k and i is a natural number. The optical path difference function $\phi ik(h)$ is a function representing the functional capability of the objective lens 10 (a diffraction lens) in a form of an additional optical path length at the height h from the optical axis of the objective lens 10, and defines the position of each step of the annular zone structure. The optical path difference function $\phi ik(h)$ can be expressed by a following equation:

$$\phi ik(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where $P_{ik2}$, $P_{ik4}$, $P_{ik6}$ . . . (i: natural number) represent coefficients of the $2^{nd}$ order, $4^{th}$ order, $6^{th}$ order, of the i-th optical path difference function in the k-th region, h (unit: mm) represents a height from the optical axis, $m_{ik}$ represents a diffraction order at which the diffraction efficiency is maximized for an incident light beam in regard to the i-th optical path difference function of the k-th region, and $\lambda$ (unit: mu) represents a design wavelength of a laser beam being used.

In addition to defining the shape of the annular zone structure by a single type of optical path difference function, the shape of the annular zone structure may be defined by combining a plurality of types of optical path difference functions (e.g., two types of optical path difference functions including a first optical path difference function and a second optical path difference function). By combining a plurality of types of optical path difference functions, it becomes possible to configure the annular zone structure to give different optical path length differences to the incident light beam. As a result, multiple optical effects can be given to the incident light beam. Hereafter, diffraction structures defined by first, second, optical path difference functions are referred to as first, second . . . diffraction structures, respectively.

From the viewpoint of merely achieving the advantages of the present invention, configuring the annular zone structure in each region to be a diffraction structure defined by a single type of optical path difference function is sufficient, and it is not necessarily required to configure the annular zone structure in each region to be a diffraction structure defined by a plurality of types of optical path difference functions. However, the larger the number of optical path difference functions to be combined, the more sophisticated the optical function of the diffraction structure becomes. Therefore, it becomes possible to achieve the advantages of the present invention more suitably by combining more than one optical path difference functions. For example, in the case where the annular zone structure in the region R1 is defined by a single type of optical path difference function, the spherical aberration remains if a substantially collimated light beam is incident on the objective lens 10 during use of the optical disc D3. In order to correct such a remaining spherical aberration, in general an optical system is designed so that a diverging light beam having a low degree of divergence is incident on the objective lens 10 during use of the optical disc D3. However, in such a case, off-axis aberrations may be caused when the objective lens 10 is shifted for the tracking operation. In view of such circumstances, the diffraction structure in the region R1 according to the embodiment is configured to have a shape defined by a plurality of types of optical path difference functions. Therefore, it is possible to correct the spherical aberration while employing the configuration where a substantially collimated light beam is incident on the objective lens 10 during use of the optical disc D3.

The annular zone structure in the region R1 contributes to convergence of each of the laser beams having the wavelengths $\lambda 1$, $\lambda 2$ and $\lambda 3$. That is, the annular zone structure in the region R1 is configured to converge the laser beam having the wavelength $\lambda 1$ onto the recording surface of the optical disc D1, to converge the laser beam having the wavelength λ2 onto the recording surface of the optical disc D2, and to converge the laser beam having the wavelength λ3 onto the recording surface of the optical disc D3. In the following, the diffraction orders at which the diffraction efficiencies are maximized for the laser beams having the wavelengths λ1, λ2 and λ3, respectively, are referred to as a "BD use diffraction order", a "DVD use diffraction order" and a "CD use diffraction order".

When the BD use diffraction order is set to an even order (e.g., the second order), the CD use diffraction order becomes an odd order (e.g., the first order). In this case, power of the annular zone structure with respect to the laser beam having the wavelength λ1 becomes equal to power of the annular zone structure with respect to the laser beam having the wavelength λ3 which is approximately twice as large as the wavelength λ1. Therefore, in this case, it becomes difficult to correct the relative spherical aberration caused between the optical discs D1 and D3. This is because power of an annular zone structure is proportional to a wavelength and a diffraction order. Therefore, in the region R1, it is necessary to set the BD use diffraction order to an odd order for at least one type of diffraction structure.

The smaller the diffraction order becomes, the smaller change of the diffraction efficiency caused by the wavelength variation becomes and the easier processing of a metal mold and molding becomes. For this reason, the first diffraction structure in the region R1 is configured such that the BD use diffraction order, the DVD use diffraction order and the CD use diffraction order are the first orders. Furthermore, the first diffraction structure in the region R1 is configured to satisfy a condition (1):

$$0.03 < (\lambda B_{11} - \lambda 1)/\lambda 1 < 0.40 \qquad (1)$$

where λBik represents the blazed wavelength of the i-th optical path difference function in the k-th region.

The annular zone structure in the region R2 contributes only to convergence of each of the laser beams having the wavelengths λ1 and λ2. That is, the annular zone structure in the region R2 is configured to converge the laser beam having the wavelength λ1 onto the recording surface of the optical disc D1, to converge the laser beam having the wavelength λ2 onto the recording surface of the optical disc D2, and not to converge the laser beam having the wavelength 23 onto any of the recording surfaces of the optical discs D1 to D3. In view of easiness of manufacturing and suppressing of fluctuation of the diffraction efficiency caused by the wavelength variation, the first diffraction structure in the region R2 is designed such that both of the BD use diffraction order and the DVD use diffraction order are the first orders. Furthermore, the first diffraction structure in the region R2 is configured to satisfy a condition (2):

$$-0.35 < (\lambda B_{12} - \lambda B_{11})/\lambda 1 < 0.35 \qquad (2).$$

The annular zone structure in the region R3 contributes only to convergence of the laser beam having the wavelength λ1. That is, the annular zone structure in the region R3 is configured to converge the laser beam having the wavelength λ1 onto the recording surface of the optical disc D1, and not to converge each of the laser beams having the wavelengths λ2 and λ3 onto any of the recording surfaces of the optical discs D1 to D3. The first diffraction structure in the region R3 is designed such that the BD use diffraction order is an odd order. In view of easiness of manufacturing and suppressing of fluctuation of the diffraction efficiency caused by the wavelength variation, it is preferable that the BD use diffraction order is the first order. Furthermore, the first diffraction structure in the region R3 is configured to satisfy a condition (3):

$$-0.23 < m_{13} \times ((\lambda B_{13} - \lambda 1)/\lambda 1) < 0.23 \qquad (3).$$

By satisfying the above described conditions (i.e., the use diffraction orders in each region and the conditions (1) to (3)), the objective lens 10 is able to achieve the adequate diffraction efficiency for recording information to and/or reproducing information from each of the optical discs D1 to D3 and thereby to form a suitable beam spot on the recording surface of each optical disc.

Figure 4:
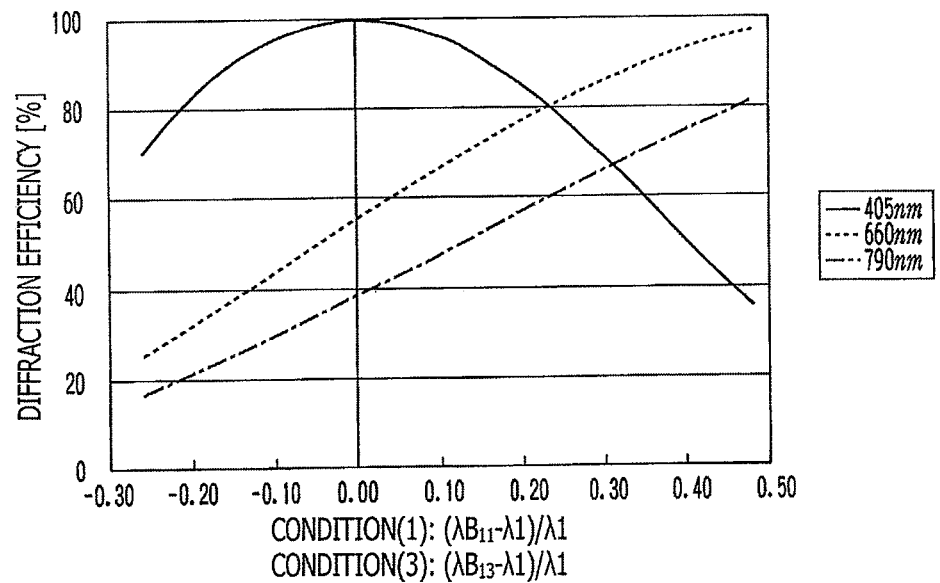
FIG. 4 is a graph illustrating a relationship between the diffraction efficiency and a value of a condition (1) or (3).

FIG. 4 is a graph illustrating a relationship between the diffraction efficiency (unit: %) and the value of the condition (1) or (3). In FIG. 4, the vertical axis represents the diffraction efficiency and the horizontal axis represents the value of each of the conditions (1) and (3). In FIG. 4, a curve indicated by a solid line represents the diffraction efficiency defined when the laser beam having the wavelength λ1 is used, a curve indicated by a dashed line represents the diffraction efficiency defined when the laser beam having the wavelength λ2 is used, and a curve indicated by a chain line represents the diffraction efficiency defined when the laser beam having the wavelength λ3 is used. In FIG. 4, the wavelengths λ1, λ2 and λ3 are 405 nm, 660 nm and 790 nm, respectively. Definitions regarding the line types and the use wavelengths in FIG. 4 are also applied to the following similar drawings.

As shown in FIG. 4, when the blazed wavelength λB$_{11}$ is the wavelength λ1, the diffraction efficiency for the laser beam having the wavelength λ3 is low although in this case the diffraction efficiency for the laser beam having the wavelength λ1 is high. For this reason, according to the embodiment, the blazed wavelength λB11 is set to be longer than the wavelength λ1 so as to secure an adequate diffraction efficiency for the laser beam having the wavelength λ3 (see FIG. 4). Furthermore, since the undesired diffraction order light is reduced by enhancing the diffraction efficiency for the laser beam having the wavelength λ3, deterioration of the focusing function is suppressed.

When the intermediate term of the condition (1) gets smaller than the lower limit of the condition (1), the diffraction efficiency defined when the laser beam having the wavelength λ3 is used becomes too low, which is disadvantageous for suitable information recording and information reproducing for the optical disc D3. When the intermediate term of the condition (1) gets larger than the upper limit of the condition (1), the diffraction efficiency defined when the laser beam having the wavelength λ1 is used becomes too low, which is disadvantageous for suitable information recording and information reproducing for the optical disc D1. Specifically, in this case, it is difficult to perform high speed recording (or high speed reproducing) because the diffraction efficiency is low. In order to compensate for the decrease of the diffraction efficiency, it is necessary to employ a light source of a high power output capability, which is disadvantageous in regard to cost. Furthermore, since the undesired diffraction order light increases due to decrease of the diffraction efficiency, a problem arises that the S/N ratio of a signal, such as a reproduction signal, decreases.

Since the region R3 is a dedicated region for the optical disc D1, it is desirable to set the diffraction efficiency defined when the laser beam having the wavelength λ1 is used to be high by setting the blazed wavelength λB$_{13}$ to be close to the wavelength λ1 (see FIG. 4). When the intermediate term of the condition (3) gets smaller than the lower limit of the condition (3), the diffraction efficiency defined when the laser beam having the wavelength λ1 is used becomes too low, which is undesirable. Furthermore, in this case, a problem arises that the undesired diffraction order light (e.g., the $0^{th}$-order diffracted light) of each of the laser beams having the wavelengths $\lambda 2$ and $\lambda 3$ increases. When the intermediate term of the condition (3) gets larger than the upper limit of the condition (3), the diffraction efficiency defined when the laser beam having the wavelength $\lambda 1$ is used becomes too low, which is undesirable. Furthermore, in this case, a problem arises that the undesired diffraction order light (e.g., the $1^{st}$-order diffracted light) of each of the laser beams having the wavelengths $\lambda 2$ and $\lambda 3$ increases.

Figure 5:
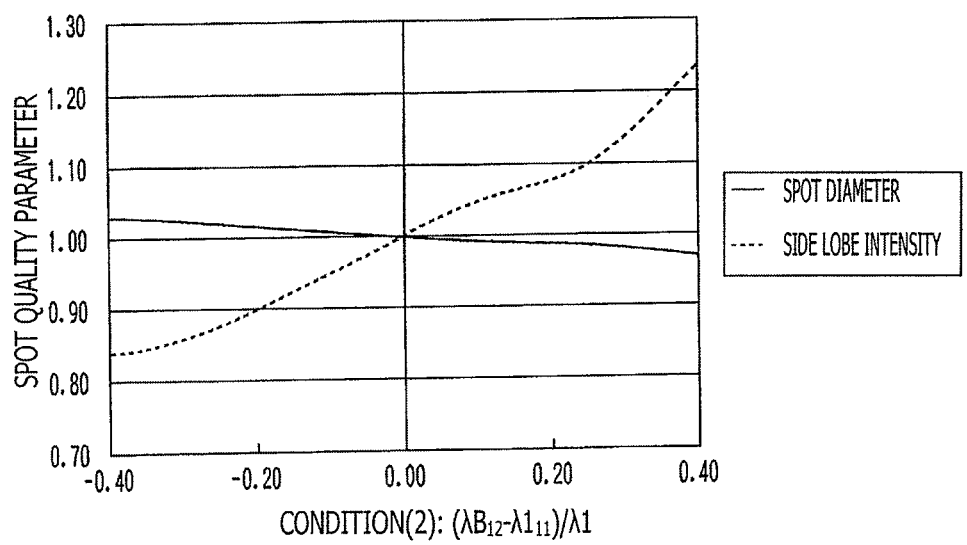
FIG. 5 is a graph illustrating a relationship between a value of a condition (2) defined when the second optical disc is used and a spot diameter ratio of a beam spot formed in the embodiment with respect to an ideal spot.

FIG. 5 is a graph illustrating a relationship between a spot quality parameter (i.e., a ratio with respect to an ideal spot) and a value of the condition (2) defined when the optical disc D2 is used. In FIG. 5, the vertical axis represents the spot quality parameter, and the horizontal axis represents the value of the condition (2). Specifically, in FIG. 5, a curve indicated by a solid line represents the spot diameter (the spot diameter ratio with respect an ideal beam spot), and a curve indicated by a dashed line represents the side lobe intensity (the side lobe intensity ratio with respect an ideal beam spot).

When the intermediate term of the condition (2) takes a value around −0.40, the transmission light amount of the laser beam having the wavelength $\lambda 2$ in the region R2 becomes too low with respect to the transmission light amount of the laser beam having the wavelength $\lambda 2$ in the region R1. As a result, as shown in FIG. 5, the size of the beam spot cannot be reduced to a spot size for suitable information recording or information reproducing. For this reason, in this embodiment, the objective lens 10 is designed such that the intermediate term of the condition (2) is larger than the lower limit of the condition (2).

However, the larger the intermediate term of the condition (2) becomes, the higher the diffraction efficiency for the laser beam having the wavelength $\lambda 2$ in the region R2 becomes. As a result, the transmission light amount of the laser beam having the wavelength $\lambda 2$ in the region R2 becomes larger than the transmission light amount of the laser beam having the wavelength $\lambda 2$ in the region R1. In this case, the effect of the super-resolution increases, and as shown in FIG. 5 the size of the beam spot is reduced and the side lobe increases. In order to suppress such deterioration of the spot property, it is necessary to decrease the value of the condition (2) as shown in FIG. 5. For this reason, in this embodiment, the objective lens 10 is designed such that the intermediate term of the condition (2) is smaller than the upper limit of the condition (2). That is, the objective lens 10 is designed to satisfy the condition (2) so as to suitably record information to and/or reproduce information from each of the optical discs D1 to D3 while suppressing the deterioration of the spot property caused when the laser beam having the wavelength $\lambda 2$ is used.

In order to further enhance the diffraction efficiency for the laser beam having the wavelength $\lambda 3$ while further suppressing the deterioration of the diffraction efficiency for the laser beam having the wavelength $\lambda 1$, the first diffraction structure in the region R1 may be configured to satisfy a condition (4):

$$0.14 < (\lambda B_{11} - \lambda 1)/\lambda 1 < 0.37 \qquad (4).$$

In order to further enhance the diffraction efficiency for the laser beam having the wavelength $\lambda 1$, the first diffraction structure in the region R3 may be designed to satisfy a condition (5):

$$-0.14 < m_{13} \times ((\lambda B_B - \lambda 1)/\lambda 1) < 0.14 \qquad (5).$$

In order to obtain the more suitable spot property for the laser beam having the wavelength $\lambda 2$, the first diffraction structure in the region R2 may be designed to satisfy a condition (6):

$$-0.17 < (\lambda B_{12} - \lambda B_{11})/\lambda 1 < 0.17 \qquad (6).$$

As described above, in the region R1, the second diffraction structure defined by an optical path difference function different from an optical path difference function defining the first diffraction structure is provided in addition to the first diffraction structure. In order to achieve the high diffraction efficiency for each of the laser beams having the wavelengths $\lambda 1$, $\lambda 2$ and $\lambda 3$ (particularly for the laser beam having the wavelength $\lambda 1$), it is preferable that the second diffraction structure in the region R1 is configured by setting the BD use diffraction order to an even order. In view of easiness of manufacturing and suppressing of fluctuation of the diffraction efficiency caused by the wavelength variation, it is preferable that each of the BD use diffraction order, the DVD use diffraction order and the CD use diffraction order is set to a low order. In view of the foregoing, the second diffraction structure in the region R1 is configured such that the BD use diffraction order, the DVD use diffraction order and the CD use diffraction order are the $2^{nd}$ order, the $1^{st}$ order and $1^{st}$ order, respectively, and is configured to satisfy a condition (7):

$$-0.12 < (\lambda B_{21} - \lambda 1)/\lambda 1 < 0.12 \qquad (7).$$

Figure 6:
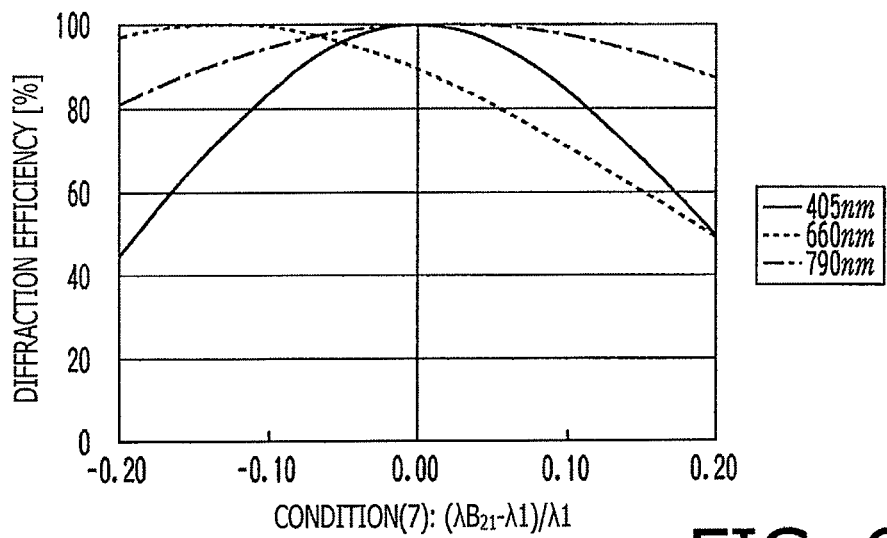
FIG. 6 is a graph illustrating a relationship between the diffraction efficiency and a value of a condition (7).

FIG. 6 is a graph illustrating a relationship between the diffraction efficiency (unit: %) and the value of the condition (7). In FIG. 6, the vertical axis represents the diffraction efficiency, and the horizontal axis represents the value of the condition (7). By satisfying the condition (7) in the region R1 having the first and second diffraction structures, it becomes possible to avoid deterioration of the diffraction efficiency for the laser beam having the wavelength $\lambda 1$ as shown in FIG. 6. If the intermediate term of the condition (7) falls outside the range defined by the condition (7), the diffraction efficiency for the laser beam having the wavelength $\lambda 1$ decreases, which is disadvantageous for suitable information recording and the information reproducing for the optical disc D1.

As described above, in the region R2, the second diffraction structure defined by an optical path difference function different from an optical path difference function defining the first diffraction structure is provided in addition to the first diffraction structure. The second diffraction structure in the region R2 is configured such that the BD use diffraction efficiency is an odd order, and is configured to satisfy a condition (8);

$$-0.28 < m_{22} \times ((\lambda B_{22} - \lambda 1)/\lambda 1) < 0.28 \qquad (8).$$

By satisfying the condition (8) in the region R2 having the first and second diffraction structures, it becomes possible to avoid deterioration of the diffraction efficiency for each of the laser beams having the wavelengths $\lambda 1$ and $\lambda 2$. If the intermediate term of the condition (8) falls outside the range defined by the condition (8), the diffraction efficiency for the laser beam having the wavelength $\lambda 1$ decreases, which is disadvantageous for suitable information recording and information reproducing for the optical disc D1.

In view of easiness of manufacturing and suppressing of fluctuation of the diffraction efficiency caused by the wavelength variation, it is desirable that the BD use diffraction order of the second diffraction structure in the region R2 is, for example, one of the $3^{rd}$ order, the $5^{th}$ order and $7^{th}$ order. When the BD use diffraction efficiency is the $3^{rd}$ order, an adequate diffraction efficiency and the spot property can be obtained for each of the optical discs D1 and D2 by satisfying the following condition (9). When the BD use diffraction efficiency is the $5^{th}$ order, an adequate diffraction efficiency and the spot property can be obtained for each of the optical discs D1 and D2 by satisfying the following condition (10). When the BD use diffraction efficiency is the $7^{th}$ order, an adequate diffraction efficiency and the spot property can be obtained for each of the optical discs D1 and D2 by satisfying the following condition (11).

$$-0.02 < (\lambda B_{22} - \lambda 1)/\lambda 1 < 0.08 \qquad (9)$$

$$-0.05 < (\lambda B_{22} - \lambda 1)/\lambda 1 < 0.05 \qquad (10)$$

$$-0.03 < (\lambda B_{22} - \lambda 1)/\lambda 1 < 0.02 \qquad (11)$$

Figure 7:
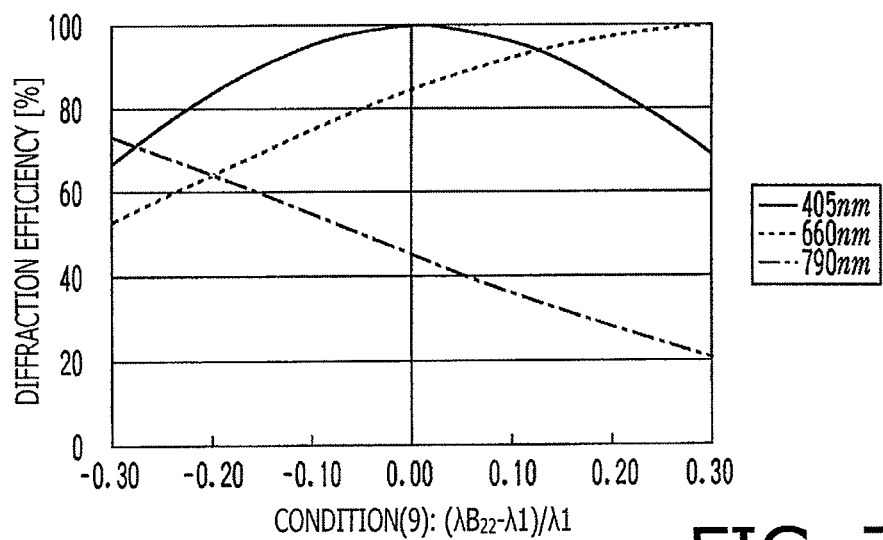
FIG. 7 is a graph illustrating a relationship between the diffraction efficiency and a value of a condition (9).
Figure 8:
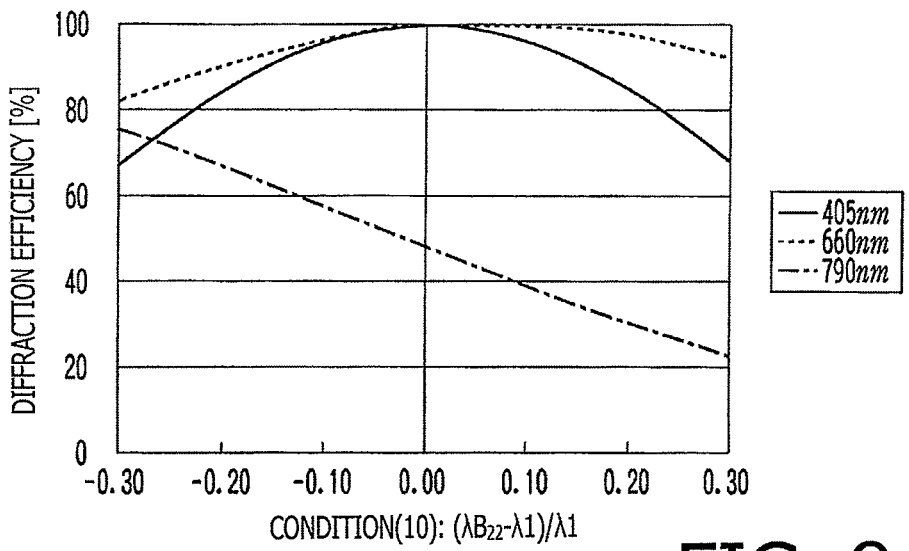
FIG. 8 is a graph illustrating a relationship between the diffraction efficiency and a value of a condition (10).
Figure 9:
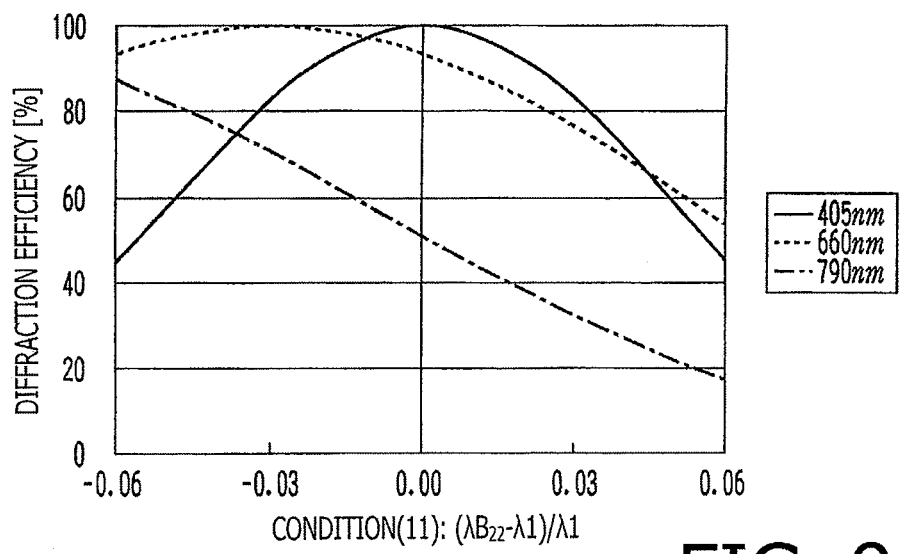
FIG. 9 is a graph illustrating a relationship between the diffraction efficiency and a value of a condition (11).

FIG. 7 is a graph illustrating a relationship between the diffraction efficiency (emit: %) and the value of the condition (9). FIG. 8 is a graph illustrating a relationship between the diffraction efficiency (unit: %) and the value of the condition (10). FIG. 9 is a graph illustrating a relationship between the diffraction efficiency (unit: %) and the value of the condition (11). The vertical axis of each of FIGS. 7 to 9 represents the diffraction efficiency, and the horizontal axes of FIGS. 7 to 9 represent the values of the conditions (9) to (11), respectively. In FIG. 7, the BD use diffraction order, the DVD use diffraction order and the CD use diffraction orders are the $3^{rd}$ order, the $2^{nd}$ order and the $1^{st}$ order, respectively. In FIG. 8, the BD use diffraction order, the DVD use diffraction order and the CD use diffraction orders are the $5^{th}$ order, the $3^{rd}$ order and the $2^{nd}$ order, respectively. In FIG. 9, the BD use diffraction order, the DVD use diffraction order and the CD use diffraction orders are the $7^{th}$ order, the $4^{th}$ order and the $3^{rd}$ order, respectively.

As shown in FIGS. 7 and 8, when the intermediate terms of the conditions (9) and (10) get smaller than the lower limit of the conditions (9) and (10), the diffraction efficiency of each of the laser beams having the wavelengths λ1 and λ2 decreases, which is disadvantageous for suitable information recording and the information reproducing for each of the optical discs D1 and D2. When the intermediate terms of the conditions (9) and (10) get larger than the upper limit of the conditions (9) and (10), the diffraction efficiency of the laser beam having the wavelength λ1 decreases, which is disadvantageous for suitable information recording and information reproducing for the optical disc D1. As shown in FIG. 9, when the intermediate term of the condition (11) gets smaller than the lower limit of the condition (11), the diffraction efficiency for the laser beam having the wavelength λ1 decreases, which is disadvantageous for suitable information recording and information reproducing for the optical disc D1. When the intermediate term of the condition (11) gets larger than the upper limit of the condition (11), the diffraction efficiency for each of the laser beams having the wavelengths λ1 and λ2 decreases, which is disadvantageous for suitable information recording and the information reproducing for each of the optical discs D1 and D2.

The annular zone structure in each of the regions R1 to R3 can be regarded as a phase shift structure. In the followings, the objective lens 10 is explained in another way of expression by regarding the above described annular zone structure as a phase shift structure.

The annular zone structure in the region R1 can be defined as a phase shift structure having at least one type of step (first step) giving an optical path length difference to an incident light beam at a boundary between adjacent ones of a plurality of refractive surface zones. It should be noted that when the phase shift structure has a plurality of types of steps, the plurality of types of steps give different optical path length differences to an incident beam. When an optical path length difference given by the i-th step in the k-th region is represented as $\Delta OPD_{11}$, the phase shift structure in the region R1 is configured to satisfy a condition (12):

$$1.03 < |\Delta OPD_{11}/\lambda 1| < 1.50 \qquad (12).$$

The annular zone structure in the region R2 is also defined as a phase shift structure having at least one type of step (the first step). The phase shift structure in the region R2 is configured to satisfy a condition (13):

$$-0.38 < |\Delta OPD_{12}/\lambda 1| - |\Delta OPD_{11}/\lambda 1| < 0.33 \qquad (13).$$

The annular zone structure in the region R3 is also defined as a phase shift structure having at least one type of step (the first step). The phase shift structure in the region R3 is configured to satisfy a condition (14):

$$2L + 0.75 < |\Delta OPD_{13}/\lambda 1| < 2L + 1.25 \qquad (14)$$

where L is an integer.

By satisfying the conditions (12) to (14), the objective lens 10 is able to obtain an adequate light use efficiency for information recording or information reproducing for each of the optical discs D1 to D3, and to form a suitable beam spot on the recording surface of each of the optical discs D1 to D3.

When the intermediate term of the condition (12) gets smaller than the lower limit of the condition (12), the light use efficiency for the laser beam having the wavelength λ3 becomes too low, which is undesirable. When the intermediate term of the condition (12) gets larger than the upper limit of the condition (12), the light use efficiency for the laser beam having the wavelength λ1 becomes too low, which is undesirable.

When the intermediate term of the condition (13) gets smaller than the lower limit of the condition (13), the transmission light amount of the laser beam having the wavelength λ2 in the region R2 becomes too small with respect to the transmission light amount of the laser beam having the wavelength λ2 in the region R1. In this case, the size of the beam spot of the laser beam having the wavelength λ2 cannot be reduced to an appropriate size for suitably performing the information recording or information reproducing. When the intermediate term of the condition (13) gets larger than the upper limit of the condition (13), the transmission light amount of the laser beam having the wavelength λ2 in the region R2 becomes too large with respect to the transmission light amount of the laser beam having the wavelength λ2 in the region R1. In this case, the spot size is reduced excessively by the effect of the super resolution and the side lobe increases.

When the intermediate term of the condition (14) gets smaller than the lower limit of the condition (14), the light use efficiency for the laser beam having the wavelength 21 becomes too low, which is undesirable. Furthermore, in this case, a problem arises that the undesired diffraction order light (e.g., the 0-th order diffracted light) increases for each of the laser beams having the wavelengths λ2 and λ3. When the intermediate term of the condition (14) gets larger than the upper limit of the condition (14), the light use efficiency for the laser beam having the wavelength λ1 becomes too low, which is undesirable. Furthermore, in this case, a problem arises that the undesired diffraction order light (e.g., the order diffracted light) increases for each of the laser beams having the wavelengths λ2 and λ3.

In order to more appropriately suppress decrease of the light use efficiency of the laser beam having the wavelength λ1 and to more appropriately secure the light use efficiency for the laser beam having the wavelength λ3, the phase shift structure having the first step in the region R1 may be configured to satisfy the following condition (15):

$$1.16 < |\Delta OPD_1/\lambda 1| < 1.40 \qquad (15).$$

In order to more appropriately secure the light use efficiency for the laser beam having the wavelength λ1, the phase shift structure in the region R3 may be configured to satisfy the following condition (16):

$$2L+0.82<|\Delta OPD_{13}/\lambda 1|<2L+1.18 \quad (16)$$

where L is an integer.

In order to obtain an suitable spot property particularly for the laser beam having the wavelength λ2, the phase shift structure having the first step in the region R2 may be configured to satisfy the following condition (17):

$$-0.19<|\Delta OPD_{12}/\lambda|-|\Delta OPD_{11}/\lambda 1|<0.19 \quad (17).$$

In addition to the first step, a phase shift structure having the second step which is different from the first step may be provided in the region R1, the phase shift structure having the second step in the region R1 is configured to satisfy the following condition (18):

$$1.75<|\Delta OPD_{21}/\lambda 1|<2.25 \quad (18).$$

By satisfying the condition (18) in the region R1 where the phase shift structures having the first and second steps are provided, it becomes possible to avoid more reliably decrease of the light use efficiency for the laser beam having the wavelength λ1. When the intermediate term of the condition (18) falls outside of the range defined by the condition (18), the light use efficiency for the laser beam having the wavelength λ1 decreases, which is disadvantageous for suitable information recording or the information reproducing for the optical disc D1.

In view of easiness of manufacturing and suppressing of fluctuation of the diffraction efficiency caused by the wavelength variation, the phase shift structure in the region R3 may be configured to satisfy the following condition (19):

$$0.83<|\Delta OPD_{13}/\lambda 1|<1.17 \quad (19).$$

In addition to the first step, a phase shift structure having the second step different from the first step may be provided in the region R2. The phase shift structure having the second step in the region R2 is configured to satisfy the following condition (20):

$$2L+0.68<|\Delta OPD_{22}/\lambda 1|<2L+1.32 \quad (20)$$

where L is an integer.

By satisfying the condition (20) in the region R2 where the phase shift structures having the first and second steps are provided, it becomes possible to avoid more reliably decrease of the light use efficiency for each of the laser beams having the wavelengths λ1 and λ2. When the intermediate term of the condition (20) falls outside of the range defined by the condition (20), the light use efficiency for the laser beam having the wavelength λ2 decreases, which is disadvantageous for suitable information recording and the information reproducing for the optical disc D2.

In order to obtain an adequate light use efficiency and an adequate spot property when each of the optical discs D1 and D2 is used, the phase shift structure having the second step in the region R2 may be configured to satisfy the following conditions (21), (22) and (23).

$$2.94<|\Delta OPD_{22}/\lambda 1|<3.27 \quad (21)$$

$$4.73<|\Delta OPD_{22}/\lambda 1|<5.27 \quad (22)$$

$$6.75<|\Delta OPD_{22}/\lambda 1|<7.17 \quad (23)$$

When the intermediate terms of the conditions (21) and (22) get smaller than the lower limits the respective conditions (21) and (22), the light use efficiency decreases for each of the laser beams having the wavelengths λ1 and λ2, which is disadvantageous for suitable information recording and information reproducing for each of the optical discs D1 and D2. When the intermediate terms of the conditions (21) and (22) get larger than the upper limits of the respective conditions (21) and (22), the light use efficiency for the laser beam having the wavelength λ1 decreases, which is disadvantageous for suitable information recording and information reproducing for the optical disc D1. When the intermediate term of the condition (23) gets smaller than the lower limit of the condition (23), the light use efficiency for the laser beam having the wavelength λ1 decreases, which is disadvantageous for suitable information recording and information reproducing for the optical disc D1. When the intermediate term of the condition (23) gets larger than the upper limit of the condition (23), the light use efficiency for each of the laser beams having the wavelengths λ1 and λ2 decreases, which is disadvantageous for suitable information recording and information reproducing for each of the optical discs D1 and D2.

In order to suitably correct the chromatic aberration caused when the optical disc D1 is used, the objective lens 10 may be configured to satisfy the following condition (24):

$$35 \le vd \le 80 \quad (24)$$

where vd represents Abbe number of the objective lens 10 at d-line.

In order to achieve the further higher diffraction efficiency for all of the BD use diffraction order, the DVD use diffraction order and the CD use diffraction order, the objective lens 10 may be configured to satisfy the following condition (25):

$$0.4<(\lambda 1/(n3-1))/(\lambda 3/(n1-1))<0.6 \quad (25)$$

where n1 and n3 represent refraction indexes at the wavelengths λ1 and λ3, respectively. When the annular zone structure is provided on the optical element 91 as shown in FIG. 26, the optical element 91 is configured to satisfy the condition (25).

In the following, six concrete examples (first to sixth examples) of the optical information recording/reproducing apparatus 100 on which the objective lens 10 is mounted are explained. The optical information recording/reproducing apparatus 100 according to each of the first to third examples has the general configuration shown in FIG. 1. The objective lens 10 according to each of the first to sixth examples has the general configuration shown in FIGS. 2A and 2B. Since the difference in shape of each optical element between the first to sixth examples is extremely small and cannot be expressed in the scale size of the accompanying drawings, the general configuration of the optical information recording/reproducing apparatus 100 according to the each of the first to third examples is explained with reference to FIG. 1, and the configuration of the objective lens 10 according to each of the first to sixth examples is explained with reference to FIGS. 2A and 2B.

First Example

Hereafter, a first example of the optical information recording/reproducing apparatus 100 is described. The specifications of the objective lens 10 mounted on the optical information recording/reproducing apparatus 100 according to the first example are indicated in the following Table 1. Specifically, Table 1 shows the use wavelength, the focal length, NA and the magnification of the objective lens 10. Various definitions regarding Tables in the first example are also applied to Tables in the other examples.

TABLE 1

|  | 1st laser beam | 2nd laser beam | 3rd laser beam |
| --- | --- | --- | --- |
| Wavelength (nm) | 405 | 660 | 790 |
| Focal Length (mm) | 2.20 | 2.36 | 2.41 |
| NA | 0.85 | 0.60 | 0.47 |
| Magnification M | 0.000 | 0.000 | 0.000 |

As shown by the magnification in Table 1, in the optical information recording/reproducing apparatus 100, each of the laser beams used for the respective optical discs D1, D2 and D3 is incident on the objective lens 10 as a collimated beam. Therefore, it is possible to prevent the off-axis aberrations from occurring when the objective lens 10 is shifted for the tracking operation.

The following Tables 2 to 4 show numeral configurations defined for the objective lens 10 and optical elements located on the downstream side of the objective lens 10 in the optical information recording/reproducing apparatus 100. Specifically, Table 2 shows the numerical configuration defined when the optical disc D1 is used, Table 3 shows the numerical configuration defined when the optical disc D2 is used, and Table 4 shows the numerical configuration defined when the optical disc D3 is used.

TABLE 2

| Surface No. | r | d | n(405 nm) |  |
| --- | --- | --- | --- | --- |
| 1(1st region) | 1.363 | 2.60 | 1.56023 | Objective Lens 10 |
| 1(2nd region) | 1.442 |  |  |  |
| 1(3rd region) | 1.304 |  |  |  |
| 2 | −2.780 | 0.75 |  |  |
| 3 | ∞ | 0.0875 | 1.62231 | Optical Disc D1 |
| 4 | ∞ | — |  |  |

TABLE 4

| Surface No. | r | d | n(790 nm) |  |
| --- | --- | --- | --- | --- |
| 1(1st region) | 1.363 | 2.60 | 1.53653 | Objective Lens 10 |
| 1(2nd region) | 1.442 |  |  |  |
| 1(3rd region) | 1.304 |  |  |  |
| 2 | −2.780 | 0.31 |  |  |
| 3 | ∞ | 1.20 | 1.57307 | Optical Disc D3 |
| 4 | ∞ | — |  |  |

In each of Tables 2-4, surface #1 (1st region) represents the region R1 on the first surface 10a of the objective lens 10, surface #1 (2nd region) represents the region R2 on the first surface 10a of the objective lens 10, surface #1 (3rd region) represents the region R3 on the first surface 10a of the objective lens 10, surface #2 represents the second surface 10b of the objective lens 10, surface #3 represents the protective layer surface of the optical disc being used, and surface #4 represents the recording surface of the optical disc being used. In Tables 2-4, "r" denotes the curvature radius (unit: mm) of each optical surface, "d" denotes the thickness of an optical component or the distance (unit: mm) from each optical surface to the next optical surface, "n (XXnm)" represents the refractive index at a wavelength in parentheses. For an aspherical surface, "r" represents the curvature radius on the optical axis.

Each of the first surface 10a (i.e., each of the surface #1 (1st region), the surface #1 (2nd region) and the surface #1 (3rd region)) and the second surface 10b of the objective lens 10 is an aspherical surface. Each of the aspherical surfaces is optimally designed for the information recording or information reproducing for each of the optical discs D1 to D3. The following Table 5 shows the conical coefficients κ and aspherical coefficients $A_4, A_6 \ldots$ of each aspherical surface. In Table 5, the notation "E" means the power of 10 with an exponent specified by the number to the right of E (e.g. "E-04" means "$\times 10^{-4}$").

TABLE 5

|  | κ | A4 | A6 | A8 | A10 | A12 | A14 |
| --- | --- | --- | --- | --- | --- | --- | --- |
| 1(1st region) | −0.7500 | 7.0650E−04 | 7.4380E−03 | −2.9130E−03 | 7.5630E−04 | −1.9550E−04 | 0.0000E+00 |
| 1(2nd region) | −0.7500 | 1.7390E−02 | 8.1200E−03 | −4.8000E−03 | 1.6234E−03 | −2.6845E−04 | 0.0000E+00 |
| 1(3rd region) | −0.7500 | 8.1940E−04 | −2.1650E−03 | 4.4360E−04 | 2.4323E−04 | −5.7425E−05 | 0.0000E+00 |
| 2 | 0.0000 | 2.9080E−01 | −3.6580E−01 | 5.1080E−01 | −6.1480E−01 | 4.9670E−01 | −2.2880E−01 |

|  | A16 | A18 | A20 | A22 | A24 |
| --- | --- | --- | --- | --- | --- |
| 1(1st region) | 0.0000E+00 | 0.0000E+00 | 0.0000E+00 | 0.0000E+00 | 0.0000E+00 |
| 1(2nd region) | 0.0000E+00 | 0.0000E+00 | 0.0000E+00 | 0.0000E+00 | 0.0000E+00 |
| 1(3rd region) | 0.0000E+00 | 0.0000E+00 | 0.0000E+00 | 0.0000E+00 | 0.0000E+00 |
| 2 | 3.7763E−02 | 1.3302E−02 | −7.1443E−03 | 9.4756E−04 | 0.0000E+00 |

TABLE 3

| Surface No. | r | d | n(660 nm) |  |
| --- | --- | --- | --- | --- |
| 1(1st region) | 1.363 | 2.60 | 1.54044 | Objective Lens 10 |
| 1(2nd region) | 1.442 |  |  |  |
| 1(3rd region) | 1.304 |  |  |  |
| 2 | −2.780 | 0.62 |  |  |
| 3 | ∞ | 0.60 | 1.57961 | Optical Disc D2 |
| 4 | ∞ | — |  |  |

On the first surface 10a of the objective lens 10 according to the first example, the regions R1, R2 and R3 are formed in the ranges of height h from the optical axis (i.e., the effective radius) indicated below.

Region R1: $0.000 \leq h \leq 1.135$
Region R2: $1.135 < h \leq 1.415$
Region R3: $1.415 < h \leq 1.870$ The region R1 is a common region contributing to convergence of each of the laser beams having the wavelengths λ1, λ2 and λ3. The region R2 is configured to contribute to convergence of each of the laser beams having the wavelengths λ1 and λ2 and not to contribute to convergence of the laser beam having the wavelength λ3. In other words, the region R2 serves as an aperture stop for the laser beam having the wavelength λ3. The region R3 is a region for securing the numerical aperture required for the optical disc D1 which requires the largest numerical aperture. That is, the region R3 is configured to contribute to convergence of the laser beam having the wavelength λ1 and not to contribute to convergence of each of the laser beams having the wavelengths λ2 and λ3. In other words, the region R3 serves as an aperture stop for each of the laser beams having the wavelengths λ2 and λ3.

Since as described above the regions R1 to R3 have the functions different from each other, each of the regions R1 to R3 has a unique diffraction structure (i.e., a unique phase shift structure). The following Table 6 shows coefficients of the optical path difference functions respectively defining the diffraction structures in the regions R1, R2 and R3 on the first surface 10a of the objective lens 10. The following Table 7 shows the BD use diffraction order, the DVD use diffraction order, the CD use diffraction order and the blazed wavelengths. In Tables 6 and 7, symbols "1 ($1^{st}$ region)(1)", "1($1^{st}$ region)(2)", "1($2^{nd}$ region)(1)", "1($2^{nd}$ region)(2)", and "1($3^{rd}$ region)" represent the coefficients of the first diffraction structure in the region R1, the second diffraction structure in the region R1, the first diffraction structure in the region R2, the second diffraction structure in the region R2, and the first diffraction structure in the region R3, respectively. The symbols "1($1^{st}$ region)(1)", "1($1^{st}$ region)(2)", "1($2^{nd}$ region)(1)", "1($2^{nd}$ region)(2)", and "1($3^{rd}$ region)" correspond to the first step in the region R1, the second step in the region R1, the first step in the region R2, the second step in the region R2 and the first step in the region R3, respectively.

TABLE 6

|  | P2 | P4 | P6 | P8 | P10 | P12 |
|---|---|---|---|---|---|---|
| 1($1^{st}$ region)(1) | 4.5048E+01 | −4.2450E+00 | 6.1400E−01 | −3.9340E−01 | 0.0000E+00 | 0.0000E+00 |
| 1($1^{st}$ region)(2) | −3.9828E+00 | −4.3250E+00 | 3.3360E+00 | −1.4690E+00 | 0.0000E+00 | 0.0000E+00 |
| 1($2^{nd}$ region)(1) | 4.5045E+01 | −2.4330E+00 | 2.5910E−01 | −1.8580E−01 | 0.0000E+00 | 0.0000E+00 |
| 1($2^{nd}$ region)(2) | −5.1091E+00 | 2.0250E+00 | 2.4530E−01 | −3.0550E−01 | 0.0000E+00 | 0.0000E+00 |
| 1($3^{rd}$ region) | 6.0042E+01 | −1.4130E+01 | −2.9460E+00 | 5.9510E−02 | 0.0000E+00 | 0.0000E+00 |

TABLE 7

|  | $1^{st}$ Laser Beam | $2^{nd}$ Laser Beam | $3^{rd}$ Laser Beam | Blazed Wavelength(nm) | Hmax |
|---|---|---|---|---|---|
| 1($1^{st}$ region)(1) | 1 | 1 | 1 | 500 | 1.135 |
| 1($1^{st}$ region)(2) | 2 | 1 | 1 | 405 |  |
| 1($2^{nd}$ region)(1) | 1 | 1 | 1 | 450 | 1.415 |
| 1($2^{nd}$ region)(2) | 7 | 4 | — | 395 |  |
| 1($3^{rd}$ region) | 1 | — | — | 405 | 1.870 |

The following Tables 8 to 10 represent the concrete configurations of the annular zone structures formed in the regions R1 to R3. In Tables 8 to 10, the annular zone numbers are assigned to the annular zones sequentially from the optical axis side. The width of each annular zone is indicated by hmin (minimum height) and hmax (maximum height) from the optical axis. In Tables 8 to 10, the optical path length differences $\Delta OPD_{11}/\lambda 1$, $\Delta OPD_{21}/\lambda 1$, $\Delta OPD_{12}/\lambda 1$, $\Delta OPD_{22}/\lambda 1$, $\Delta OPD_{32}/\lambda 1$, $\Delta OPD_{13}/\lambda 1$ and $\Delta OPD_{23}/\lambda 1$ defined between adjacent ones of the annular zones are also shown.

As shown in Tables 8 to 10, the region R1 has two types of steps, the region R2 has three types of steps, and the region R3 has two types of steps. The third step in the region R2 corresponds to a step at a boundary position between the regions R1 and R2, and the second step in the region R3 corresponds to a step at a boundary position between the regions R2 and R3. The fact that the above described step formed at a boundary between regions (i.e., the third step in the region R2 or the second step in the region R3) is different from the other steps in the corresponding region has no effect on change of the diffraction efficiency. Therefore, numeric values for representing the third step in the region R2 and the second step of the region R3 as the diffraction structures are not shown in Tables 6 and 7.

TABLE 8

First Region (R1)

| Number | hmin | hmax | $\Delta OPD_{11}/\lambda 1$ | $\Delta OPD_{21}/\lambda 1$ |
|---|---|---|---|---|
| 0 | 0.000 | 0.105 |  |  |
| 1 | 0.105 | 0.183 | 1.26 |  |
| 2 | 0.183 | 0.236 | 1.26 |  |
| 3 | 0.236 | 0.280 | 1.26 |  |
| 4 | 0.280 | 0.318 | 1.26 |  |
| 5 | 0.318 | 0.336 | 1.26 |  |
| 6 | 0.336 | 0.351 |  | −2.00 |
| 7 | 0.351 | 0.382 | 1.26 |  |
| 8 | 0.382 | 0.411 | 1.26 |  |
| 9 | 0.411 | 0.438 | 1.26 |  |
| 10 | 0.438 | 0.464 | 1.26 |  |
| 11 | 0.464 | 0.488 | 1.26 |  |
| 12 | 0.488 | 0.511 | 1.26 |  |
| 13 | 0.511 | 0.534 | 1.26 |  |
| 14 | 0.534 | 0.547 | 1.26 |  |
| 15 | 0.547 | 0.555 |  | −2.00 |
| 16 | 0.555 | 0.576 | 1.26 |  |
| 17 | 0.576 | 0.596 | 1.26 |  |
| 18 | 0.596 | 0.616 | 1.26 |  |
| 19 | 0.616 | 0.635 | 1.26 |  |

TABLE 8-continued

First Region (R1)

| Number | hmin | hmax | $\Delta OPD_{11}/\lambda 1$ | $\Delta OPD_{21}/\lambda 1$ |
|---|---|---|---|---|
| 20 | 0.635 | 0.654 | 1.26 |  |
| 21 | 0.654 | 0.672 | 1.26 |  |
| 22 | 0.672 | 0.680 | 1.26 |  |
| 23 | 0.680 | 0.689 |  | −2.00 |
| 24 | 0.689 | 0.707 | 1.26 |  |
| 25 | 0.707 | 0.724 | 1.26 |  |
| 26 | 0.724 | 0.741 | 1.26 |  |
| 27 | 0.741 | 0.757 | 1.26 |  |
| 28 | 0.757 | 0.773 | 1.26 |  |
| 29 | 0.773 | 0.782 | 1.26 |  |
| 30 | 0.782 | 0.789 |  | −2.00 |
| 31 | 0.789 | 0.805 | 1.26 |  |
| 32 | 0.805 | 0.820 | 1.26 |  |
| 33 | 0.820 | 0.836 | 1.26 |  |
| 34 | 0.836 | 0.851 | 1.26 |  |
| 35 | 0.851 | 0.866 | 1.26 |  |
| 36 | 0.866 | 0.868 | 1.26 |  |
| 37 | 0.868 | 0.880 |  | −2.00 |
| 38 | 0.880 | 0.895 | 1.26 |  |
| 39 | 0.895 | 0.909 | 1.26 |  |
| 40 | 0.909 | 0.923 | 1.26 |  |
| 41 | 0.923 | 0.938 | 1.26 |  |
| 42 | 0.938 | 0.941 | 1.26 |  |

TABLE 8-continued

First Region (R1)

| Number | hmin | hmax | $\Delta OPD_{11}/\lambda 1$ | $\Delta OPD_{21}/\lambda 1$ |
|---|---|---|---|---|
| 43 | 0.941 | 0.952 | | −2.00 |
| 44 | 0.952 | 0.965 | 1.26 | |
| 45 | 0.965 | 0.979 | 1.26 | |
| 46 | 0.979 | 0.993 | 1.26 | |
| 47 | 0.993 | 1.003 | 1.26 | |
| 48 | 1.003 | 1.006 | | −2.00 |
| 49 | 1.006 | 1.020 | 1.26 | |
| 50 | 1.020 | 1.033 | 1.26 | |
| 51 | 1.033 | 1.047 | 1.26 | |
| 52 | 1.047 | 1.058 | 1.26 | |
| 53 | 1.058 | 1.060 | | −2.00 |
| 54 | 1.060 | 1.073 | 1.26 | |
| 55 | 1.073 | 1.086 | 1.26 | |
| 56 | 1.086 | 1.100 | 1.26 | |
| 57 | 1.100 | 1.105 | 1.26 | |
| 58 | 1.105 | 1.113 | | −2.00 |
| 59 | 1.113 | 1.126 | 1.26 | |
| 60 | 1.126 | 1.135 | 1.26 | |

TABLE 9

Second Region (R2)

| Number | hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 61 | 1.135 | 1.140 | | | −3.51 |
| 62 | 1.140 | 1.152 | 1.12 | | |
| 63 | 1.152 | 1.163 | 1.12 | | |
| 64 | 1.163 | 1.174 | 1.12 | | |
| 65 | 1.174 | 1.186 | 1.12 | | |
| 66 | 1.186 | 1.197 | 1.12 | | |
| 67 | 1.197 | 1.208 | 1.12 | | |
| 68 | 1.208 | 1.219 | 1.12 | | |
| 69 | 1.219 | 1.230 | 1.12 | | |
| 70 | 1.230 | 1.241 | 1.12 | | |
| 71 | 1.241 | 1.252 | 1.12 | | |
| 72 | 1.252 | 1.263 | 1.12 | | |
| 73 | 1.263 | 1.274 | 1.12 | | |
| 74 | 1.274 | 1.285 | 1.12 | | |
| 75 | 1.285 | 1.296 | 1.12 | | |
| 76 | 1.296 | 1.306 | 1.12 | | |
| 77 | 1.306 | 1.317 | 1.12 | | |
| 78 | 1.317 | 1.328 | 1.12 | | |
| 79 | 1.328 | 1.339 | 1.12 | | |
| 80 | 1.339 | 1.350 | 1.12 | | |
| 81 | 1.350 | 1.354 | 1.12 | | |
| 82 | 1.354 | 1.360 | | −6.81 | |
| 83 | 1.360 | 1.371 | 1.12 | | |
| 84 | 1.371 | 1.382 | 1.12 | | |
| 85 | 1.382 | 1.393 | 1.12 | | |
| 86 | 1.393 | 1.404 | 1.12 | | |
| 87 | 1.404 | 1.415 | 1.12 | | |

TABLE 10

Third Region (R3)

| Number | hmin | hmax | $\Delta OPD_{13}/\lambda 1$ | $\Delta OPD_{23}/\lambda 1$ |
|---|---|---|---|---|
| 88 | 1.415 | 1.419 | | −3.28 |
| 89 | 1.419 | 1.430 | −1.00 | |
| 90 | 1.430 | 1.441 | −1.00 | |
| 91 | 1.441 | 1.451 | −1.00 | |
| 92 | 1.451 | 1.460 | −1.00 | |
| 93 | 1.460 | 1.469 | −1.00 | |
| 94 | 1.469 | 1.477 | −1.00 | |
| 95 | 1.477 | 1.485 | −1.00 | |
| 96 | 1.485 | 1.493 | −1.00 | |
| 97 | 1.493 | 1.500 | −1.00 | |
| 98 | 1.500 | 1.507 | −1.00 | |
| 99 | 1.507 | 1.514 | −1.00 | |

TABLE 10-continued

Third Region (R3)

| Number | hmin | hmax | $\Delta OPD_{13}/\lambda 1$ | $\Delta OPD_{23}/\lambda 1$ |
|---|---|---|---|---|
| 100 | 1.514 | 1.521 | −1.00 | |
| 101 | 1.521 | 1.528 | −1.00 | |
| 102 | 1.528 | 1.534 | −1.00 | |
| 103 | 1.534 | 1.540 | −1.00 | |
| 104 | 1.540 | 1.546 | −1.00 | |
| 105 | 1.546 | 1.552 | −1.00 | |
| 106 | 1.552 | 1.558 | −1.00 | |
| 107 | 1.558 | 1.563 | −1.00 | |
| 108 | 1.563 | 1.569 | −1.00 | |
| 109 | 1.569 | 1.574 | −1.00 | |
| 110 | 1.574 | 1.579 | −1.00 | |
| 111 | 1.579 | 1.584 | −1.00 | |
| 112 | 1.584 | 1.589 | −1.00 | |
| 113 | 1.589 | 1.594 | −1.00 | |
| 114 | 1.594 | 1.599 | −1.00 | |
| 115 | 1.599 | 1.603 | −1.00 | |
| 116 | 1.603 | 1.608 | −1.00 | |
| 117 | 1.608 | 1.613 | −1.00 | |
| 118 | 1.613 | 1.617 | −1.00 | |
| 119 | 1.617 | 1.621 | −1.00 | |
| 120 | 1.621 | 1.626 | −1.00 | |
| 121 | 1.626 | 1.630 | −1.00 | |
| 122 | 1.630 | 1.634 | −1.00 | |
| 123 | 1.634 | 1.638 | −1.00 | |
| 124 | 1.638 | 1.642 | −1.00 | |
| 125 | 1.642 | 1.646 | −1.00 | |
| 126 | 1.646 | 1.650 | −1.00 | |
| 127 | 1.650 | 1.654 | −1.00 | |
| 128 | 1.654 | 1.658 | −1.00 | |
| 129 | 1.658 | 1.662 | −1.00 | |
| 130 | 1.662 | 1.665 | −1.00 | |
| 131 | 1.665 | 1.669 | −1.00 | |
| 132 | 1.669 | 1.673 | −1.00 | |
| 133 | 1.673 | 1.676 | −1.00 | |
| 134 | 1.676 | 1.680 | −1.00 | |
| 135 | 1.680 | 1.683 | −1.00 | |
| 136 | 1.683 | 1.687 | −1.00 | |
| 137 | 1.687 | 1.690 | −1.00 | |
| 138 | 1.690 | 1.694 | −1.00 | |
| 139 | 1.694 | 1.697 | −1.00 | |
| 140 | 1.697 | 1.700 | −1.00 | |
| 141 | 1.700 | 1.703 | −1.00 | |
| 142 | 1.703 | 1.707 | −1.00 | |
| 143 | 1.707 | 1.710 | −1.00 | |
| 144 | 1.710 | 1.713 | −1.00 | |
| 145 | 1.713 | 1.716 | −1.00 | |
| 146 | 1.716 | 1.719 | −1.00 | |
| 147 | 1.719 | 1.722 | −1.00 | |
| 148 | 1.722 | 1.725 | −1.00 | |
| 149 | 1.725 | 1.728 | −1.00 | |
| 150 | 1.728 | 1.731 | −1.00 | |
| 151 | 1.731 | 1.734 | −1.00 | |
| 152 | 1.734 | 1.737 | −1.00 | |
| 153 | 1.737 | 1.740 | −1.00 | |
| 154 | 1.740 | 1.743 | −1.00 | |
| 155 | 1.743 | 1.746 | −1.00 | |
| 156 | 1.746 | 1.749 | −1.00 | |
| 157 | 1.749 | 1.751 | −1.00 | |
| 158 | 1.751 | 1.754 | −1.00 | |
| 159 | 1.754 | 1.757 | −1.00 | |
| 160 | 1.757 | 1.760 | −1.00 | |
| 161 | 1.760 | 1.762 | −1.00 | |
| 162 | 1.762 | 1.765 | −1.00 | |
| 163 | 1.765 | 1.768 | −1.00 | |
| 164 | 1.768 | 1.770 | −1.00 | |
| 165 | 1.770 | 1.773 | −1.00 | |
| 166 | 1.773 | 1.775 | −1.00 | |
| 167 | 1.775 | 1.778 | −1.00 | |
| 168 | 1.778 | 1.780 | −1.00 | |
| 169 | 1.780 | 1.783 | −1.00 | |
| 170 | 1.783 | 1.785 | −1.00 | |
| 171 | 1.785 | 1.788 | −1.00 | |
| 172 | 1.788 | 1.790 | −1.00 | |
| 173 | 1.790 | 1.793 | −1.00 | |
| 174 | 1.793 | 1.795 | −1.00 | |
| 175 | 1.795 | 1.798 | −1.00 | |

TABLE 10-continued

Third Region (R3)

| Number | hmin | hmax | $\Delta OPD_{13}/\lambda 1$ | $\Delta OPD_{23}/\lambda 1$ |
|---|---|---|---|---|
| 176 | 1.798 | 1.800 | −1.00 | |
| 177 | 1.800 | 1.803 | −1.00 | |
| 178 | 1.803 | 1.805 | −1.00 | |
| 179 | 1.805 | 1.807 | −1.00 | |
| 180 | 1.807 | 1.810 | −1.00 | |
| 181 | 1.810 | 1.812 | −1.00 | |
| 182 | 1.812 | 1.814 | −1.00 | |
| 183 | 1.814 | 1.816 | −1.00 | |
| 184 | 1.816 | 1.819 | −1.00 | |
| 185 | 1.819 | 1.821 | −1.00 | |
| 186 | 1.821 | 1.823 | −1.00 | |
| 187 | 1.823 | 1.825 | −1.00 | |
| 188 | 1.825 | 1.828 | −1.00 | |
| 189 | 1.828 | 1.830 | −1.00 | |
| 190 | 1.830 | 1.832 | −1.00 | |
| 191 | 1.832 | 1.834 | −1.00 | |
| 192 | 1.834 | 1.836 | −1.00 | |
| 193 | 1.836 | 1.839 | −1.00 | |
| 194 | 1.839 | 1.841 | −1.00 | |
| 195 | 1.841 | 1.843 | −1.00 | |
| 196 | 1.843 | 1.845 | −1.00 | |
| 197 | 1.845 | 1.847 | −1.00 | |
| 198 | 1.847 | 1.849 | −1.00 | |
| 199 | 1.849 | 1.851 | −1.00 | |
| 200 | 1.851 | 1.853 | −1.00 | |
| 201 | 1.853 | 1.855 | −1.00 | |
| 202 | 1.855 | 1.857 | −1.00 | |
| 203 | 1.857 | 1.859 | −1.00 | |
| 204 | 1.859 | 1.861 | −1.00 | |
| 205 | 1.861 | 1.863 | −1.00 | |
| 206 | 1.863 | 1.865 | −1.00 | |
| 207 | 1.865 | 1.867 | −1.00 | |
| 208 | 1.867 | 1.870 | −1.00 | |

Second Example

Hereafter, a second example of the optical information recording/reproducing apparatus 100 is described. The objective lens 10 according to the second example has the same numerical configuration as that of the objective lens 10 according to the first example, excepting the blazed wavelengths. Therefore, regarding the specifications of the objective lens 10 according to the second example, the numerical configuration of the optical information recording/reproducing apparatus 100 defined when each of the optical discs D1 to D3 is used, the shape of each aspherical surface, and the coefficients of the optical path difference functions according to the second example, Tables 1 to 6 of the first example are referred to.

The following Table 11 shows the BD use diffraction order, the DVD use diffraction order, the CD use diffraction order and the blazed wavelengths.

TABLE 11

| | $1^{st}$ Laser Beam | $2^{nd}$ Laser Beam | $3^{rd}$ Laser Beam | Blazed Wavelength(nm) | Hmax |
|---|---|---|---|---|---|
| 1($1^{st}$ region)(1) | 1 | 1 | 1 | 560 | 1.135 |
| 1($1^{st}$ region)(2) | 2 | 1 | 1 | 405 | |
| 1($2^{nd}$ region)(1) | 1 | 1 | 1 | 450 | 1.415 |
| 1($2^{nd}$ region)(2) | 7 | 4 | — | 395 | |
| 1($3^{rd}$ region) | 1 | — | — | 480 | 1.870 |

The following Tables 12 to 14 represent the concrete configurations of the annular zone structures formed in the regions R1 to R3.

TABLE 12

First Region (R1)

| Number | Hmin | hmax | $\Delta OPD_{11}/\lambda 1$ | $\Delta OPD_{21}/\lambda 1$ |
|---|---|---|---|---|
| 0 | 0.000 | 0.105 | | |
| 1 | 0.105 | 0.183 | 1.41 | |
| 2 | 0.183 | 0.236 | 1.41 | |
| 3 | 0.236 | 0.280 | 1.41 | |
| 4 | 0.280 | 0.318 | 1.41 | |
| 5 | 0.318 | 0.336 | 1.41 | |
| 6 | 0.336 | 0.351 | | −2.00 |
| 7 | 0.351 | 0.382 | 1.41 | |
| 8 | 0.382 | 0.411 | 1.41 | |
| 9 | 0.411 | 0.438 | 1.41 | |
| 10 | 0.438 | 0.464 | 1.41 | |
| 11 | 0.464 | 0.488 | 1.41 | |
| 12 | 0.488 | 0.511 | 1.41 | |
| 13 | 0.511 | 0.534 | 1.41 | |
| 14 | 0.534 | 0.547 | 1.41 | |
| 15 | 0.547 | 0.555 | | −2.00 |
| 16 | 0.555 | 0.576 | 1.41 | |
| 17 | 0.576 | 0.596 | 1.41 | |
| 18 | 0.596 | 0.616 | 1.41 | |
| 19 | 0.616 | 0.635 | 1.41 | |
| 20 | 0.635 | 0.654 | 1.41 | |
| 21 | 0.654 | 0.672 | 1.41 | |
| 22 | 0.672 | 0.680 | 1.41 | |
| 23 | 0.680 | 0.689 | | −2.00 |
| 24 | 0.689 | 0.707 | 1.41 | |
| 25 | 0.707 | 0.724 | 1.41 | |
| 26 | 0.724 | 0.741 | 1.41 | |
| 27 | 0.741 | 0.757 | 1.41 | |
| 28 | 0.757 | 0.773 | 1.41 | |
| 29 | 0.773 | 0.782 | 1.41 | |
| 30 | 0.782 | 0.789 | | −2.00 |
| 31 | 0.789 | 0.805 | 1.41 | |
| 32 | 0.805 | 0.820 | 1.41 | |
| 33 | 0.820 | 0.836 | 1.41 | |
| 34 | 0.836 | 0.851 | 1.41 | |
| 35 | 0.851 | 0.866 | 1.41 | |
| 36 | 0.866 | 0.868 | 1.41 | |
| 37 | 0.868 | 0.880 | | −2.00 |
| 38 | 0.880 | 0.895 | 1.41 | |
| 39 | 0.895 | 0.909 | 1.41 | |
| 40 | 0.909 | 0.923 | 1.41 | |
| 41 | 0.923 | 0.938 | 1.41 | |
| 42 | 0.938 | 0.941 | 1.41 | |
| 43 | 0.941 | 0.952 | | −2.00 |
| 44 | 0.952 | 0.965 | 1.41 | |
| 45 | 0.965 | 0.979 | 1.41 | |
| 46 | 0.979 | 0.993 | 1.41 | |
| 47 | 0.993 | 1.003 | 1.41 | |
| 48 | 1.003 | 1.006 | | −2.00 |
| 49 | 1.006 | 1.020 | 1.41 | |
| 50 | 1.020 | 1.033 | 1.41 | |
| 51 | 1.033 | 1.047 | 1.41 | |
| 52 | 1.047 | 1.058 | 1.41 | |
| 53 | 1.058 | 1.060 | | −2.00 |
| 54 | 1.060 | 1.073 | 1.41 | |
| 55 | 1.073 | 1.086 | 1.41 | |
| 56 | 1.086 | 1.100 | 1.41 | |
| 57 | 1.100 | 1.105 | 1.41 | |
| 58 | 1.105 | 1.113 | | −2.00 |
| 59 | 1.113 | 1.126 | 1.41 | |
| 60 | 1.126 | 1.135 | 1.41 | |

TABLE 13

Second Region (R2)

| Number | Hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 61 | 1.135 | 1.140 | | | −3.51 |
| 62 | 1.140 | 1.152 | 1.12 | | |
| 63 | 1.152 | 1.163 | 1.12 | | |
| 64 | 1.163 | 1.174 | 1.12 | | |
| 65 | 1.174 | 1.186 | 1.12 | | |
| 66 | 1.186 | 1.197 | 1.12 | | |

TABLE 13-continued

Second Region (R2)

| Number | Hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 67 | 1.197 | 1.208 | 1.12 | | |
| 68 | 1.208 | 1.219 | 1.12 | | |
| 69 | 1.219 | 1.230 | 1.12 | | |
| 70 | 1.230 | 1.241 | 1.12 | | |
| 71 | 1.241 | 1.252 | 1.12 | | |
| 72 | 1.252 | 1.263 | 1.12 | | |
| 73 | 1.263 | 1.274 | 1.12 | | |
| 74 | 1.274 | 1.285 | 1.12 | | |
| 75 | 1.285 | 1.296 | 1.12 | | |
| 76 | 1.296 | 1.306 | 1.12 | | |
| 77 | 1.306 | 1.317 | 1.12 | | |
| 78 | 1.317 | 1.328 | 1.12 | | |
| 79 | 1.328 | 1.339 | 1.12 | | |
| 80 | 1.339 | 1.350 | 1.12 | | |
| 81 | 1.350 | 1.354 | 1.12 | | |
| 82 | 1.354 | 1.360 | | −6.81 | |
| 83 | 1.360 | 1.371 | 1.12 | | |
| 84 | 1.371 | 1.382 | 1.12 | | |
| 85 | 1.382 | 1.393 | 1.12 | | |
| 86 | 1.393 | 1.404 | 1.12 | | |
| 87 | 1.404 | 1.415 | 1.12 | | |

TABLE 14

Third Region (R3)

| Number | Hmin | hmax | $\Delta OPD_{13}/\lambda 1$ | $\Delta OPD_{23}/\lambda 1$ |
|---|---|---|---|---|
| 88 | 1.415 | 1.419 | | −3.28 |
| 89 | 1.419 | 1.430 | −1.21 | |
| 90 | 1.430 | 1.441 | −1.21 | |
| 91 | 1.441 | 1.451 | −1.21 | |
| 92 | 1.451 | 1.460 | −1.21 | |
| 93 | 1.460 | 1.469 | −1.21 | |
| 94 | 1.469 | 1.477 | −1.21 | |
| 95 | 1.477 | 1.485 | −1.21 | |
| 96 | 1.485 | 1.493 | −1.21 | |
| 97 | 1.493 | 1.500 | −1.21 | |
| 98 | 1.500 | 1.507 | −1.21 | |
| 99 | 1.507 | 1.514 | −1.21 | |
| 100 | 1.514 | 1.521 | −1.21 | |
| 101 | 1.521 | 1.528 | −1.21 | |
| 102 | 1.528 | 1.534 | −1.21 | |
| 103 | 1.534 | 1.540 | −1.21 | |
| 104 | 1.540 | 1.546 | −1.21 | |
| 105 | 1.546 | 1.552 | −1.21 | |
| 106 | 1.552 | 1.558 | −1.21 | |
| 107 | 1.558 | 1.563 | −1.21 | |
| 108 | 1.563 | 1.569 | −1.21 | |
| 109 | 1.569 | 1.574 | −1.21 | |
| 110 | 1.574 | 1.579 | −1.21 | |
| 111 | 1.579 | 1.584 | −1.21 | |
| 112 | 1.584 | 1.589 | −1.21 | |
| 113 | 1.589 | 1.594 | −1.21 | |
| 114 | 1.594 | 1.599 | −1.21 | |
| 115 | 1.599 | 1.603 | −1.21 | |
| 116 | 1.603 | 1.608 | −1.21 | |
| 117 | 1.608 | 1.613 | −1.21 | |
| 118 | 1.613 | 1.617 | −1.21 | |
| 119 | 1.617 | 1.621 | −1.21 | |
| 120 | 1.621 | 1.626 | −1.21 | |
| 121 | 1.626 | 1.630 | −1.21 | |
| 122 | 1.630 | 1.634 | −1.21 | |
| 123 | 1.634 | 1.638 | −1.21 | |
| 124 | 1.638 | 1.642 | −1.21 | |
| 125 | 1.642 | 1.646 | −1.21 | |
| 126 | 1.646 | 1.650 | −1.21 | |
| 127 | 1.650 | 1.654 | −1.21 | |
| 128 | 1.654 | 1.658 | −1.21 | |
| 129 | 1.658 | 1.662 | −1.21 | |
| 130 | 1.662 | 1.665 | −1.21 | |
| 131 | 1.665 | 1.669 | −1.21 | |
| 132 | 1.669 | 1.673 | −1.21 | |
| 133 | 1.673 | 1.676 | −1.21 | |

TABLE 14-continued

Third Region (R3)

| Number | Hmin | hmax | $\Delta OPD_{13}/\lambda 1$ | $\Delta OPD_{23}/\lambda 1$ |
|---|---|---|---|---|
| 134 | 1.676 | 1.680 | −1.21 | |
| 135 | 1.680 | 1.683 | −1.21 | |
| 136 | 1.683 | 1.687 | −1.21 | |
| 137 | 1.687 | 1.690 | −1.21 | |
| 138 | 1.690 | 1.694 | −1.21 | |
| 139 | 1.694 | 1.697 | −1.21 | |
| 140 | 1.697 | 1.700 | −1.21 | |
| 141 | 1.700 | 1.703 | −1.21 | |
| 142 | 1.703 | 1.707 | −1.21 | |
| 143 | 1.707 | 1.710 | −1.21 | |
| 144 | 1.710 | 1.713 | −1.21 | |
| 145 | 1.713 | 1.716 | −1.21 | |
| 146 | 1.716 | 1.719 | −1.21 | |
| 147 | 1.719 | 1.722 | −1.21 | |
| 148 | 1.722 | 1.725 | −1.21 | |
| 149 | 1.725 | 1.728 | −1.21 | |
| 150 | 1.728 | 1.731 | −1.21 | |
| 151 | 1.731 | 1.734 | −1.21 | |
| 152 | 1.734 | 1.737 | −1.21 | |
| 153 | 1.737 | 1.740 | −1.21 | |
| 154 | 1.740 | 1.743 | −1.21 | |
| 155 | 1.743 | 1.746 | −1.21 | |
| 156 | 1.746 | 1.749 | −1.21 | |
| 157 | 1.749 | 1.751 | −1.21 | |
| 158 | 1.751 | 1.754 | −1.21 | |
| 159 | 1.754 | 1.757 | −1.21 | |
| 160 | 1.757 | 1.760 | −1.21 | |
| 161 | 1.760 | 1.762 | −1.21 | |
| 162 | 1.762 | 1.765 | −1.21 | |
| 163 | 1.765 | 1.768 | −1.21 | |
| 164 | 1.768 | 1.770 | −1.21 | |
| 165 | 1.770 | 1.773 | −1.21 | |
| 166 | 1.773 | 1.775 | −1.21 | |
| 167 | 1.775 | 1.778 | −1.21 | |
| 168 | 1.778 | 1.780 | −1.21 | |
| 169 | 1.780 | 1.783 | −1.21 | |
| 170 | 1.783 | 1.785 | −1.21 | |
| 171 | 1.785 | 1.788 | −1.21 | |
| 172 | 1.788 | 1.790 | −1.21 | |
| 173 | 1.790 | 1.793 | −1.21 | |
| 174 | 1.793 | 1.795 | −1.21 | |
| 175 | 1.795 | 1.798 | −1.21 | |
| 176 | 1.798 | 1.800 | −1.21 | |
| 177 | 1.800 | 1.803 | −1.21 | |
| 178 | 1.803 | 1.805 | −1.21 | |
| 179 | 1.805 | 1.807 | −1.21 | |
| 180 | 1.807 | 1.810 | −1.21 | |
| 181 | 1.810 | 1.812 | −1.21 | |
| 182 | 1.812 | 1.814 | −1.21 | |
| 183 | 1.814 | 1.816 | −1.21 | |
| 184 | 1.816 | 1.819 | −1.21 | |
| 185 | 1.819 | 1.821 | −1.21 | |
| 186 | 1.821 | 1.823 | −1.21 | |
| 187 | 1.823 | 1.825 | −1.21 | |
| 188 | 1.825 | 1.828 | −1.21 | |
| 189 | 1.828 | 1.830 | −1.21 | |
| 190 | 1.830 | 1.832 | −1.21 | |
| 191 | 1.832 | 1.834 | −1.21 | |
| 192 | 1.834 | 1.836 | −1.21 | |
| 193 | 1.836 | 1.839 | −1.21 | |
| 194 | 1.839 | 1.841 | −1.21 | |
| 195 | 1.841 | 1.843 | −1.21 | |
| 196 | 1.843 | 1.845 | −1.21 | |
| 197 | 1.845 | 1.847 | −1.21 | |
| 198 | 1.847 | 1.849 | −1.21 | |
| 199 | 1.849 | 1.851 | −1.21 | |
| 200 | 1.851 | 1.853 | −1.21 | |
| 201 | 1.853 | 1.855 | −1.21 | |
| 202 | 1.855 | 1.857 | −1.21 | |
| 203 | 1.857 | 1.859 | −1.21 | |
| 204 | 1.859 | 1.861 | −1.21 | |
| 205 | 1.861 | 1.863 | −1.21 | |
| 206 | 1.863 | 1.865 | −1.21 | |
| 207 | 1.865 | 1.867 | −1.21 | |
| 208 | 1.867 | 1.870 | −1.21 | |

Third Example

Hereafter, a third example of the optical information recording/reproducing apparatus 100 is described. The specifications of the objective lens 10 mounted on the optical information recording/reproducing apparatus 100 according to the third example are indicated in the following Table 15.

TABLE 15

|  | $1^{st}$ laser beam | $2^{nd}$ laser beam | $3^{rd}$ laser beam |
|---|---|---|---|
| Wavelength (nm) | 405 | 660 | 790 |
| Focal Length (mm) | 2.60 | 2.78 | 2.83 |
| NA | 0.85 | 0.60 | 0.47 |
| Magnification M | 0.000 | 0.000 | 0.000 |

Figure 10A:
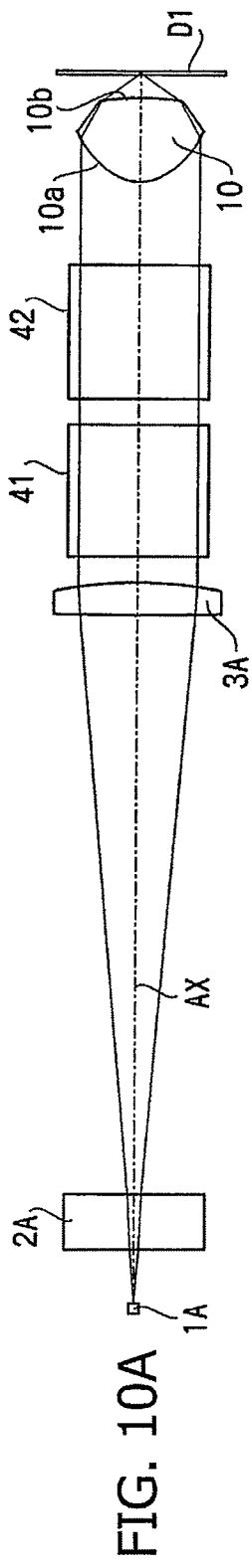
FIGS. 10A to 10C illustrate developed optical paths respectively defined for the first to third optical discs in the optical information recording/reproducing apparatus according to a third example.
Figure 10B:
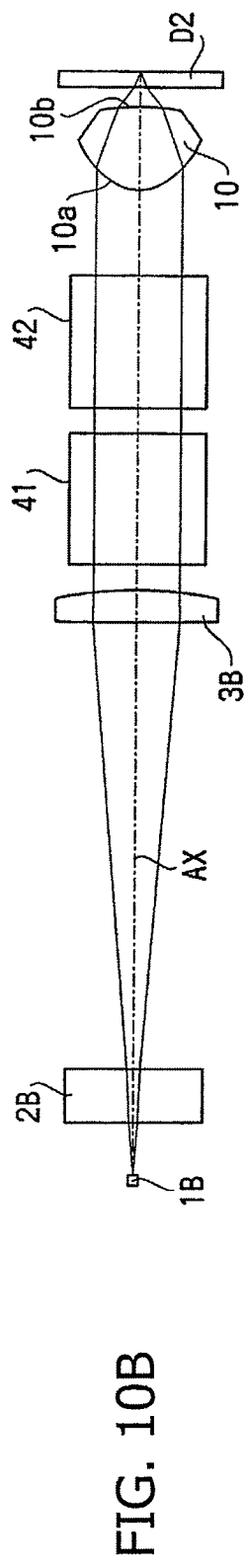
Figure 10C:
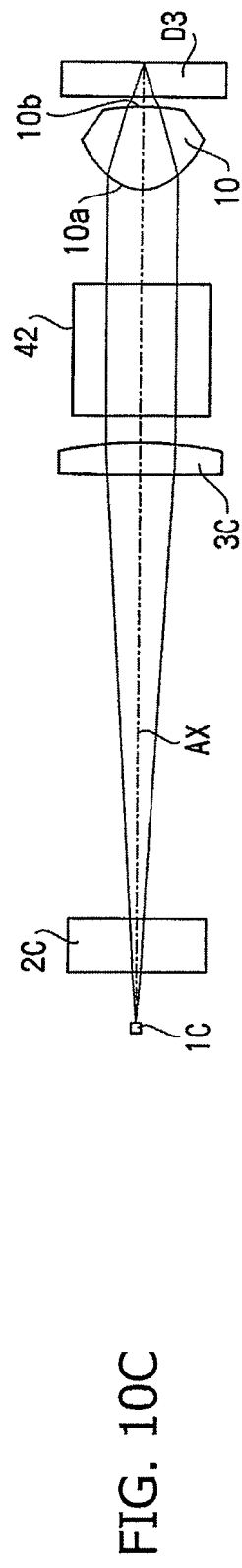

In the third example, the numerical configuration of optical elements arranged on an optical path along which each laser beam proceeds from the light source to the optical disc is shown. FIG. 10A illustrates a developed optical path defined when the optical disc D1 is used, FIG. 10B illustrates a developed optical path defined when the optical disc D2 is used, and FIG. 10C illustrates a developed optical path defined when the optical disc D3 is used. The numerical configurations of the optical elements arranged on the respective optical paths are shown in the following Tables 16 to 18. Specifically, Table 16 shows the numerical configuration defined when the optical disc D1 is used, Table 17 shows the numerical configuration defined when the optical disc D2 is used, and Table 18 shows the numerical configuration defined when the optical disc D3 is used. In each of Tables 17 to 19, the surfaces numbers correspond to optical surfaces of the optical elements shown in the rightmost column. It should be noted that the first surface 10a and the second surface 10b of the objective lens are defined as surfaces #9 and #10, respectively, in Tables 16 and 17, and are defined as surfaces #7 and #8, respectively, in Table 18. This is because the number of optical surfaces is different between the case where the optical disc D1 or D2 is used and the case where the optical disc D3 is used.

TABLE 16

| Surface No. | r | d | n(405 nm) | |
|---|---|---|---|---|
| 0 | ∞ | 1.98 | | Light Source 1A |
| 1 | ∞ | 2.00 | 1.52972 | Diffraction Grating 2A |
| 2 | ∞ | 22.00 | | |
| 3 | 140.000 | 1.20 | 1.52469 | Coupling Lens 3A |
| 4 | −15.070 | 1.00 | | |
| 5 | ∞ | 5.00 | 1.52972 | Beam Splitter 41 |
| 6 | ∞ | 1.00 | | |
| 7 | ∞ | 5.00 | 1.52972 | Beam Splitter 42 |
| 8 | ∞ | 3.00 | | |
| 9($1^{st}$ region) | 1.671 | 3.15 | 1.56023 | Objective Lens 10 |
| 9($2^{nd}$ region) | 1.605 | | | |
| 9($3^{rd}$ region) | 1.594 | | | |
| 10 | −3.167 | 0.85 | | |
| 11 | ∞ | 0.0875 | 1.62231 | Optical Disc D1 |
| 12 | ∞ | — | | |

TABLE 17

| Surface No. | r | d | n(405 nm) | |
|---|---|---|---|---|
| 0 | ∞ | 1.97 | | Light Source 1B |
| 1 | ∞ | 2.00 | 1.51374 | Diffraction Grating 2B |
| 2 | ∞ | 17.00 | | |
| 3 | 129.400 | 1.20 | 1.54044 | Coupling Lens 3B |
| 4 | −12.400 | 1.00 | | |
| 5 | ∞ | 5.00 | 1.51374 | Beam Splitter 41 |
| 6 | ∞ | 1.00 | | |
| 7 | ∞ | 5.00 | 1.51374 | Beam Splitter 42 |
| 8 | ∞ | 3.10 | | |
| 9($1^{st}$ region) | 1.671 | 3.15 | 1.54044 | Objective Lens 10 |
| 9($2^{nd}$ region) | 1.605 | | | |
| 9($3^{rd}$ region) | 1.594 | | | |
| 10 | −3.167 | 0.75 | | |
| 11 | ∞ | 0.60 | 1.57961 | Optical Disc D2 |
| 12 | ∞ | | | |

TABLE 18

| Surface No. | R | d | n(790 nm) | |
|---|---|---|---|---|
| 0 | ∞ | 1.96 | | Light Source 1C |
| 1 | ∞ | 2.00 | 1.51052 | Diffraction Grating 2C |
| 2 | ∞ | 17.00 | | |
| 3 | 124.100 | 1.20 | 1.53653 | Coupling Lens 3C |
| 4 | −12.350 | 1.00 | | |
| 5 | ∞ | 5.00 | 1.51052 | Beam Splitter 42 |
| 6 | ∞ | 0.42 | | |
| 7($1^{st}$ region) | 1.671 | 3.15 | 1.53653 | Objective Lens 10 |
| 7($2^{nd}$ region) | 1.605 | | | |
| 7($3^{rd}$ region) | 1.594 | | | |
| 8 | −3.167 | 0.43 | | |
| 9 | ∞ | 1.20 | 1.57307 | Optical Disc D3 |
| 10 | ∞ | — | | |

Each of a second surface (surface #4) of the coupling lens (3A, 3B, 3C), the first surface 10a and the second surface 10b of the objective lens 10 is an aspherical surface. The following Tables 19 to 21 show the conical coefficients κ and aspherical coefficients $A_4, A_6 \ldots$ of each aspherical surface. Specifically, Table 19 shows the coefficients defined when the optical disc D1 is used, Table 20 shows the coefficients defined when the optical disc D2 is used, and Table 21 shows the coefficients defined when the optical disc D3 is used. Since the configuration of the objective lens 10 is common to all of the Tables 19 to 20, the coefficients of the first and second surfaces 10a and 10b shown in Table 19 are omitted in Tables 20 and 21.

TABLE 19

| | κ | A4 | A6 | A8 | A10 | A12 | A14 |
|---|---|---|---|---|---|---|---|
| 4 | 0.0000 | 2.6540E−05 | 8.6800E−08 | 2.4300E−10 | 0.0000E+00 | 0.0000E+00 | 0.0000E+00 |
| 9($1^{st}$ region) | −0.7500 | 1.3410E−03 | 1.7250E−03 | −5.9300E−04 | 1.0670E−04 | −1.9309E−05 | 0.0000E+00 |
| 9($2^{nd}$ region) | −0.7500 | −1.5590E−02 | 7.5990E−03 | −1.5520E−03 | 2.3830E−04 | −3.6004E−05 | 0.0000E+00 |
| 9($3^{rd}$ region) | −0.7500 | −9.7930E−03 | 2.7650E−03 | −7.8540E−04 | 2.1080E−04 | −2.1673E−05 | 0.0000E+00 |

TABLE 19-continued

| 10 | 0.0000 | 1.4940E-01 | -1.3600E-01 | 1.4840E-01 | -1.3500E-01 | 7.9640E-02 | -2.6232E-02 |
|---|---|---|---|---|---|---|---|
| | | A16 | A18 | A20 | A22 | A24 | |
| | 4 | 0.0000E+00 | 0.0000E+00 | 0.0000E+00 | 0.0000E+00 | 0.0000E+00 | |
| | 9($1^{st}$ region) | 0.0000E+00 | 0.0000E+00 | 0.0000E+00 | 0.0000E+00 | 0.0000E+00 | |
| | 9($2^{nd}$ region) | 0.0000E+00 | 0.0000E+00 | 0.0000E+00 | 0.0000E+00 | 0.0000E+00 | |
| | 9($3^{rd}$ region) | 0.0000E+00 | 0.0000E+00 | 0.0000E+00 | 0.0000E+00 | 0.0000E+00 | |
| | 10 | 2.9634E-03 | 8.1022E-04 | -2.8801E-04 | 2.4912E-05 | 0.0000E+00 | |

TABLE 20

| κ | A4 | A6 | A8 | A10 | A12 | A14 |
|---|---|---|---|---|---|---|
| 4 | 0.0000 | 4.6580E-05 | 2.2680E-07 | 9.4710E-10 | 0.0000E+00 | 0.0000E+00 | 0.0000E+00 |
| | | A16 | A18 | A20 | A22 | A24 |
| | 4 | 0.0000E+00 | 0.0000E+00 | 0.0000E+00 | 0.0000E+00 | 0.0000E+00 |

TABLE 21

| κ | A4 | A6 | A8 | A10 | A12 | A14 |
|---|---|---|---|---|---|---|
| 4 | 0.0000 | 4.7400E-05 | 2.3240E-07 | 1.0500E-09 | 0.0000E+00 | 0.0000E+00 | 0.0000E+00 |
| | | A16 | A18 | A20 | A22 | A24 |
| | 4 | 0.0000E+00 | 0.0000E+00 | 0.0000E+00 | 0.0000E+00 | 0.0000E+00 |

On the first surface 10a of the objective lens 10 according to the third example, the regions R1, R2 and R3 are formed in the ranges of height h from the optical axis (i.e., the effective radius) indicated below.

Region R1: $0.000 \leq h \leq 1.330$
Region R2: $1.330 \leq h \leq 1.670$
Region R3: $1.670 < h \leq 2.210$ The functions of the regions R1 to R3 are the same in quality as those shown in the first example. The following Table 22 shows coefficients of the optical path difference functions respectively defining the diffraction structures in the regions R1, R2 and R3 on the first surface 10a of the objective lens 10. The following Table 23 shows the BD use diffraction order, the DVD use diffraction order, the CD use diffraction order and the blazed wavelengths.

TABLE 22

| | P2 | P4 | P6 | P8 | P10 | P12 |
|---|---|---|---|---|---|---|
| $1^{st}$ region(1) | 3.5003E+01 | -1.1050E+00 | -9.9340E-02 | -9.5010E-02 | 0.0000E+00 | 0.0000E+00 |
| $1^{st}$ region(2) | -9.9985E+00 | -2.3840E+00 | 8.3510E-01 | -2.6900E-01 | 0.0000E+00 | 0.0000E+00 |
| $2^{nd}$ region(1) | 3.9152E+01 | -1.3230E+00 | -3.4700E-02 | -5.1810E-02 | 0.0000E+00 | 0.0000E+00 |
| $2^{nd}$ region(2) | -1.0180E+00 | -3.8800E+00 | 1.4180E+00 | -2.1890E-01 | 0.0000E+00 | 0.0000E+00 |
| $3^{rd}$ region | 3.5000E+01 | -2.0270E+01 | 2.6550E+00 | -2.5030E-01 | 0.0000E+00 | 0.0000E+00 |

TABLE 23

| | $1^{st}$ Laser Beam | $2^{nd}$ Laser Beam | $3^{rd}$ Laser Beam | Blazed Wavelength (nm) | hmax |
|---|---|---|---|---|---|
| 1($1^{st}$ region)(1) | 1 | 1 | 1 | 430 | 1.330 |
| 1($1^{st}$ region)(2) | 2 | 1 | 1 | 380 | |
| 1($2^{nd}$ region)(2) | 1 | 1 | 1 | 500 | 1.670 |
| 1($2^{nd}$ region)(2) | 7 | 4 | — | 395 | |
| 1($3^{rd}$ region) | 1 | — | — | 405 | 2.210 |

The following Tables 24 to 26 show the concrete configurations of the annular zone structures formed in the regions R1 to R3. In the third example, the region R1 has three types of steps, the region R2 has four types of steps, and the region R3 has two types of steps. The third step in each of the regions R1 and R2 is formed by adding together the first and second steps because the first and second steps are extremely close to each other at the position of the third step. The fourth step in the region R2 corresponds to a step at a boundary position between the regions R1 and R2, and the second step in the region R3 corresponds to a step at a boundary position between the regions R2 and R3. The fact that each of the third step in the region R1, the third and fourth steps in the region R2 and the second step in the region R3 is different from the other steps in the corresponding region has no effect on change of the diffraction efficiency. Therefore, numeric values for representing the third step in the region R1, the third and fourth steps in the region R2 and the second step of the region R3 as the diffraction structures are not shown in Tables 22 and 23.

TABLE 24

First Region (R1)

| Number | hmin | hmax | $\Delta OPD_{11}/\lambda 1$ | $\Delta OPD_{21}/\lambda 1$ | $\Delta OPD_{31}/\lambda 1$ |
|---|---|---|---|---|---|
| 0 | 0.000 | 0.120 | | | |
| 1 | 0.120 | 0.207 | 1.07 | | |
| 2 | 0.207 | 0.222 | 1.07 | | |
| 3 | 0.222 | 0.268 | | −1.86 | |
| 4 | 0.268 | 0.317 | 1.07 | | |
| 5 | 0.317 | 0.359 | 1.07 | | |
| 6 | 0.359 | 0.381 | 1.07 | | |
| 7 | 0.381 | 0.397 | | −1.86 | |
| 8 | 0.397 | 0.432 | 1.07 | | |
| 9 | 0.432 | 0.465 | 1.07 | | |
| 10 | 0.465 | 0.487 | 1.07 | | |
| 11 | 0.487 | 0.495 | | −1.86 | |
| 12 | 0.495 | 0.523 | 1.07 | | |
| 13 | 0.523 | 0.550 | 1.07 | | |
| 14 | 0.550 | 0.572 | 1.07 | | |
| 15 | 0.572 | 0.576 | | −1.86 | |
| 16 | 0.576 | 0.601 | 1.07 | | |
| 17 | 0.601 | 0.625 | 1.07 | | |
| 18 | 0.625 | 0.644 | 1.07 | | |
| 19 | 0.644 | 0.648 | | −1.86 | |
| 20 | 0.648 | 0.670 | 1.07 | | |
| 21 | 0.670 | 0.692 | 1.07 | | |
| 22 | 0.692 | 0.707 | 1.07 | | |
| 23 | 0.707 | 0.713 | | −1.86 | |
| 24 | 0.713 | 0.734 | 1.07 | | |
| 25 | 0.734 | 0.754 | 1.07 | | |
| 26 | 0.754 | 0.763 | 1.07 | | |
| 27 | 0.763 | 0.773 | | −1.86 | |
| 28 | 0.773 | 0.792 | 1.07 | | |
| 29 | 0.792 | 0.811 | 1.07 | | |
| 30 | 0.811 | 0.815 | 1.07 | | |
| 31 | 0.815 | 0.829 | | −1.86 | |
| 32 | 0.829 | 0.847 | 1.07 | | |
| 33 | 0.847 | 0.863 | 1.07 | | |
| 34 | 0.863 | 0.865 | | −1.86 | |
| 35 | 0.865 | 0.882 | 1.07 | | |
| 36 | 0.882 | 0.899 | 1.07 | | |
| 37 | 0.899 | 0.907 | 1.07 | | |
| 38 | 0.907 | 0.916 | | −1.86 | |
| 39 | 0.916 | 0.933 | 1.07 | | |
| 40 | 0.933 | 0.949 | 1.07 | | |
| 41 | 0.949 | 0.965 | | | −0.74 |
| 42 | 0.965 | 0.981 | 1.07 | | |
| 43 | 0.981 | 0.988 | 1.07 | | |
| 44 | 0.988 | 0.997 | | −1.86 | |
| 45 | 0.997 | 1.012 | 1.07 | | |
| 46 | 1.012 | 1.025 | 1.07 | | |
| 47 | 1.025 | 1.028 | | −1.86 | |
| 48 | 1.028 | 1.043 | 1.07 | | |
| 49 | 1.043 | 1.058 | 1.07 | | |
| 50 | 1.058 | 1.060 | 1.07 | | |
| 51 | 1.060 | 1.073 | | −1.86 | |
| 52 | 1.073 | 1.087 | 1.07 | | |
| 53 | 1.087 | 1.094 | 1.07 | | |
| 54 | 1.094 | 1.102 | | −1.86 | |
| 55 | 1.102 | 1.117 | 1.07 | | |
| 56 | 1.117 | 1.126 | 1.07 | | |
| 57 | 1.126 | 1.131 | | −1.86 | |
| 58 | 1.131 | 1.145 | 1.07 | | |
| 59 | 1.145 | 1.156 | 1.07 | | |
| 60 | 1.156 | 1.159 | | −1.86 | |
| 61 | 1.159 | 1.173 | 1.07 | | |
| 62 | 1.173 | 1.186 | 1.07 | | |
| 63 | 1.186 | 1.187 | | −1.86 | |
| 64 | 1.187 | 1.201 | 1.07 | | |
| 65 | 1.201 | 1.214 | 1.07 | | |
| 66 | 1.214 | 1.215 | | −1.86 | |
| 67 | 1.215 | 1.229 | 1.07 | | |
| 68 | 1.229 | 1.241 | 1.07 | | |
| 69 | 1.241 | 1.243 | | −1.86 | |
| 70 | 1.243 | 1.256 | 1.07 | | |
| 71 | 1.256 | 1.266 | 1.07 | | |
| 72 | 1.266 | 1.270 | | −1.86 | |
| 73 | 1.270 | 1.283 | 1.07 | | |
| 74 | 1.283 | 1.291 | 1.07 | | |
| 75 | 1.291 | 1.297 | | −1.86 | |
| 76 | 1.297 | 1.310 | 1.07 | | |
| 77 | 1.310 | 1.315 | 1.07 | | |
| 78 | 1.315 | 1.330 | | −1.86 | |

TABLE 25

Second Region (R2)

| Number | Hmin | hmax | $\Delta OPD_{12}/\lambda 1$ | $\Delta OPD_{22}/\lambda 1$ | $\Delta OPD_{32}/\lambda 1$ | $\Delta OPD_{42}/\lambda 1$ |
|---|---|---|---|---|---|---|
| 79 | 1.330 | 1.342 | | | | −3.90 |
| 80 | 1.342 | 1.354 | 1.26 | | | |
| 81 | 1.354 | 1.365 | | | −5.55 | |
| 82 | 1.365 | 1.376 | 1.26 | | | |
| 83 | 1.376 | 1.387 | 1.26 | | | |
| 84 | 1.387 | 1.399 | 1.26 | | | |
| 85 | 1.399 | 1.410 | 1.26 | | | |
| 86 | 1.410 | 1.421 | | | −5.55 | |
| 87 | 1.421 | 1.432 | 1.26 | | | |
| 88 | 1.432 | 1.443 | 1.26 | | | |
| 89 | 1.443 | 1.454 | 1.26 | | | |
| 90 | 1.454 | 1.463 | 1.26 | | | |
| 91 | 1.463 | 1.465 | | −6.81 | | |
| 92 | 1.465 | 1.476 | 1.26 | | | |
| 93 | 1.476 | 1.487 | 1.26 | | | |
| 94 | 1.487 | 1.498 | 1.26 | | | |
| 95 | 1.498 | 1.509 | 1.26 | | | |
| 96 | 1.509 | 1.512 | 1.26 | | | |
| 97 | 1.512 | 1.520 | | −6.81 | | |
| 98 | 1.520 | 1.531 | 1.26 | | | |
| 99 | 1.531 | 1.542 | 1.26 | | | |
| 100 | 1.542 | 1.553 | 1.26 | | | |
| 101 | 1.553 | 1.558 | 1.26 | | | |
| 102 | 1.558 | 1.564 | | −6.81 | | |
| 103 | 1.564 | 1.575 | 1.26 | | | |
| 104 | 1.575 | 1.586 | 1.26 | | | |
| 105 | 1.586 | 1.597 | 1.26 | | | |
| 106 | 1.597 | 1.600 | 1.26 | | | |
| 107 | 1.600 | 1.608 | | −6.81 | | |
| 108 | 1.608 | 1.619 | 1.26 | | | |
| 109 | 1.619 | 1.631 | 1.26 | | | |
| 110 | 1.631 | 1.639 | 1.26 | | | |
| 111 | 1.639 | 1.642 | | −6.81 | | |
| 112 | 1.642 | 1.653 | 1.26 | | | |
| 113 | 1.653 | 1.664 | 1.26 | | | |
| 114 | 1.664 | 1.670 | 1.26 | | | |

TABLE 26

Third Region (R3)

| Number | Hmin | hmax | $\Delta OPD_{13}/\lambda 1$ | $\Delta OPD_{23}/\lambda 1$ |
|---|---|---|---|---|
| 115 | 1.670 | 1.661 | | −4.10 |
| 116 | 1.661 | 1.669 | −1.00 | |
| 117 | 1.669 | 1.677 | −1.00 | |
| 118 | 1.677 | 1.685 | −1.00 | |
| 119 | 1.685 | 1.692 | −1.00 | |
| 120 | 1.692 | 1.700 | −1.00 | |
| 121 | 1.700 | 1.707 | −1.00 | |
| 122 | 1.707 | 1.714 | −1.00 | |
| 123 | 1.714 | 1.721 | −1.00 | |

TABLE 26-continued

Third Region (R3)

| Number | Hmin | hmax | $\Delta OPD_{13}/\lambda 1$ | $\Delta OPD_{23}/\lambda 1$ |
|---|---|---|---|---|
| 124 | 1.721 | 1.728 | −1.00 | |
| 125 | 1.728 | 1.735 | −1.00 | |
| 126 | 1.735 | 1.742 | −1.00 | |
| 127 | 1.742 | 1.749 | −1.00 | |
| 128 | 1.749 | 1.755 | −1.00 | |
| 129 | 1.755 | 1.762 | −1.00 | |
| 130 | 1.762 | 1.768 | −1.00 | |
| 131 | 1.768 | 1.775 | −1.00 | |
| 132 | 1.775 | 1.781 | −1.00 | |
| 133 | 1.781 | 1.787 | −1.00 | |
| 134 | 1.787 | 1.793 | −1.00 | |
| 135 | 1.793 | 1.799 | −1.00 | |
| 136 | 1.799 | 1.805 | −1.00 | |
| 137 | 1.805 | 1.811 | −1.00 | |
| 138 | 1.811 | 1.817 | −1.00 | |
| 139 | 1.817 | 1.822 | −1.00 | |
| 140 | 1.822 | 1.828 | −1.00 | |
| 141 | 1.828 | 1.833 | −1.00 | |
| 142 | 1.833 | 1.839 | −1.00 | |
| 143 | 1.839 | 1.844 | −1.00 | |
| 144 | 1.844 | 1.850 | −1.00 | |
| 145 | 1.850 | 1.855 | −1.00 | |
| 146 | 1.855 | 1.860 | −1.00 | |
| 147 | 1.860 | 1.866 | −1.00 | |
| 148 | 1.866 | 1.871 | −1.00 | |
| 149 | 1.871 | 1.876 | −1.00 | |
| 150 | 1.876 | 1.881 | −1.00 | |
| 151 | 1.881 | 1.886 | −1.00 | |
| 152 | 1.886 | 1.891 | −1.00 | |
| 153 | 1.891 | 1.896 | −1.00 | |
| 154 | 1.896 | 1.900 | −1.00 | |
| 155 | 1.900 | 1.905 | −1.00 | |
| 156 | 1.905 | 1.910 | −1.00 | |
| 157 | 1.910 | 1.915 | −1.00 | |
| 158 | 1.915 | 1.919 | −1.00 | |
| 159 | 1.919 | 1.924 | −1.00 | |
| 160 | 1.924 | 1.928 | −1.00 | |
| 161 | 1.928 | 1.933 | −1.00 | |
| 162 | 1.933 | 1.937 | −1.00 | |
| 163 | 1.937 | 1.942 | −1.00 | |
| 164 | 1.942 | 1.946 | −1.00 | |
| 165 | 1.946 | 1.951 | −1.00 | |
| 166 | 1.951 | 1.955 | −1.00 | |
| 167 | 1.955 | 1.959 | −1.00 | |
| 168 | 1.959 | 1.963 | −1.00 | |
| 169 | 1.963 | 1.968 | −1.00 | |
| 170 | 1.968 | 1.972 | −1.00 | |
| 171 | 1.972 | 1.976 | −1.00 | |
| 172 | 1.976 | 1.980 | −1.00 | |
| 173 | 1.980 | 1.984 | −1.00 | |
| 174 | 1.984 | 1.988 | −1.00 | |
| 175 | 1.988 | 1.992 | −1.00 | |
| 176 | 1.992 | 1.996 | −1.00 | |
| 177 | 1.996 | 2.000 | −1.00 | |
| 178 | 2.000 | 2.004 | −1.00 | |
| 179 | 2.004 | 2.008 | −1.00 | |
| 180 | 2.008 | 2.012 | −1.00 | |
| 181 | 2.012 | 2.016 | −1.00 | |
| 182 | 2.016 | 2.019 | −1.00 | |
| 183 | 2.019 | 2.023 | −1.00 | |
| 184 | 2.023 | 2.027 | −1.00 | |
| 185 | 2.027 | 2.030 | −1.00 | |
| 186 | 2.030 | 2.034 | −1.00 | |
| 187 | 2.034 | 2.038 | −1.00 | |
| 188 | 2.038 | 2.041 | −1.00 | |
| 189 | 2.041 | 2.045 | −1.00 | |
| 190 | 2.045 | 2.049 | −1.00 | |
| 191 | 2.049 | 2.052 | −1.00 | |
| 192 | 2.052 | 2.056 | −1.00 | |
| 193 | 2.056 | 2.059 | −1.00 | |
| 194 | 2.059 | 2.062 | −1.00 | |
| 195 | 2.062 | 2.066 | −1.00 | |
| 196 | 2.066 | 2.069 | −1.00 | |
| 197 | 2.069 | 2.073 | −1.00 | |
| 198 | 2.073 | 2.076 | −1.00 | |
| 199 | 2.076 | 2.079 | −1.00 | |
| 200 | 2.079 | 2.083 | −1.00 | |
| 201 | 2.083 | 2.086 | −1.00 | |
| 202 | 2.086 | 2.089 | −1.00 | |
| 203 | 2.089 | 2.093 | −1.00 | |
| 204 | 2.093 | 2.096 | −1.00 | |
| 205 | 2.096 | 2.099 | −1.00 | |
| 206 | 2.099 | 2.102 | −1.00 | |
| 207 | 2.102 | 2.105 | −1.00 | |
| 208 | 2.105 | 2.108 | −1.00 | |
| 209 | 2.108 | 2.112 | −1.00 | |
| 210 | 2.112 | 2.115 | −1.00 | |
| 211 | 2.115 | 2.118 | −1.00 | |
| 212 | 2.118 | 2.121 | −1.00 | |
| 213 | 2.121 | 2.124 | −1.00 | |
| 214 | 2.124 | 2.127 | −1.00 | |
| 215 | 2.127 | 2.130 | −1.00 | |
| 216 | 2.130 | 2.133 | −1.00 | |
| 217 | 2.133 | 2.136 | −1.00 | |
| 218 | 2.136 | 2.139 | −1.00 | |
| 219 | 2.139 | 2.142 | −1.00 | |
| 220 | 2.142 | 2.145 | −1.00 | |
| 221 | 2.145 | 2.147 | −1.00 | |
| 222 | 2.147 | 2.150 | −1.00 | |
| 223 | 2.150 | 2.153 | −1.00 | |
| 224 | 2.153 | 2.156 | −1.00 | |
| 225 | 2.156 | 2.159 | −1.00 | |
| 226 | 2.159 | 2.162 | −1.00 | |
| 227 | 2.162 | 2.164 | −1.00 | |
| 228 | 2.164 | 2.167 | −1.00 | |
| 229 | 2.167 | 2.170 | −1.00 | |
| 230 | 2.170 | 2.173 | −1.00 | |
| 231 | 2.173 | 2.175 | −1.00 | |
| 232 | 2.175 | 2.178 | −1.00 | |
| 233 | 2.178 | 2.181 | −1.00 | |
| 234 | 2.181 | 2.184 | −1.00 | |
| 235 | 2.184 | 2.186 | −1.00 | |
| 236 | 2.186 | 2.189 | −1.00 | |
| 237 | 2.189 | 2.191 | −1.00 | |
| 238 | 2.191 | 2.194 | −1.00 | |
| 239 | 2.194 | 2.197 | −1.00 | |
| 240 | 2.197 | 2.199 | −1.00 | |
| 241 | 2.199 | 2.202 | −1.00 | |
| 242 | 2.202 | 2.204 | −1.00 | |
| 243 | 2.204 | 2.207 | −1.00 | |
| 244 | 2.207 | 2.210 | −1.00 | |

Fourth Example

Figure 11:
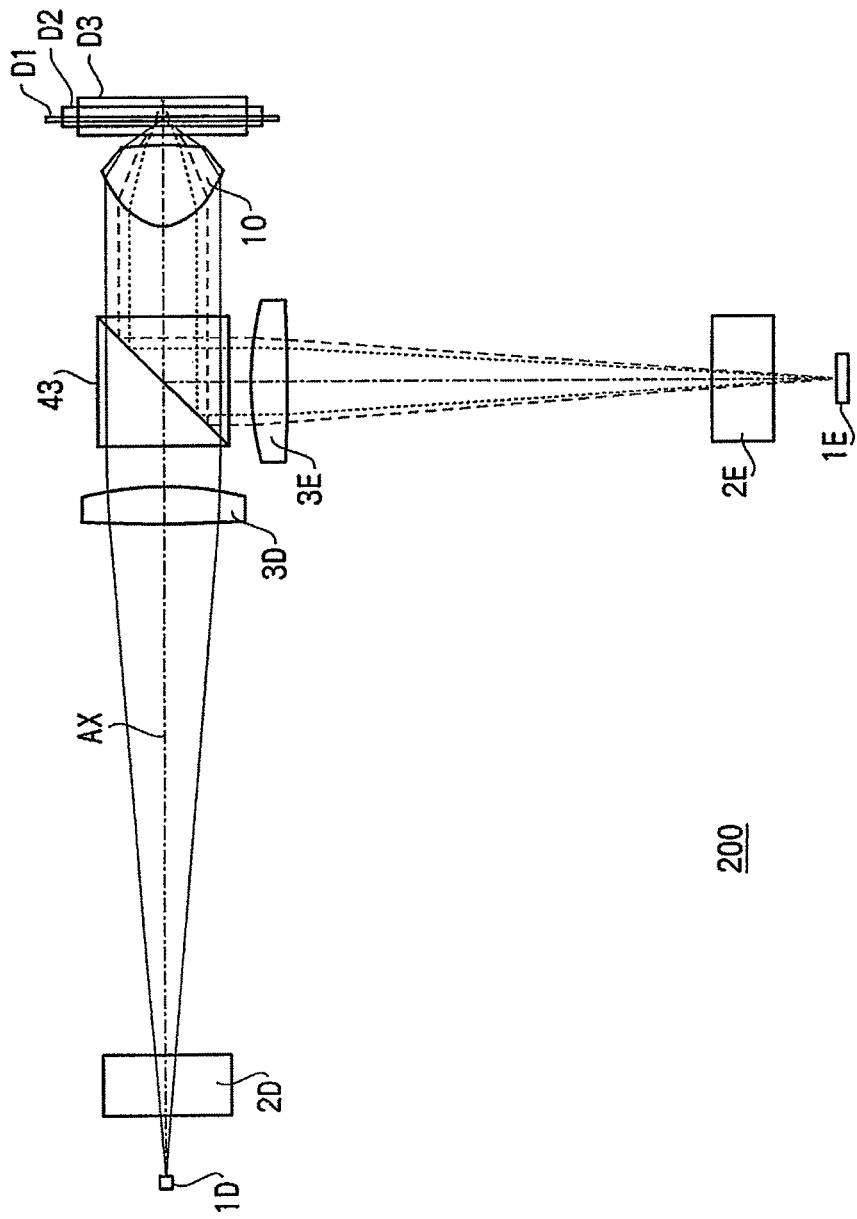
FIG. 11 is a block diagram generally illustrating a configuration of the optical information recording/reproducing apparatus according to a fourth example.

Hereafter, a fourth example of the optical information recording/reproducing apparatus is described. FIG. 11 is a block diagram generally illustrating a configuration of an optical information recording/reproducing apparatus 200 according to the fourth example. The optical information recording/reproducing apparatus 200 includes a light source 1D which emits a laser beam having the wavelength λ1, a light source 1E which emits the laser beams having the wavelengths λ2 and λ3, the diffraction gratings 2D and 2E, the coupling lenses 3D and 3E, the beam splitter 43, and the objective lens 10. In FIG. 11, a chain line represents the reference axis AX of the optical information recording/reproducing apparatus 200. In FIG. 11, a laser beam indicated by a solid line is the lease beam having the wavelength λ1, a laser beam indicated by a dashed line is the laser beam having the wavelength λ2, and a laser beam indicated by a dotted line is the laser beam having the wavelength λ3.

Figure 12A:
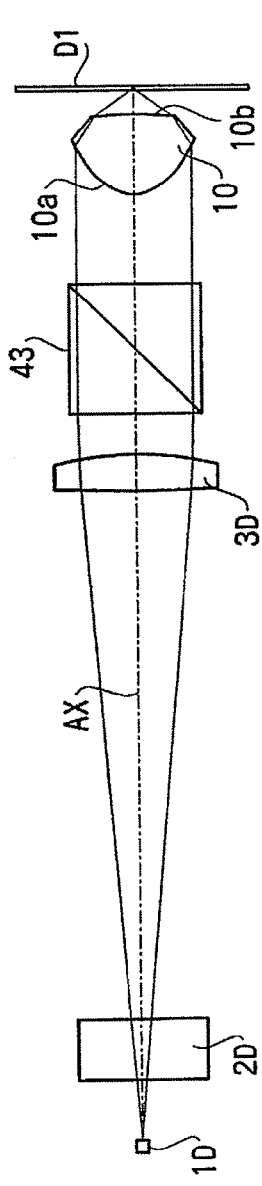
FIGS. 12A to 12C illustrate developed optical paths respectively defined for the first to third optical discs in the optical information recording/reproducing apparatus according to the fourth example.
Figure 12B:
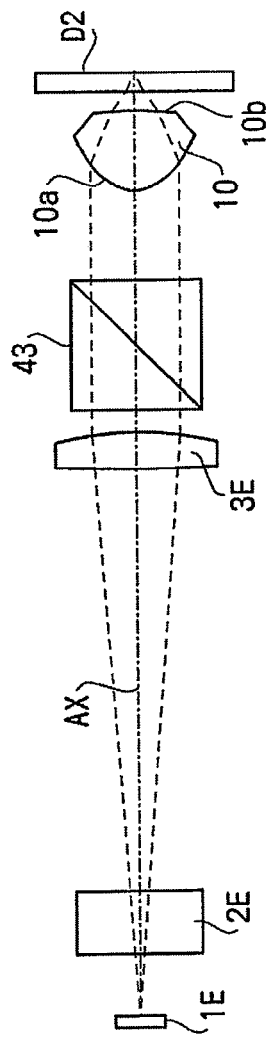
Figure 12C:
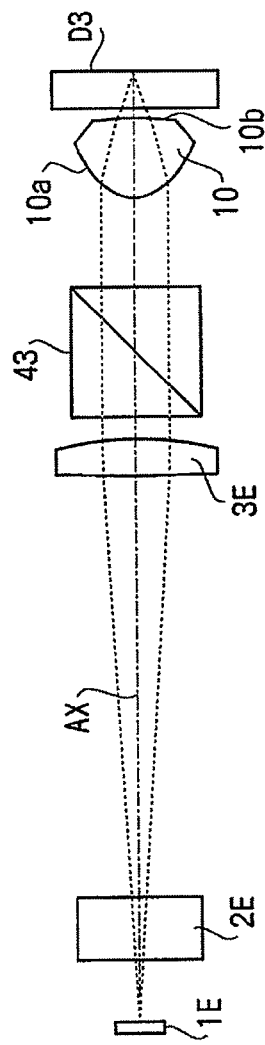

FIGS. 12A to 12C show developed optical paths in the optical information recording/reproducing apparatus 200 according to the fourth example. Specifically, FIG. 12A illustrates a developed optical path defined when the optical disc D1 is used, FIG. 12B illustrates a developed optical path defined when the optical disc D2 is used, and FIG. 12C illustrates a developed optical path defined when the optical disc D3 is used. As shown in FIG. 12A, the laser beam having the wavelength λ1 emitted by the light source 1D passes through a coupling lens 3D, a beam splitter 43 and the objective lens 10, and is converged at the vicinity of the recording surface of the optical disc D1. As shown in FIGS. 12B and 12C, each of the laser beams having the wavelength λ2 and λ3 emitted by the light source 1E passes through a coupling lens 3E, the beam splitter 43 and the objective lens 10, and is converged at the vicinity of the recording surface of the corresponding one of the optical discs D2 and D3. After each laser beam forms a beam spot on the recording surface of each optical disc, each laser beam returns along the same optical path along which each laser beam proceeds to the optical disc, and is detected by a photoreceptor via a half mirror (not shown). As described above, the optical information recording/reproducing apparatus 200 according to the fourth example is configured to be compact in size and at low cost, by sharing the optical path for the laser beams having the wavelengths λ2 and λ3.

Since as described above the numerical apertures of the objective lens 10 required for the optical discs D1 to D3 are different from each other, the optical information recording/reproducing apparatus 200 may be provided with aperture stops (not shown) respectively restricting the beam diameters of the laser beams having the wavelengths λ1, λ2 and λ3.

The specifications of the objective lens 10 mounted on the optical information recording/reproducing apparatus 200 according to the fourth example are shwn in the following Table 27.

TABLE 27

|  | 1st laser beam | 2nd laser beam | 3rd laser beam |
| --- | --- | --- | --- |
| Wavelength (nm) | 405 | 660 | 790 |
| Focal Length (nun) | 2.20 | 2.34 | 2.40 |
| NA | 0.85 | 0.60 | 0.47 |
| Magnification M | 0.000 | 0.000 | −0.001 |

As shown by the value of the magnification M in Table 27, in the optical information recording/reproducing apparatus 200, each laser beam is incident on the optical disc as a collimated beam or a diverging beam having a low degree of divergence. With this configuration, off-axis aberrations caused when the objective lens 10 is shifted for the tracking operation can be suppressed to a low level. The following Tables 28 to 30 show the numerical configurations of the optical information recording/reproducing apparatus 200. Specifically, Table 28 shows the numerical configuration defined when the optical disc D1 is used, Table 29 shows the numerical configuration defined when the optical disc D2 is used, and Table 30 shows the numerical configuration defined when the optical disc D3 is used.

TABLE 28

| Surface No. | r | d | n(405nm) |  |
| --- | --- | --- | --- | --- |
| 0 | ∞ | 1.98 |  | Light Source 1D |
| 1 | ∞ | 2.00 | 1.52972 | Diffraction Grating 2D |
| 2 | ∞ | 18.00 |  |  |
| 3 | 113.760 | 1.20 | 1.52469 | Coupling Lens 3D |
| 4 | −12.800 | 1.00 |  |  |
| 5 | ∞ | 4.00 | 1.52972 | Beam Splitter 43 |
| 6 | ∞ | 3.00 |  |  |

TABLE 28-continued

| Surface No. | r | d | n(405nm) |  |
| --- | --- | --- | --- | --- |
| 7(1st region) | 1.363 | 2.60 | 1.56023 | Objective Lens 10 |
| 7(2nd region) | 1.363 |  |  |  |
| 7(3rd region) | 1.324 |  |  |  |
| 8 | −2.724 | 0.76 |  |  |
| 9 | ∞ | 0.0875 | 1.62231 | Optical Disc D1 |
| 10 | ∞ | — |  |  |

TABLE 29

| Surface No. | r | d | n(660nm) |  |
| --- | --- | --- | --- | --- |
| 0 | ∞ | 1.97 |  | Light Source 1E |
| 1 | ∞ | 2.00 | 1.51374 | Diffraction Grating 2E |
| 2 | ∞ | 13.50 |  |  |
| 3 | 100.160 | 1.20 | 1.54044 | Coupling Lens 3E |
| 4 | −10.400 | 1.00 |  |  |
| 5 | ∞ | 4.00 | 1.51374 | Beam Splitter 43 |
| 6 | ∞ | 0.16 |  |  |
| 7(1st region) | 1.363 | 2.60 | 1.54044 | Objective Lens 10 |
| 7(2nd region) | 1.363 |  |  |  |
| 7(3rd region) | 1.324 |  |  |  |
| 8 | −2.724 | 0.60 |  |  |
| 9 | ∞ | 0.60 | 1.57961 | Optical Disc D2 |
| 10 | ∞ | — |  |  |

TABLE 30

| Surface No. | r | d | n(790nm) |  |
| --- | --- | --- | --- | --- |
| 0 | ∞ | 1.97 |  | Light Source 1E |
| 1 | ∞ | 2.00 | 1.51052 | Diffraction Grating 2E |
| 2 | ∞ | 13.50 |  |  |
| 3 | 100.160 | 1.20 | 1.53653 | Coupling Lens 3E |
| 4 | −10.400 | 1.00 |  |  |
| 5 | ∞ | 4.00 | 1.51052 | Beam Splitter 43 |
| 6 | ∞ | 0.46 |  |  |
| 7(1st region) | 1.363 | 2.60 | 1.53653 | Objective Lens 10 |
| 7(2nd region) | 1.363 |  |  |  |
| 7(3rd region) | 1.324 |  |  |  |
| 8 | −2.724 | 0.30 |  |  |
| 9 | ∞ | 1.20 | 1.57307 | Optical Disc D3 |
| 10 | ∞ | — |  |  |

Each of a second surface (surface #4) of the coupling lens, the first surface 10a and the second surface 10b of the objective lens 10 is an aspherical surface. The following Tables 31 and 32 show the conical coefficients κ and aspherical coefficients $A_4, A_6 \ldots$ of each aspherical surface. Specifically, Table 31 shows the coefficients defined when the optical disc D1 is used, Table 32 shows the coefficients defined when the optical disc D2 or D3 is used. Since the configuration of the objective lens 10 is common to all of the Tables 31 and 32, the coefficients of the first and second surfaces 10a and 10b shown in Table 31 are omitted in Table 32.

TABLE 31

| | κ | A4 | A6 | A8 | A10 | A12 | A14 |
|---|---|---|---|---|---|---|---|
| 4 | 0.0000 | 4.3560E−05 | 1.9750E−07 | 7.7370E−10 | 0.0000E+00 | 0.0000E+00 | 0.0000E+00 |
| 7(1st region) | −0.7500 | 2.1110E−03 | 3.3710E−03 | −1.1880E−03 | 4.6840E−04 | −8.9160E−05 | 0.0000E+00 |
| 7(2nd region) | −0.7500 | 1.8170E−03 | 3.1370E−03 | −2.2470E−03 | 7.4110E−04 | −1.4654E−04 | 0.0000E+00 |
| 7(3rd region) | −0.7500 | −1.4480E−02 | 3.6410E−03 | 1.0500E−03 | −1.7360E−04 | −2.9580E−05 | 0.0000E+00 |
| 8 | 0.0000 | 2.5830E−01 | −3.1380E−01 | 4.7530E−01 | −6.0750E−01 | 5.0080E−01 | −2.2980E−01 |

| | A16 | A18 | A20 | A22 | A24 |
|---|---|---|---|---|---|
| 4 | 0.0000E+00 | 0.0000E+00 | 0.0000E+00 | 0.0000E+00 | 0.0000E+00 |
| 7(1st region) | 0.0000E+00 | 0.0000E+00 | 0.0000E+00 | 0.0000E+00 | 0.0000E+00 |
| 7(2nd region) | 0.0000E+00 | 0.0000E+00 | 0.0000E+00 | 0.0000E+00 | 0.0000E+00 |
| 7(3rd region) | 0.0000E+00 | 0.0000E+00 | 0.0000E+00 | 0.0000E+00 | 0.0000E+00 |
| 8 | 3.6660E−02 | 1.3500E−02 | −6.9273E−03 | 8.8413E−04 | 0.0000E+00 |

TABLE 32

| | κ | A4 | A6 | A8 | A10 | A12 | A14 |
|---|---|---|---|---|---|---|---|
| 4 | 0.0000 | 7.9810E−05 | 5.5360E−07 | 3.4000E−09 | 0.0000E+00 | 0.0000E+00 | 0.0000E+00 |

| | A16 | A18 | A20 | A22 | A24 |
|---|---|---|---|---|---|
| 4 | 0.0000E+00 | 0.0000E+00 | 0.0000E+00 | 0.0000E+00 | 0.0000E+00 |

On the first surface 10a of the objective lens 10 according to the fourth example, the regions R1, R2 and R3 are formed in the ranges of height h from the optical axis (i.e., the effective radius) indicated below.

Region R1: $0.000 \le h \le 1.130$
Region R2: $1.130 < h \le 1.405$
Region R3: $1.405 < h \le 1.870$ The functions of the regions R1 to R3 are the same in quality as those shown in the first example. The following Table 33 shows coefficients of the optical path difference functions respectively defining the diffraction structures in the regions R1, R2 and R3 on the first surface 10a of the objective lens 10. The following Table 34 shows the BD use diffraction order, the DVD use diffraction order, the CD use diffraction order and the blazed wavelengths.

TABLE 33

| | P2 | P4 | P6 | P8 | P10 | P12 |
|---|---|---|---|---|---|---|
| 7(1st region)(1) | 4.0000E+01 | −3.2440E+00 | −4.2590E−01 | −1.2750E−01 | 0.0000E+00 | 0.0000E+00 |
| 7(1st region)(2) | 0.0000E+00 | −3.2930E+00 | 1.4250E+00 | −5.7620E−01 | 0.0000E+00 | 0.0000E+00 |
| 7(2nd region)(1) | 4.0000E+01 | −1.5670E+00 | −1.0950E+00 | 1.0830E−01 | 0.0000E+00 | 0.0000E+00 |
| 7(2nd region)(2) | 0.0000E+00 | −1.6440E+00 | 4.0900E−01 | −3.3650E−01 | 0.0000E+00 | 0.0000E+00 |
| 7(3rd region) | 5.4947E+01 | −3.6450E+01 | 1.1150E+01 | −2.0630E+00 | 0.0000E+00 | 0.0000E+00 |

TABLE 34

| | 1st Laser Beam | 2nd Laser Beam | 3rd Laser Beam | Blazed Wavelength (nm) | hmax |
|---|---|---|---|---|---|
| 7(1st region)(1) | 1 | 1 | 1 | 540 | 1.130 |
| 7(1st region)(2) | 2 | 1 | 1 | 405 | |
| 7(2nd region)(1) | 1 | 1 | 1 | 500 | 1.405 |
| 7(2nd region)(2) | 5 | 3 | — | 410 | |
| 7(3rd region) | 1 | — | — | 360 | 1.870 |

The following Tables 35 to 37 show the concrete configurations of the annular zone structures formed in the regions R1 to R3. In the fourth example, the region R1 has two types of steps, the region R2 has three types of steps, and the region R3 has two types of steps. Numeric values for representing the third step in the region R2 and the second step of the region R3 as the diffraction structures are omitted from Tables 33 and 34 because of the same reasons described in the first example.

TABLE 35

First Region (R1)

| Number | hmin | hmax | $\Delta OPD_{11}/\lambda 1$ | $\Delta OPD_{21}/\lambda 1$ |
|---|---|---|---|---|
| 0 | 0.000 | 0.112 | | |
| 1 | 0.112 | 0.194 | 1.37 | |
| 2 | 0.194 | 0.251 | 1.37 | |
| 3 | 0.251 | 0.297 | 1.37 | |
| 4 | 0.297 | 0.337 | 1.37 | |

TABLE 35-continued

First Region (R1)

| Number | hmin | hmax | $\Delta OPD_{11}/\lambda 1$ | $\Delta OPD_{21}/\lambda 1$ |
|---|---|---|---|---|
| 5 | 0.337 | 0.373 | 1.37 | |
| 6 | 0.373 | 0.406 | 1.37 | |
| 7 | 0.406 | 0.436 | 1.37 | |
| 8 | 0.436 | 0.465 | 1.37 | |
| 9 | 0.465 | 0.492 | 1.37 | |
| 10 | 0.492 | 0.518 | 1.37 | |
| 11 | 0.518 | 0.543 | 1.37 | |
| 12 | 0.543 | 0.567 | 1.37 | |
| 13 | 0.567 | 0.590 | 1.37 | |
| 14 | 0.590 | 0.612 | 1.37 | |
| 15 | 0.612 | 0.634 | 1.37 | |
| 16 | 0.634 | 0.650 | 1.37 | |

TABLE 35-continued

First Region (R1)

| Number | hmin | hmax | ΔOPD$_{11}$/λ1 | ΔOPD$_{21}$/λ1 |
|---|---|---|---|---|
| 17 | 0.650 | 0.654 | | −2.00 |
| 18 | 0.654 | 0.675 | 1.37 | |
| 19 | 0.675 | 0.695 | 1.37 | |
| 20 | 0.695 | 0.714 | 1.37 | |
| 21 | 0.714 | 0.733 | 1.37 | |
| 22 | 0.733 | 0.752 | 1.37 | |
| 23 | 0.752 | 0.771 | 1.37 | |
| 24 | 0.771 | 0.789 | 1.37 | |
| 25 | 0.789 | 0.806 | 1.37 | |
| 26 | 0.806 | 0.824 | 1.37 | |
| 27 | 0.824 | 0.841 | 1.37 | |
| 28 | 0.841 | 0.858 | 1.37 | |
| 29 | 0.858 | 0.875 | 1.37 | |
| 30 | 0.875 | 0.877 | 1.37 | |
| 31 | 0.877 | 0.892 | | −2.00 |
| 32 | 0.892 | 0.908 | 1.37 | |
| 33 | 0.908 | 0.925 | 1.37 | |
| 34 | 0.925 | 0.941 | 1.37 | |
| 35 | 0.941 | 0.957 | 1.37 | |
| 36 | 0.957 | 0.973 | 1.37 | |
| 37 | 0.973 | 0.989 | 1.37 | |
| 38 | 0.989 | 1.005 | 1.37 | |
| 39 | 1.005 | 1.006 | 1.37 | |
| 40 | 1.006 | 1.020 | | −2.00 |
| 41 | 1.020 | 1.036 | 1.37 | |
| 42 | 1.036 | 1.052 | 1.37 | |
| 43 | 1.052 | 1.067 | 1.37 | |
| 44 | 1.067 | 1.083 | 1.37 | |
| 45 | 1.083 | 1.097 | 1.37 | |
| 46 | 1.097 | 1.098 | | −2.00 |
| 47 | 1.098 | 1.114 | 1.37 | |
| 48 | 1.114 | 1.130 | 1.37 | |

TABLE 36

Second Region (R2)

| Number | hmin | hmax | ΔOPD$_{12}$/λ1 | ΔOPD$_{22}$/λ1 | ΔOPD$_{32}$/λ1 |
|---|---|---|---|---|---|
| 49 | 1.130 | 1.144 | | −3.78 | |
| 50 | 1.144 | 1.158 | 1.26 | | |
| 51 | 1.158 | 1.172 | 1.26 | | |
| 52 | 1.172 | 1.185 | 1.26 | | |
| 53 | 1.185 | 1.191 | 1.26 | | |
| 54 | 1.191 | 1.199 | | | −5.07 |
| 55 | 1.199 | 1.213 | 1.26 | | |
| 56 | 1.213 | 1.227 | 1.26 | | |
| 57 | 1.227 | 1.241 | 1.26 | | |
| 58 | 1.241 | 1.252 | 1.26 | | |
| 59 | 1.252 | 1.255 | | | −5.07 |
| 60 | 1.255 | 1.269 | 1.26 | | |
| 61 | 1.269 | 1.283 | 1.26 | | |
| 62 | 1.283 | 1.297 | 1.26 | | |
| 63 | 1.297 | 1.302 | 1.26 | | |
| 64 | 1.302 | 1.311 | | | −5.07 |
| 65 | 1.311 | 1.325 | 1.26 | | |
| 66 | 1.325 | 1.339 | 1.26 | | |
| 67 | 1.339 | 1.343 | 1.26 | | |
| 68 | 1.343 | 1.353 | | | −5.07 |
| 69 | 1.353 | 1.368 | 1.26 | | |
| 70 | 1.368 | 1.378 | 1.26 | | |
| 71 | 1.378 | 1.382 | | | −5.07 |
| 72 | 1.382 | 1.397 | 1.26 | | |
| 73 | 1.397 | 1.405 | 1.26 | | |

TABLE 37

Third Region (R3)

| Number | hmin | hmax | ΔOPD$_{13}$/λ1 | ΔOPD$_{23}$/λ1 |
|---|---|---|---|---|
| 74 | 1.405 | 1.411 | | −3.35 |
| 75 | 1.411 | 1.426 | −0.87 | |
| 76 | 1.426 | 1.440 | −0.87 | |
| 77 | 1.440 | 1.453 | −0.87 | |
| 78 | 1.453 | 1.465 | −0.87 | |
| 79 | 1.465 | 1.476 | −0.87 | |
| 80 | 1.476 | 1.487 | −0.87 | |
| 81 | 1.487 | 1.497 | −0.87 | |
| 82 | 1.497 | 1.507 | −0.87 | |
| 83 | 1.507 | 1.516 | −0.87 | |
| 84 | 1.516 | 1.525 | −0.87 | |
| 85 | 1.525 | 1.534 | −0.87 | |
| 86 | 1.534 | 1.542 | −0.87 | |
| 87 | 1.542 | 1.550 | −0.87 | |
| 88 | 1.550 | 1.558 | −0.87 | |
| 89 | 1.558 | 1.565 | −0.87 | |
| 90 | 1.565 | 1.572 | −0.87 | |
| 91 | 1.572 | 1.579 | −0.87 | |
| 92 | 1.579 | 1.586 | −0.87 | |
| 93 | 1.586 | 1.592 | −0.87 | |
| 94 | 1.592 | 1.598 | −0.87 | |
| 95 | 1.598 | 1.605 | −0.87 | |
| 96 | 1.605 | 1.610 | −0.87 | |
| 97 | 1.610 | 1.616 | −0.87 | |
| 98 | 1.616 | 1.622 | −0.87 | |
| 99 | 1.622 | 1.627 | −0.87 | |
| 100 | 1.627 | 1.633 | −0.87 | |
| 101 | 1.633 | 1.638 | −0.87 | |
| 102 | 1.638 | 1.643 | −0.87 | |
| 103 | 1.643 | 1.648 | −0.87 | |
| 104 | 1.648 | 1.653 | −0.87 | |
| 105 | 1.653 | 1.658 | −0.87 | |
| 106 | 1.658 | 1.662 | −0.87 | |
| 107 | 1.662 | 1.667 | −0.87 | |
| 108 | 1.667 | 1.671 | −0.87 | |
| 109 | 1.671 | 1.676 | −0.87 | |
| 110 | 1.676 | 1.680 | −0.87 | |
| 111 | 1.680 | 1.684 | −0.87 | |
| 112 | 1.684 | 1.688 | −0.87 | |
| 113 | 1.688 | 1.692 | −0.87 | |
| 114 | 1.692 | 1.696 | −0.87 | |
| 115 | 1.696 | 1.700 | −0.87 | |
| 116 | 1.700 | 1.704 | −0.87 | |
| 117 | 1.704 | 1.708 | −0.87 | |
| 118 | 1.708 | 1.712 | −0.87 | |
| 119 | 1.712 | 1.715 | −0.87 | |
| 120 | 1.715 | 1.719 | −0.87 | |
| 121 | 1.719 | 1.723 | −0.87 | |
| 122 | 1.723 | 1.726 | −0.87 | |
| 123 | 1.726 | 1.729 | −0.87 | |
| 124 | 1.729 | 1.733 | −0.87 | |
| 125 | 1.733 | 1.736 | −0.87 | |
| 126 | 1.736 | 1.739 | −0.87 | |
| 127 | 1.739 | 1.743 | −0.87 | |
| 128 | 1.743 | 1.746 | −0.87 | |
| 129 | 1.746 | 1.749 | −0.87 | |
| 130 | 1.749 | 1.752 | −0.87 | |
| 131 | 1.752 | 1.755 | −0.87 | |
| 132 | 1.755 | 1.758 | −0.87 | |
| 133 | 1.758 | 1.761 | −0.87 | |
| 134 | 1.761 | 1.764 | −0.87 | |
| 135 | 1.764 | 1.767 | −0.87 | |
| 136 | 1.767 | 1.770 | −0.87 | |
| 137 | 1.770 | 1.773 | −0.87 | |
| 138 | 1.773 | 1.776 | −0.87 | |
| 139 | 1.776 | 1.778 | −0.87 | |
| 140 | 1.778 | 1.781 | −0.87 | |
| 141 | 1.781 | 1.784 | −0.87 | |
| 142 | 1.784 | 1.787 | −0.87 | |
| 143 | 1.787 | 1.789 | −0.87 | |
| 144 | 1.789 | 1.792 | −0.87 | |
| 145 | 1.792 | 1.794 | −0.87 | |
| 146 | 1.794 | 1.797 | −0.87 | |
| 147 | 1.797 | 1.799 | −0.87 | |
| 148 | 1.799 | 1.802 | −0.87 | |
| 149 | 1.802 | 1.804 | −0.87 | |

TABLE 37-continued

Third Region (R3)

| Number | hmin | hmax | $\Delta OPD_{13}/\lambda 1$ | $\Delta OPD_{23}/\lambda 1$ |
|---|---|---|---|---|
| 150 | 1.804 | 1.807 | −0.87 | |
| 151 | 1.807 | 1.809 | −0.87 | |
| 152 | 1.809 | 1.812 | −0.87 | |
| 153 | 1.812 | 1.814 | −0.87 | |
| 154 | 1.814 | 1.816 | −0.87 | |
| 155 | 1.816 | 1.819 | −0.87 | |
| 156 | 1.819 | 1.821 | −0.87 | |
| 157 | 1.821 | 1.823 | −0.87 | |
| 158 | 1.823 | 1.826 | −0.87 | |
| 159 | 1.826 | 1.828 | −0.87 | |
| 160 | 1.828 | 1.830 | −0.87 | |
| 161 | 1.830 | 1.832 | −0.87 | |
| 162 | 1.832 | 1.834 | −0.87 | |
| 163 | 1.834 | 1.837 | −0.87 | |
| 164 | 1.837 | 1.839 | −0.87 | |
| 165 | 1.839 | 1.841 | −0.87 | |
| 166 | 1.841 | 1.843 | −0.87 | |
| 167 | 1.843 | 1.845 | −0.87 | |
| 168 | 1.845 | 1.847 | −0.87 | |
| 169 | 1.847 | 1.849 | −0.87 | |
| 170 | 1.849 | 1.851 | −0.87 | |
| 171 | 1.851 | 1.853 | −0.87 | |
| 172 | 1.853 | 1.855 | −0.87 | |
| 173 | 1.855 | 1.857 | −0.87 | |
| 174 | 1.857 | 1.859 | −0.87 | |
| 175 | 1.859 | 1.861 | −0.87 | |
| 176 | 1.861 | 1.863 | −0.87 | |
| 177 | 1.863 | 1.865 | −0.87 | |
| 178 | 1.865 | 1.867 | −0.87 | |
| 179 | 1.867 | 1.869 | −0.87 | |
| 180 | 1.869 | 1.870 | −0.87 | |

Fifth Example

Figure 13:
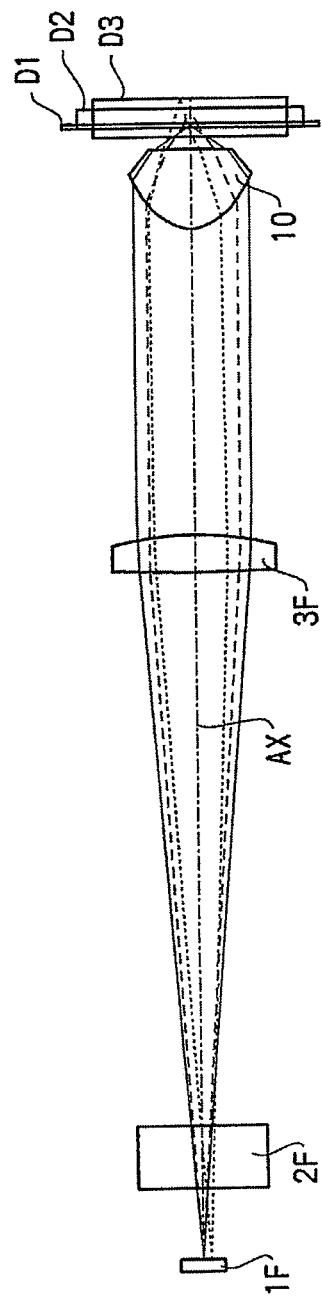
FIG. 13 is a block diagram generally illustrating a configuration of the optical information recording/reproducing apparatus according to a fifth example.

Hereafter, a fifth example of the optical information recording/reproducing apparatus is described. FIG. 13 is a block diagram generally illustrating a configuration of an optical information recording/reproducing apparatus 300 according to the fifth example. The optical information recording/reproducing apparatus 300 includes a light source 1F which emits laser beams having the wavelengths λ1, λ2 and λ3, a diffraction grating 2F, a coupling lens 3F and the objective lens 10. In FIG. 13, a chain line represents the reference axis AX of the optical information recording/reproducing apparatus 300. In FIG. 13, a laser beam indicated by a solid line is the lease beam having the wavelength λ1, a laser beam indicated by a dashed line is the laser beam having the wavelength λ2, and a laser beam indicated by a dotted line is the laser beam having the wavelength λ3.

Figure 14A:
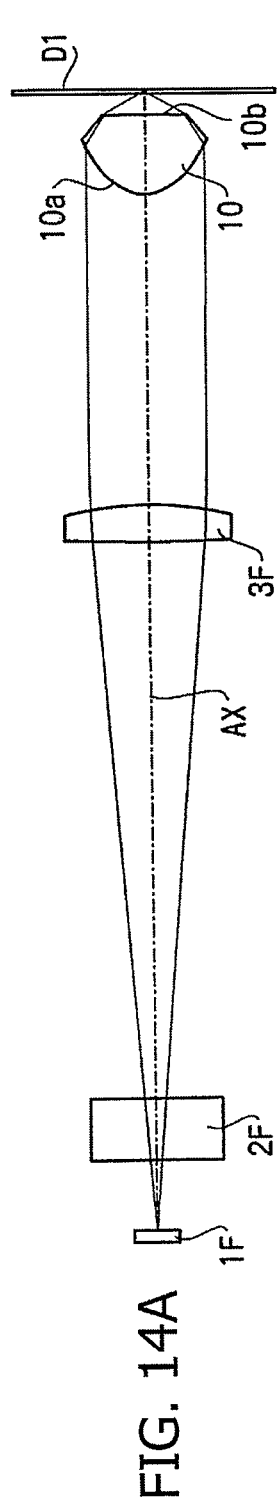
FIGS. 14A to 14C illustrate developed optical paths respectively defined for the first to third optical discs in the optical information recording/reproducing apparatus according to the fifth example.
Figure 14B:
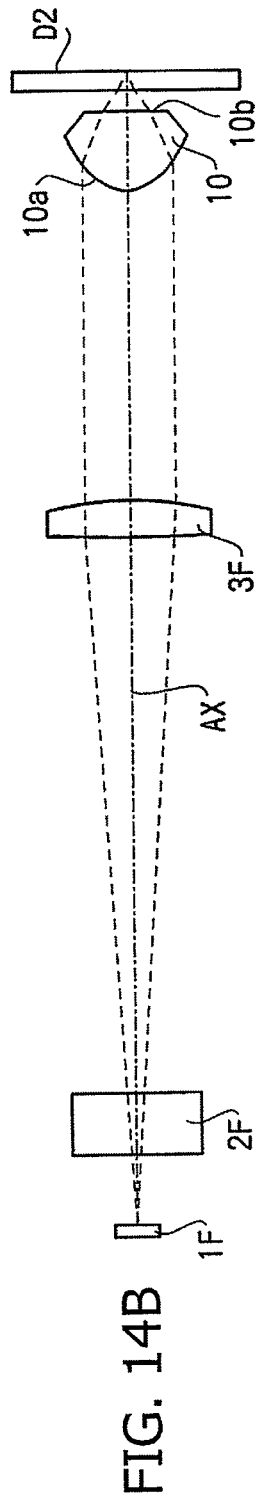
Figure 14C:
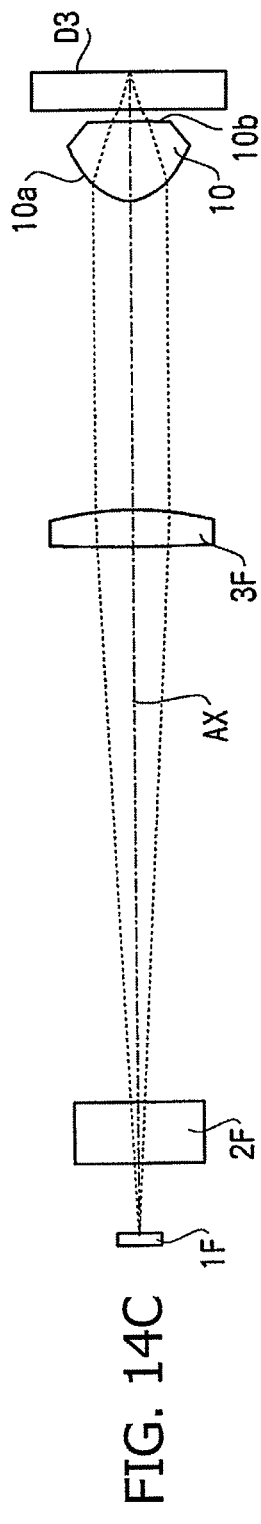

FIGS. 14A to 14C show developed optical paths in the optical information recording/reproducing apparatus 300 according to the fifth example. Specifically, FIG. 14A illustrates a developed optical path defined when the optical disc D1 is used, FIG. 14B illustrates a developed optical path defined when the optical disc D2 is used, and FIG. 14C illustrates a developed optical path defined when the optical disc D3 is used. As shown in FIGS. 14A to 14C, each of the laser beams having the wavelengths λ1, λ2 and λ3 emitted by the light source 1F passes through the coupling lens 3F and the objective lens 10, and is converged at the vicinity of the recording surface of corresponding one the optical discs D1 to D3. After each laser beam forms a beam spot on the recording surface of the optical disc, each laser beam returns along the same optical path along which each laser beam proceeds to the optical disc, and is detected by a photoreceptor via a half mirror (not shown). As described above, the optical information recording/reproducing apparatus 300 according to the fifth example is configured to be compact in size and at low cost, by sharing the optical path for all of the laser beams having the wavelengths λ1, λ2 and λ3.

Since as described above the numerical apertures of the objective lens 10 required for the optical discs D1 to D3 are different from each other, the optical information recording/reproducing apparatus 300 may be provided with aperture stops (not shown) respectively restricting the beam diameters of the laser beams having the wavelengths λ1, λ2 and λ3.

The specifications of the objective lens 10 mounted on the optical information recording/reproducing apparatus 300 according to the fifth example are indicated in the following Table 38.

TABLE 38

| | $1^{st}$ laser beam | $2^{nd}$ laser beam | $3^{rd}$ laser beam |
|---|---|---|---|
| Wavelength (nm) | 405 | 660 | 790 |
| Focal Length (mm) | 2.20 | 2.48 | 2.54 |
| NA | 0.85 | 0.60 | 0.47 |
| Magnification M | 0.000 | −0.004 | −0.005 |

As shown by the value of the magnification M in Table 38, in the optical information recording/reproducing apparatus 300, each laser beam is incident on the optical disc as a collimated beam or a diverging beam having a low degree of divergence. With this configuration, off-axis aberrations caused when the objective lens 10 is shifted for the tracking operation can be suppressed to a low level. The following Tables 39 to 41 show the numerical configurations of the optical information recording/reproducing apparatus 300. Specifically, Table 39 shows the numerical configuration defined when the optical disc D1 is used, Table 40 shows the numerical configuration defined when the optical disc D2 is used, and Table 41 shows the numerical configuration defined when the optical disc D3 is used.

TABLE 39

| Surface No. | r | d | n(405 nm) | |
|---|---|---|---|---|
| 0 | ∞ | 2.08 | | Light Source 1F |
| 1 | ∞ | 2.00 | 1.52972 | Diffraction Grating 2F |
| 2 | ∞ | 17.90 | | |
| 3 | 113.760 | 1.20 | 1.52469 | Coupling Lens 3F |
| 4 | −12.800 | 10.00 | | |
| 5($1^{st}$ region) | 1.494 | 2.50 | 1.62309 | Objective Lens 10 |
| 5($2^{nd}$ region) | 1.340 | | | |
| 5($3^{rd}$ region) | 1.425 | | | |
| 6 | −5.937 | 0.73 | | |
| 7 | ∞ | 0.0875 | 1.62231 | Optical Disc D1 |
| 8 | ∞ | — | | |

TABLE 40

| Surface No. | r | d | n(660 nm) | |
|---|---|---|---|---|
| 0 | ∞ | 2.08 | | Light Source 1F |
| 1 | ∞ | 2.00 | 1.51374 | Diffraction Grating 2F |
| 2 | ∞ | 17.90 | | |
| 3 | 113.760 | 1.20 | 1.50635 | Coupling Lens 3F |
| 4 | −12.800 | 10.03 | | |
| 5($1^{st}$ region) | 1.494 | 2.50 | 1.58760 | Objective Lens 10 |
| 5($2^{nd}$ region) | 1.340 | | | |
| 5($3^{rd}$ region) | 1.425 | | | |
| 6 | −5.937 | 0.70 | | |
| 7 | ∞ | 0.60 | 1.57961 | Optical Disc D2 |
| 8 | ∞ | — | | |

TABLE 41

| Surface No. | r | d | n(790 nm) | |
|---|---|---|---|---|
| 0 | ∞ | 2.08 | | Light Source 1F |
| 1 | ∞ | 2.00 | 1.51052 | Diffraction Grating 2F |
| 2 | ∞ | 17.90 | | |
| 3 | 113.760 | 1.20 | 1.50313 | Coupling Lens 3F |
| 4 | −12.800 | 10.35 | | |
| 5(1st region) | 1.494 | 2.50 | 1.58169 | Objective Lens 10 |
| 5(2nd region) | 1.340 | | | |
| 5(3rd region) | 1.425 | | | |
| 6 | −5.937 | 0.38 | | |
| 7 | ∞ | 1.20 | 1.57307 | Optical Disc D3 |
| 8 | ∞ | — | | |

Each of a second surface (surface #4) of the coupling lens, the first surface 10a and the second surface 10b of the objective lens 10 is an aspherical surface. The following Table 42 shows the conical coefficients κ and aspherical coefficients $A_4, A_6 \ldots$ of each aspherical surface.

TABLE 42

| | κ | A4 | A6 | A8 | A10 | A12 |
|---|---|---|---|---|---|---|
| 4 | 0.0000 | 4.3560E−05 | 1.9760E−07 | 7.6780E−10 | 0.0000E+00 | 0.0000E+00 |
| 5(1st region) | −0.7500 | 6.7460E−03 | 1.8460E−03 | −2.4320E−04 | 2.3400E−04 | −2.6020E−05 |
| 5(2nd region) | −0.7500 | −4.0720E−02 | 1.5030E−02 | −2.4040E−03 | 6.1580E−04 | −8.3834E−05 |
| 5(3rd region) | −0.7500 | −1.5180E−02 | 5.5900E−03 | −1.1410E−04 | 1.4198E−04 | −1.4331E−05 |
| 6 | 0.0000 | 1.9860E−01 | −3.0590E−01 | 4.8300E−01 | −6.0782E−01 | 4.9910E−01 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |
| 5(1st region) | 0.0000E+00 | 0.0000E+00 | 0.0000E+00 | 0.0000E+00 | 0.0000E+00 | 0.0000E+00 |
| 5(2nd region) | 0.0000E+00 | 0.0000E+00 | 0.0000E+00 | 0.0000E+00 | 0.0000E+00 | 0.0000E+00 |
| 5(3rd region) | 0.0000E+00 | 0.0000E+00 | 0.0000E+00 | 0.0000E+00 | 0.0000E+00 | 0.0000E+00 |
| 6 | −2.3050E−01 | 3.6580E−02 | 1.3920E−02 | −6.8203E−03 | 7.8849E−04 | 0.0000E+00 |

On the first surface 10a of the objective lens 10 according to the fifth example, the regions R1, R2 and R3 are formed in the ranges of height h from the optical axis (i.e., the effective radius) indicated below.

Region R1: 0.000≤h≤1.200
Region R2: 1.200<h≤1.495
Region R3: 1.495<h≤1.870

The functions of the regions R1 to R3 are the same in quality as those shown in the first example. The following Table 43 shows coefficients of the optical path difference functions respectively defining the diffraction structures in the regions R1, R2 and R3 on the first surface 10a of the objective lens 10. The following Table 44 shows the BD use diffraction order, the DVD use diffraction order, the CD use diffraction order and the blazed wavelengths.

TABLE 43

| | P2 | P4 | P6 | P8 | P10 | P12 |
|---|---|---|---|---|---|---|
| 5(1st region)(1) | 4.9905E+01 | −2.9200E+00 | 6.4970E−01 | −1.7040E−01 | 0.0000E+00 | 0.0000E+00 |
| 5(1st region)(2) | −2.4918E+01 | −2.3600E+00 | −3.7200E−01 | −3.7000E−03 | 0.0000E+00 | 0.0000E+00 |
| 5(2nd region)(1) | 5.9230E+01 | 3.3340E+00 | −1.8310E+00 | 3.0280E−01 | 0.0000E+00 | 0.0000E+00 |
| 5(2nd region)(2) | 0.0000E+00 | −1.6500E+01 | 5.1210E+00 | −6.1480E−01 | 0.0000E+00 | 0.0000E+00 |
| 5(3rd region) | 2.5000E+01 | −4.2090E+01 | 9.5320E+00 | −8.8070E−01 | 0.0000E+00 | 0.0000E+00 |

TABLE 44

| | 1st Laser Beam | 2nd Laser Beam | 3rd Laser Beam | Blazed Wavelength(nm) | hmax |
|---|---|---|---|---|---|
| 5(1st region)(1) | 1 | 1 | 1 | 500 | 1.200 |
| 5(1st region)(2) | 2 | 1 | 1 | 405 | |
| 5(2nd region)(1) | 1 | 1 | 1 | 450 | 1.495 |
| 5(2nd region)(2) | 5 | 3 | — | 395 | |
| 5(3rd region) | 1 | — | — | 405 | 1.870 |

The following Tables 45 to 47 show the concrete configurations of the annular zone structures formed in the regions R1 to R3. In the fifth example, the region R1 has three types of steps, the region R2 has four types of steps, and the region R3 has two types of steps. Numeric values for representing the third step in the region R1, the third and fourth steps in the region R2 and the second step of the region R3 as the diffraction structures are omitted from Tables 43 and 44 because of the same reasons described in the third example.

TABLE 45

First Region (R1)

| Number | hmin | hmax | ΔOPD$_{11}$/λ1 | ΔOPD$_{21}$/λ1 | ΔOPD$_{31}$/λ1 |
|---|---|---|---|---|---|
| 0 | 0.000 | 0.100 | | | |
| 1 | 0.100 | 0.142 | 1.28 | | |
| 2 | 0.142 | 0.174 | | −2.00 | |
| 3 | 0.174 | 0.224 | 1.28 | | |
| 4 | 0.224 | 0.245 | 1.28 | | |
| 5 | 0.245 | 0.265 | | −2.00 | |
| 6 | 0.265 | 0.301 | 1.28 | | |
| 7 | 0.301 | 0.315 | 1.28 | | |
| 8 | 0.315 | 0.333 | | −2.00 | |
| 9 | 0.333 | 0.362 | 1.28 | | |
| 10 | 0.362 | 0.372 | 1.28 | | |
| 11 | 0.372 | 0.389 | | −2.00 | |

TABLE 45-continued

First Region (R1)

| Number | hmin | hmax | $\Delta OPD_{11}/\lambda 1$ | $\Delta OPD_{21}/\lambda 1$ | $\Delta OPD_{31}/\lambda 1$ |
|---|---|---|---|---|---|
| 12 | 0.389 | 0.415 | 1.28 | | |
| 13 | 0.415 | 0.421 | 1.28 | | |
| 14 | 0.421 | 0.439 | | −2.00 | |
| 15 | 0.439 | 0.461 | 1.28 | | |
| 16 | 0.461 | 0.465 | 1.28 | | |
| 17 | 0.465 | 0.483 | | −2.00 | |
| 18 | 0.483 | 0.504 | 1.28 | | |
| 19 | 0.504 | 0.524 | | | −0.72 |
| 20 | 0.524 | 0.541 | 1.28 | | |
| 21 | 0.541 | 0.543 | | −2.00 | |
| 22 | 0.543 | 0.562 | 1.28 | | |
| 23 | 0.562 | 0.575 | 1.28 | | |
| 24 | 0.575 | 0.580 | | −2.00 | |
| 25 | 0.580 | 0.598 | 1.28 | | |
| 26 | 0.598 | 0.606 | 1.28 | | |
| 27 | 0.606 | 0.615 | | −2.00 | |
| 28 | 0.615 | 0.632 | 1.28 | | |
| 29 | 0.632 | 0.636 | 1.28 | | |
| 30 | 0.636 | 0.648 | | −2.00 | |
| 31 | 0.648 | 0.665 | 1.28 | | |
| 32 | 0.665 | 0.680 | | | −0.72 |
| 33 | 0.680 | 0.692 | 1.28 | | |
| 34 | 0.692 | 0.695 | | −2.00 | |
| 35 | 0.695 | 0.710 | 1.28 | | |
| 36 | 0.710 | 0.717 | 1.28 | | |
| 37 | 0.717 | 0.725 | | −2.00 | |
| 38 | 0.725 | 0.739 | 1.28 | | |
| 39 | 0.739 | 0.742 | 1.28 | | |
| 40 | 0.742 | 0.754 | | −2.00 | |
| 41 | 0.754 | 0.766 | 1.28 | | |
| 42 | 0.766 | 0.768 | | −2.00 | |
| 43 | 0.768 | 0.781 | 1.28 | | |
| 44 | 0.781 | 0.789 | 1.28 | | |
| 45 | 0.789 | 0.795 | | −2.00 | |
| 46 | 0.795 | 0.808 | 1.28 | | |
| 47 | 0.808 | 0.811 | 1.28 | | |
| 48 | 0.811 | 0.821 | | −2.00 | |
| 49 | 0.821 | 0.832 | 1.28 | | |
| 50 | 0.832 | 0.834 | | −2.00 | |
| 51 | 0.834 | 0.847 | 1.28 | | |
| 52 | 0.847 | 0.853 | 1.28 | | |
| 53 | 0.853 | 0.860 | | −2.00 | |
| 54 | 0.860 | 0.872 | 1.28 | | |
| 55 | 0.872 | 0.884 | | | −0.72 |
| 56 | 0.884 | 0.892 | 1.28 | | |
| 57 | 0.892 | 0.897 | | −2.00 | |
| 58 | 0.897 | 0.909 | 1.28 | | |
| 59 | 0.909 | 0.911 | 1.28 | | |
| 60 | 0.911 | 0.921 | | −2.00 | |
| 61 | 0.921 | 0.929 | 1.28 | | |
| 62 | 0.929 | 0.932 | | −2.00 | |
| 63 | 0.932 | 0.944 | 1.28 | | |
| 64 | 0.944 | 0.947 | 1.28 | | |
| 65 | 0.947 | 0.955 | | −2.00 | |
| 66 | 0.955 | 0.964 | 1.28 | | |
| 67 | 0.964 | 0.967 | | −2.00 | |
| 68 | 0.967 | 0.978 | 1.28 | | |
| 69 | 0.978 | 0.981 | 1.28 | | |
| 70 | 0.981 | 0.989 | | −2.00 | |
| 71 | 0.989 | 0.997 | 1.28 | | |
| 72 | 0.997 | 1.000 | | −2.00 | |
| 73 | 1.000 | 1.011 | 1.28 | | |
| 74 | 1.011 | 1.014 | 1.28 | | |
| 75 | 1.014 | 1.022 | | −2.00 | |
| 76 | 1.022 | 1.029 | 1.28 | | |
| 77 | 1.029 | 1.033 | | −2.00 | |
| 78 | 1.033 | 1.044 | 1.28 | | |
| 79 | 1.044 | 1.045 | 1.28 | | |
| 80 | 1.045 | 1.054 | | −2.00 | |
| 81 | 1.054 | 1.060 | 1.28 | | |
| 82 | 1.060 | 1.065 | | −2.00 | |
| 83 | 1.065 | 1.075 | 1.28 | | |
| 84 | 1.075 | 1.086 | | | −0.72 |
| 85 | 1.086 | 1.089 | 1.28 | | |
| 86 | 1.089 | 1.096 | | | −0.72 |
| 87 | 1.096 | 1.103 | 1.28 | | |
| 88 | 1.103 | 1.106 | | −2.00 | |
| 89 | 1.106 | 1.117 | 1.28 | | |
| 90 | 1.117 | 1.126 | | | −0.72 |
| 91 | 1.126 | 1.131 | 1.28 | | |
| 92 | 1.131 | 1.136 | | −2.00 | |
| 93 | 1.136 | 1.144 | 1.28 | | |
| 94 | 1.144 | 1.146 | | −2.00 | |
| 95 | 1.146 | 1.157 | 1.28 | | |
| 96 | 1.157 | 1.166 | | | −0.72 |
| 97 | 1.166 | 1.170 | 1.28 | | |
| 98 | 1.170 | 1.176 | | −2.00 | |
| 99 | 1.176 | 1.183 | 1.28 | | |
| 100 | 1.183 | 1.185 | | −2.00 | |
| 101 | 1.185 | 1.195 | 1.28 | | |
| 102 | 1.195 | 1.200 | 1.28 | | |

TABLE 46

Second Region (R2)

| Number | hmin | hmax | $\Delta OPD_{12}/\lambda 1$ | $\Delta OPD_{22}/\lambda 1$ | $\Delta OPD_{32}/\lambda 1$ | $\Delta OPD_{42}/\lambda 1$ |
|---|---|---|---|---|---|---|
| 103 | 1.200 | 1.203 | | | | −3.01 |
| 104 | 1.203 | 1.210 | 1.13 | | | |
| 105 | 1.210 | 1.217 | | | −3.72 | |
| 106 | 1.217 | 1.223 | 1.13 | | | |
| 107 | 1.223 | 1.217 | 1.13 | | | |
| 108 | 1.217 | 1.230 | 1.13 | | | |
| 109 | 1.230 | 1.234 | 1.13 | | | |
| 110 | 1.234 | 1.237 | | −4.85 | | |
| 111 | 1.237 | 1.243 | 1.13 | | | |
| 112 | 1.243 | 1.250 | 1.13 | | | |
| 113 | 1.250 | 1.257 | 1.13 | | | |
| 114 | 1.257 | 1.263 | 1.13 | | | |
| 115 | 1.263 | 1.268 | | | −3.72 | |
| 116 | 1.268 | 1.276 | 1.13 | | | |
| 117 | 1.276 | 1.282 | 1.13 | | | |
| 118 | 1.282 | 1.285 | 1.13 | | | |
| 119 | 1.285 | 1.289 | | −4.85 | | |
| 120 | 1.289 | 1.295 | 1.13 | | | |
| 121 | 1.295 | 1.301 | 1.13 | | | |
| 122 | 1.301 | 1.308 | | | −3.72 | |
| 123 | 1.308 | 1.314 | 1.13 | | | |
| 124 | 1.314 | 1.317 | 1.13 | | | |
| 125 | 1.317 | 1.320 | | −4.85 | | |
| 126 | 1.320 | 1.327 | 1.13 | | | |
| 127 | 1.327 | 1.333 | 1.13 | | | |
| 128 | 1.333 | 1.339 | | | −3.72 | |
| 129 | 1.339 | 1.345 | 1.13 | | | |
| 130 | 1.345 | 1.349 | 1.13 | | | |
| 131 | 1.349 | 1.351 | | −4.85 | | |
| 132 | 1.351 | 1.357 | 1.13 | | | |
| 133 | 1.357 | 1.364 | 1.13 | | | |
| 134 | 1.364 | 1.370 | | | −3.72 | |
| 135 | 1.370 | 1.376 | 1.13 | | | |
| 136 | 1.376 | 1.379 | 1.13 | | | |
| 137 | 1.379 | 1.382 | | −4.85 | | |
| 138 | 1.382 | 1.388 | 1.13 | | | |
| 139 | 1.388 | 1.394 | 1.13 | | | |
| 140 | 1.394 | 1.400 | | | −3.72 | |
| 141 | 1.400 | 1.405 | 1.13 | | | |
| 142 | 1.405 | 1.409 | 1.13 | | | |
| 143 | 1.409 | 1.417 | | −4.85 | | |
| 144 | 1.417 | 1.423 | 1.13 | | | |
| 145 | 1.423 | 1.429 | | | −3.72 | |
| 146 | 1.429 | 1.435 | 1.13 | | | |
| 147 | 1.435 | 1.438 | 1.13 | | | |
| 148 | 1.438 | 1.440 | | −4.85 | | |
| 149 | 1.440 | 1.446 | 1.13 | | | |
| 150 | 1.446 | 1.452 | 1.13 | | | |
| 151 | 1.452 | 1.458 | | | −3.72 | |
| 152 | 1.458 | 1.463 | 1.13 | | | |
| 153 | 1.463 | 1.466 | 1.13 | | | |

TABLE 46-continued

Second Region (R2)

| Number | hmin | hmax | $\Delta OPD_{12}/\lambda 1$ | $\Delta OPD_{22}/\lambda 1$ | $\Delta OPD_{32}/\lambda 1$ | $\Delta OPD_{42}/\lambda 1$ |
|---|---|---|---|---|---|---|
| 154 | 1.466 | 1.469 | | −4.85 | | |
| 155 | 1.469 | 1.475 | 1.13 | | | |
| 156 | 1.475 | 1.480 | 1.13 | | | |
| 157 | 1.480 | 1.486 | | | −3.72 | |
| 158 | 1.486 | 1.491 | 1.13 | | | |
| 159 | 1.491 | 1.495 | 1.13 | | | |

TABLE 47

Third Region (R3)

| Number | hmin | hmax | $\Delta OPD_{13}/\lambda 1$ | $\Delta OPD_{23}/\lambda 1$ |
|---|---|---|---|---|
| 160 | 1.495 | 1.498 | | −3.13 |
| 161 | 1.498 | 1.504 | −1.00 | |
| 162 | 1.504 | 1.509 | −1.00 | |
| 163 | 1.509 | 1.515 | −1.00 | |
| 164 | 1.515 | 1.520 | −1.00 | |
| 165 | 1.520 | 1.526 | −1.00 | |
| 166 | 1.526 | 1.531 | −1.00 | |
| 167 | 1.531 | 1.536 | −1.00 | |
| 168 | 1.536 | 1.542 | −1.00 | |
| 169 | 1.542 | 1.547 | −1.00 | |
| 170 | 1.547 | 1.552 | −1.00 | |
| 171 | 1.552 | 1.558 | −1.00 | |
| 172 | 1.558 | 1.563 | −1.00 | |
| 173 | 1.563 | 1.568 | −1.00 | |
| 174 | 1.568 | 1.573 | −1.00 | |
| 175 | 1.573 | 1.578 | −1.00 | |
| 176 | 1.578 | 1.584 | −1.00 | |
| 177 | 1.584 | 1.589 | −1.00 | |
| 178 | 1.589 | 1.594 | −1.00 | |
| 179 | 1.594 | 1.599 | −1.00 | |
| 180 | 1.599 | 1.604 | −1.00 | |
| 181 | 1.604 | 1.609 | −1.00 | |
| 182 | 1.609 | 1.614 | −1.00 | |
| 183 | 1.614 | 1.619 | −1.00 | |
| 184 | 1.619 | 1.624 | −1.00 | |
| 185 | 1.624 | 1.629 | −1.00 | |
| 186 | 1.629 | 1.633. | −1.00 | |
| 187 | 1.633 | 1.638 | −1.00 | |
| 188 | 1.638 | 1.643 | −1.00 | |
| 189 | 1.643 | 1.648 | −1.00 | |
| 190 | 1.648 | 1.653 | −1.00 | |
| 191 | 1.653 | 1.657 | −1.00 | |
| 192 | 1.657 | 1.662 | −1.00 | |
| 193 | 1.662 | 1.667 | −1.00 | |
| 194 | 1.667 | 1.672 | −1.00 | |
| 195 | 1.672 | 1.676 | −1.00 | |
| 196 | 1.676 | 1.681 | −1.00 | |
| 197 | 1.681 | 1.686 | −1.00 | |
| 198 | 1.686 | 1.690 | −1.00 | |
| 199 | 1.690 | 1.695 | −1.00 | |
| 200 | 1.695 | 1.699 | −1.00 | |
| 201 | 1.699 | 1.704 | −1.00 | |
| 202 | 1.704 | 1.708 | −1.00 | |
| 203 | 1.708 | 1.713 | −1.00 | |
| 204 | 1.713 | 1.717 | −1.00 | |
| 205 | 1.717 | 1.722 | −1.00 | |
| 206 | 1.722 | 1.726 | −1.00 | |
| 207 | 1.726 | 1.731 | −1.00 | |
| 208 | 1.731 | 1.735 | −1.00 | |
| 209 | 1.735 | 1.740 | −1.00 | |
| 210 | 1.740 | 1.744 | −1.00 | |
| 211 | 1.744 | 1.748 | −1.00 | |
| 212 | 1.748 | 1.753 | −1.00 | |
| 213 | 1.753 | 1.757 | −1.00 | |
| 214 | 1.757 | 1.761 | −1.00 | |
| 215 | 1.761 | 1.766 | −1.00 | |
| 216 | 1.766 | 1.770 | −1.00 | |
| 217 | 1.770 | 1.774 | −1.00 | |
| 218 | 1.774 | 1.778 | −1.00 | |
| 219 | 1.778 | 1.783 | −1.00 | |
| 220 | 1.783 | 1.787 | −1.00 | |
| 221 | 1.787 | 1.791 | −1.00 | |
| 222 | 1.791 | 1.795 | −1.00 | |
| 223 | 1.795 | 1.799 | −1.00 | |
| 224 | 1.799 | 1.803 | −1.00 | |
| 225 | 1.803 | 1.807 | −1.00 | |
| 226 | 1.807 | 1.812 | −1.00 | |
| 227 | 1.812 | 1.816 | −1.00 | |
| 228 | 1.816 | 1.820 | −1.00 | |
| 229 | 1.820 | 1.824 | −1.00 | |
| 230 | 1.824 | 1.828 | −1.00 | |
| 231 | 1.828 | 1.832 | −1.00 | |
| 232 | 1.832 | 1.836 | −1.00 | |
| 233 | 1.836 | 1.840 | −1.00 | |
| 234 | 1.840 | 1.843 | −1.00 | |
| 235 | 1.843 | 1.847 | −1.00 | |
| 236 | 1.847 | 1.851 | −1.00 | |
| 237 | 1.851 | 1.855 | −1.00 | |
| 238 | 1.855 | 1.859 | −1.00 | |
| 239 | 1.859 | 1.863 | −1.00 | |
| 240 | 1.863 | 1.867 | −1.00 | |
| 241 | 1.867 | 1.870 | −1.00 | |

Sixth Example

Hereafter, a sixth example of the optical information recording/reproducing apparatus is described. The objective lens 10 according to the sixth example has the same numerical configuration as that of the objective lens 10 according to the fifth example, excepting the blazed wavelengths. Therefore, regarding the specifications of the objective lens 10 according to the sixth example, the numerical configuration of the optical information recording/reproducing apparatus 100 during use of each of the optical discs D1 to D3, the shape of each aspherical surface, and the coefficients of the optical path difference functions according to the sixth example, Tables 38 to 43 of the fifth example are referred to.

The following Table 48 shows the BD use diffraction order, the DVD use diffraction order, the CD use diffraction order and the blazed wavelengths.

TABLE 48

| | $1^{st}$ Laser Beam | $2^{nd}$ Laser Beam | $3^{rd}$ Laser Beam | Blazed Wavelength(nm) | Hmax |
|---|---|---|---|---|---|
| 1($1^{st}$ region)(1) | 1 | 1 | 1 | 470 | 1.200 |
| 1($1^{st}$ region)(2) | 2 | 1 | 1 | 370 | |
| 1($2^{nd}$ region)(2) | 1 | 1 | 1 | 490 | 1.495 |
| 1($2^{nd}$ region)(2) | 5 | 3 | — | 420 | |
| 1($3^{rd}$ region) | 1 | — | — | 405 | 1.870 |

The following Tables 49 to 51 represent the concrete configurations of the annular zone structures formed in the regions R1 to R3.

TABLE 49

First Region (R1)

| Number | hmin | hmax | $\Delta OPD_{11}/\lambda 1$ | $\Delta OPD_{21}/\lambda 1$ | $\Delta OPD_{31}/\lambda 1$ |
|---|---|---|---|---|---|
| 0 | 0.000 | 0.100 | | | |
| 1 | 0.100 | 0.142 | 1.19 | | |
| 2 | 0.142 | 0.174 | | −1.79 | |
| 3 | 0.174 | 0.224 | 1.19 | | |
| 4 | 0.224 | 0.245 | 1.19 | | |

TABLE 49-continued

First Region (R1)

| Number | hmin | hmax | ΔOPD$_{11}$/λ1 | ΔOPD$_{21}$/λ1 | ΔOPD$_{31}$/λ1 |
|---|---|---|---|---|---|
| 5 | 0.245 | 0.265 | | −1.79 | |
| 6 | 0.265 | 0.301 | 1.19 | | |
| 7 | 0.301 | 0.315 | 1.19 | | |
| 8 | 0.315 | 0.333 | | −1.79 | |
| 9 | 0.333 | 0.362 | 1.19 | | |
| 10 | 0.362 | 0.372 | 1.19 | | |
| 11 | 0.372 | 0.389 | | −1.79 | |
| 12 | 0.389 | 0.415 | 1.19 | | |
| 13 | 0.415 | 0.421 | 1.19 | | |
| 14 | 0.421 | 0.439 | | −1.79 | |
| 15 | 0.439 | 0.461 | 1.19 | | |
| 16 | 0.461 | 0.465 | 1.19 | | |
| 17 | 0.465 | 0.483 | | −1.79 | |
| 18 | 0.483 | 0.504 | 1.19 | | |
| 19 | 0.504 | 0.524 | | | −0.60 |
| 20 | 0.524 | 0.541 | 1.19 | | |
| 21 | 0.541 | 0.543 | | −1.79 | |
| 22 | 0.543 | 0.562 | 1.19 | | |
| 23 | 0.562 | 0.575 | 1.19 | | |
| 24 | 0.575 | 0.580 | | −1.79 | |
| 25 | 0.580 | 0.598 | 1.19 | | |
| 26 | 0.598 | 0.606 | 1.19 | | |
| 27 | 0.606 | 0.615 | | −1.79 | |
| 28 | 0.615 | 0.632 | 1.19 | | |
| 29 | 0.632 | 0.636 | 1.19 | | |
| 30 | 0.636 | 0.648 | | −1.79 | |
| 31 | 0.648 | 0.665 | 1.19 | | |
| 32 | 0.665 | 0.680 | | | −0.60 |
| 33 | 0.680 | 0.692 | 1.19 | | |
| 34 | 0.692 | 0.695 | | −1.79 | |
| 35 | 0.695 | 0.710 | 1.19 | | |
| 36 | 0.710 | 0.717 | 1.19 | | |
| 37 | 0.717 | 0.725 | | −1.79 | |
| 38 | 0.725 | 0.739 | 1.19 | | |
| 39 | 0.739 | 0.742 | 1.19 | | |
| 40 | 0.742 | 0.754 | | −1.79 | |
| 41 | 0.754 | 0.766 | 1.19 | | |
| 42 | 0.766 | 0.768 | | −1.79 | |
| 43 | 0.768 | 0.781 | 1.19 | | |
| 44 | 0.781 | 0.789 | 1.19 | | |
| 45 | 0.789 | 0.795 | | −1.79 | |
| 46 | 0.795 | 0.808 | 1.19 | | |
| 47 | 0.808 | 0.811 | 1.19 | | |
| 48 | 0.811 | 0.821 | | −1.79 | |
| 49 | 0.821 | 0.832 | 1.19 | | |
| 50 | 0.832 | 0.834 | | −1.79 | |
| 51 | 0.834 | 0.847 | 1.19 | | |
| 52 | 0.847 | 0.853 | 1.19 | | |
| 53 | 0.853 | 0.860 | | −1.79 | |
| 54 | 0.860 | 0.872 | 1.19 | | |
| 55 | 0.872 | 0.884 | | | −0.60 |
| 56 | 0.884 | 0.892 | 1.19 | | |
| 57 | 0.892 | 0.897 | | −1.79 | |
| 58 | 0.897 | 0.909 | 1.19 | | |
| 59 | 0.909 | 0.911 | 1.19 | | |
| 60 | 0.911 | 0.921 | | −1.79 | |
| 61 | 0.921 | 0.929 | 1.19 | | |
| 62 | 0.929 | 0.932 | | −1.79 | |
| 63 | 0.932 | 0.944 | 1.19 | | |
| 64 | 0.944 | 0.947 | 1.19 | | |
| 65 | 0.947 | 0.955 | | −1.79 | |
| 66 | 0.955 | 0.964 | 1.19 | | |
| 67 | 0.964 | 0.967 | | −1.79 | |
| 68 | 0.967 | 0.978 | 1.19 | | |
| 69 | 0.978 | 0.981 | 1.19 | | |
| 70 | 0.981 | 0.989 | | −1.79 | |
| 71 | 0.989 | 0.997 | 1.19 | | |
| 72 | 0.997 | 1.000 | | −1.79 | |
| 73 | 1.000 | 1.011 | 1.19 | | |
| 74 | 1.011 | 1.014 | 1.19 | | |
| 75 | 1.014 | 1.022 | | −1.79 | |
| 76 | 1.022 | 1.029 | 1.19 | | |
| 77 | 1.029 | 1.033 | | −1.79 | |
| 78 | 1.033 | 1.044 | 1.19 | | |
| 79 | 1.044 | 1.045 | 1.19 | | |
| 80 | 1.045 | 1.054 | | −1.79 | |
| 81 | 1.054 | 1.060 | 1.19 | | |
| 82 | 1.060 | 1.065 | | −1.79 | |
| 83 | 1.065 | 1.075 | 1.19 | | |
| 84 | 1.075 | 1.086 | | | −0.60 |
| 85 | 1.086 | 1.089 | 1.19 | | |
| 86 | 1.089 | 1.096 | | | −0.60 |
| 87 | 1.096 | 1.103 | 1.19 | | |
| 88 | 1.103 | 1.106 | | −1.79 | |
| 89 | 1.106 | 1.117 | 1.19 | | |
| 90 | 1.117 | 1.126 | | | −0.60 |
| 91 | 1.126 | 1.131 | 1.19 | | |
| 92 | 1.131 | 1.136 | | −1.79 | |
| 93 | 1.136 | 1.144 | 1.19 | | |
| 94 | 1.144 | 1.146 | | −1.79 | |
| 95 | 1.146 | 1.157 | 1.19 | | |
| 96 | 1.157 | 1.166 | | | −0.60 |
| 97 | 1.166 | 1.170 | 1.19 | | |
| 98 | 1.170 | 1.176 | | −1.79 | |
| 99 | 1.176 | 1.183 | 1.19 | | |
| 100 | 1.183 | 1.185 | | −1.79 | |
| 101 | 1.185 | 1.195 | 1.19 | | |
| 102 | 1.195 | 1.200 | 1.19 | | |

TABLE 50

Second Region (R2)

| Number | hmin | hmax | ΔOPD$_{12}$/λ1 | ΔOPD$_{22}$/λ1 | ΔOPD$_{32}$/λ1 | ΔOPD$_{42}$/λ1 |
|---|---|---|---|---|---|---|
| 103 | 1.200 | 1.203 | | | | −3.01 |
| 104 | 1.203 | 1.210 | 1.25 | | | |
| 105 | 1.210 | 1.217 | | | −3.97 | |
| 106 | 1.217 | 1.223 | 1.25 | | | |
| 107 | 1.223 | 1.217 | 1.25 | | | |
| 108 | 1.217 | 1.230 | 1.25 | | | |
| 109 | 1.230 | 1.234 | 1.25 | | | |
| 110 | 1.234 | 1.237 | | −5.22 | | |
| 111 | 1.237 | 1.243 | 1.25 | | | |
| 112 | 1.243 | 1.250 | 1.25 | | | |
| 113 | 1.250 | 1.257 | 1.25 | | | |
| 114 | 1.257 | 1.263 | 1.25 | | | |
| 115 | 1.263 | 1.268 | | | −3.97 | |
| 116 | 1.268 | 1.276 | 1.25 | | | |
| 117 | 1.276 | 1.282 | 1.25 | | | |
| 118 | 1.282 | 1.285 | 1.25 | | | |
| 119 | 1.285 | 1.289 | | −5.22 | | |
| 120 | 1.289 | 1.295 | 1.25 | | | |
| 121 | 1.295 | 1.301 | 1.25 | | | |
| 122 | 1.301 | 1.308 | | | −3.97 | |
| 123 | 1.308 | 1.314 | 1.25 | | | |
| 124 | 1.314 | 1.317 | 1.25 | | | |
| 125 | 1.317 | 1.320 | | −5.22 | | |
| 126 | 1.320 | 1.327 | 1.25 | | | |
| 127 | 1.327 | 1.333 | 1.25 | | | |
| 128 | 1.333 | 1.339 | | | −3.97 | |
| 129 | 1.339 | 1.345 | 1.25 | | | |
| 130 | 1.345 | 1.349 | 1.25 | | | |
| 131 | 1.349 | 1.351 | | −5.22 | | |
| 132 | 1.351 | 1.357 | 1.25 | | | |
| 133 | 1.357 | 1.364 | 1.25 | | | |
| 134 | 1.364 | 1.370 | | | −3.97 | |
| 135 | 1.370 | 1.376 | 1.25 | | | |
| 136 | 1.376 | 1.379 | 1.25 | | | |
| 137 | 1.379 | 1.382 | | −5.22 | | |
| 138 | 1.382 | 1.388 | 1.25 | | | |
| 139 | 1.388 | 1.394 | 1.25 | | | |
| 140 | 1.394 | 1.400 | | | −3.97 | |
| 141 | 1.400 | 1.405 | 1.25 | | | |
| 142 | 1.405 | 1.409 | 1.25 | | | |
| 143 | 1.409 | 1.417 | | −5.22 | | |
| 144 | 1.417 | 1.423 | 1.25 | | | |
| 145 | 1.423 | 1.429 | | | −3.97 | |
| 146 | 1.429 | 1.435 | 1.25 | | | |

TABLE 50-continued

Second Region (R2)

| Number | hmin | hmax | $\Delta OPD_{12}/\lambda 1$ | $\Delta OPD_{22}/\lambda 1$ | $\Delta OPD_{32}/\lambda 1$ | $\Delta OPD_{42}/\lambda 1$ |
|---|---|---|---|---|---|---|
| 147 | 1.435 | 1.438 | 1.25 | | | |
| 148 | 1.438 | 1.440 | | −5.22 | | |
| 149 | 1.440 | 1.446 | 1.25 | | | |
| 150 | 1.446 | 1.452 | 1.25 | | | |
| 151 | 1.452 | 1.458 | | | | −3.97 |
| 152 | 1.458 | 1.463 | 1.25 | | | |
| 153 | 1.463 | 1.466 | 1.25 | | | |
| 154 | 1.466 | 1.469 | | −5.22 | | |
| 155 | 1.469 | 1.475 | 1.25 | | | |
| 156 | 1.475 | 1.480 | 1.25 | | | |
| 157 | 1.480 | 1.486 | | | | −3.97 |
| 158 | 1.486 | 1.491 | 1.25 | | | |
| 159 | 1.491 | 1.495 | 1.25 | | | |

TABLE 51

Third Region (R3)

| Number | hmin | hmax | $\Delta OPD_{13}/\lambda 1$ | $\Delta OPD_{23}/\lambda 1$ |
|---|---|---|---|---|
| 160 | 1.495 | 1.498 | | −3.13 |
| 161 | 1.498 | 1.504 | −1.00 | |
| 162 | 1.504 | 1.509 | −1.00 | |
| 163 | 1.509 | 1.515 | −1.00 | |
| 164 | 1.515 | 1.520 | −1.00 | |
| 165 | 1.520 | 1.526 | −1.00 | |
| 166 | 1.526 | 1.531 | −1.00 | |
| 167 | 1.531 | 1.536 | −1.00 | |
| 168 | 1.536 | 1.542 | −1.00 | |
| 169 | 1.542 | 1.547 | −1.00 | |
| 170 | 1.547 | 1.552 | −1.00 | |
| 171 | 1.552 | 1.558 | −1.00 | |
| 172 | 1.558 | 1.563 | −1.00 | |
| 173 | 1.563 | 1.568 | −1.00 | |
| 174 | 1.568 | 1.573 | −1.00 | |
| 175 | 1.573 | 1.578 | −1.00 | |
| 176 | 1.578 | 1.584 | −1.00 | |
| 177 | 1.584 | 1.589 | −1.00 | |
| 178 | 1.589 | 1.594 | −1.00 | |
| 179 | 1.594 | 1.599 | −1.00 | |
| 180 | 1.599 | 1.604 | −1.00 | |
| 181 | 1.604 | 1.609 | −1.00 | |
| 182 | 1.609 | 1.614 | −1.00 | |
| 183 | 1.614 | 1.619 | −1.00 | |
| 184 | 1.619 | 1.624 | −1.00 | |
| 185 | 1.624 | 1.629 | −1.00 | |
| 186 | 1.629 | 1.633 | −1.00 | |
| 187 | 1.633 | 1.638 | −1.00 | |
| 188 | 1.638 | 1.643 | −1.00 | |
| 189 | 1.643 | 1.648 | −1.00 | |
| 190 | 1.648 | 1.653 | −1.00 | |
| 191 | 1.653 | 1.657 | −1.00 | |
| 192 | 1.657 | 1.662 | −1.00 | |
| 193 | 1.662 | 1.667 | −1.00 | |
| 194 | 1.667 | 1.672 | −1.00 | |
| 195 | 1.672 | 1.676 | −1.00 | |
| 196 | 1.676 | 1.681 | −1.00 | |
| 197 | 1.681 | 1.686 | −1.00 | |
| 198 | 1.686 | 1.690 | −1.00 | |
| 199 | 1.690 | 1.695 | −1.00 | |
| 200 | 1.695 | 1.699 | −1.00 | |
| 201 | 1.699 | 1.704 | −1.00 | |
| 202 | 1.704 | 1.708 | −1.00 | |
| 203 | 1.708 | 1.713 | −1.00 | |
| 204 | 1.713 | 1.717 | −1.00 | |
| 205 | 1.717 | 1.722 | −1.00 | |
| 206 | 1.722 | 1.726 | −1.00 | |
| 207 | 1.726 | 1.731 | −1.00 | |
| 208 | 1.731 | 1.735 | −1.00 | |
| 209 | 1.735 | 1.740 | −1.00 | |
| 210 | 1.740 | 1.744 | −1.00 | |
| 211 | 1.744 | 1.748 | −1.00 | |
| 212 | 1.748 | 1.753 | −1.00 | |
| 213 | 1.753 | 1.757 | −1.00 | |
| 214 | 1.757 | 1.761 | −1.00 | |
| 215 | 1.761 | 1.766 | −1.00 | |
| 216 | 1.766 | 1.770 | −1.00 | |
| 217 | 1.770 | 1.774 | −1.00 | |
| 218 | 1.774 | 1.778 | −1.00 | |
| 219 | 1.778 | 1.783 | −1.00 | |
| 220 | 1.783 | 1.787 | −1.00 | |
| 221 | 1.787 | 1.791 | −1.00 | |
| 222 | 1.791 | 1.795 | −1.00 | |
| 223 | 1.795 | 1.799 | −1.00 | |
| 224 | 1.799 | 1.803 | −1.00 | |
| 225 | 1.803 | 1.807 | −1.00 | |
| 226 | 1.807 | 1.812 | −1.00 | |
| 227 | 1.812 | 1.816 | −1.00 | |
| 228 | 1.816 | 1.820 | −1.00 | |
| 229 | 1.820 | 1.824 | −1.00 | |
| 230 | 1.824 | 1.828 | −1.00 | |
| 231 | 1.828 | 1.832 | −1.00 | |
| 232 | 1.832 | 1.836 | −1.00 | |
| 233 | 1.836 | 1.840 | −1.00 | |
| 234 | 1.840 | 1.843 | −1.00 | |
| 235 | 1.843 | 1.847 | −1.00 | |
| 236 | 1.847 | 1.851 | −1.00 | |
| 237 | 1.851 | 1.855 | −1.00 | |
| 238 | 1.855 | 1.859 | −1.00 | |
| 239 | 1.859 | 1.863 | −1.00 | |
| 240 | 1.863 | 1.867 | −1.00 | |
| 241 | 1.867 | 1.870 | −1.00 | |

Hereafter, the first to sixth examples are compared with a comparative example to evaluate the optical performance regarding the information recording or information reproducing performed by the optical information recording/reproducing apparatus according to each of the first to sixth examples. The objective lens according to the comparative example has the substantially the same numerical configuration as that of the objective lens 10 according to the first example, excepting the blazed wavelength defined for the first optical path difference function in the region R1.

The following Table 52 shows the values of the condition (1) to (25) of the first to sixth examples and the comparative example, the radius of the beam spot formed on each of the optical discs D1 to D3 by the first to sixth examples and the comparative example, and the light use efficiencies in the first to sixth examples and the comparative example.

TABLE 52

| Condition | $1^{st}$ Example | $2^{nd}$ Example | $3^{rd}$ Example | $4^{th}$ Example | $5^{th}$ Example | $6^{th}$ Example | Comparative Example |
|---|---|---|---|---|---|---|---|
| 1 | 0.23 | 0.38 | 0.06 | 0.33 | 0.23 | 0.16 | 0.48 |
| 2 | −0.12 | −0.27 | 0.17 | −0.10 | −0.12 | 0.05 | −0.48 |
| 3 | 0.00 | 0.19 | 0.00 | −0.11 | 0.00 | 0.00 | 0.00 |
| 4 | 0.23 | 0.38 | 0.06 | 0.33 | 0.23 | 0.16 | 0.48 |
| 5 | 0.00 | 0.19 | 0.00 | −0.11 | 0.00 | 0.00 | 0.00 |
| 6 | −0.12 | −0.27 | 0.17 | −0.10 | −0.12 | 0.05 | −0.48 |

TABLE 52-continued

| Condition | | $1^{st}$ Example | $2^{nd}$ Example | $3^{rd}$ Example | $4^{th}$ Example | $5^{th}$ Example | $6^{th}$ Example | Comparative Example |
|---|---|---|---|---|---|---|---|---|
| | 7 | 0.00 | 0.00 | −0.06 | 0.00 | 0.00 | −0.09 | 0.00 |
| | 8 | −0.17 | −0.17 | −0.17 | 0.06 | −0.12 | 0.19 | −0.17 |
| | 9 | — | — | — | — | — | — | — |
| | 10 | — | — | — | 0.01 | −0.02 | 0.04 | — |
| | 11 | −0.02 | −0.02 | −0.02 | — | — | — | −0.02 |
| | 12 | 1.26 | 1.41 | 1.07 | 1.37 | 1.28 | 1.19 | 1.53 |
| | 13 | −0.14 | −0.29 | 0.19 | −0.11 | −0.14 | 0.06 | −0.53 |
| | 14 | 1.00 | 1.21 | 1.00 | 0.87 | 1.00 | 1.00 | 1.00 |
| | 15 | 1.26 | 1.41 | 1.07 | 1.37 | 1.28 | 1.19 | 1.53 |
| | 16 | 1.00 | 1.21 | 1.00 | 0.87 | 1.00 | 1.00 | 1.00 |
| | 17 | −0.14 | −0.29 | 0.19 | −0.11 | −0.14 | 0.06 | −0.53 |
| | 18 | 2.00 | 2.00 | 1.86 | 2.00 | 2.00 | 1.79 | 2.00 |
| | 19 | 1.00 | 1.21 | 1.00 | 0.87 | 1.00 | 1.00 | 1.00 |
| | 20 | 6.81 | 6.81 | 6.81 | 5.07 | 4.85 | 5.22 | 6.81 |
| | 21 | — | — | — | — | — | — | — |
| | 22 | — | — | 5.07 | 4.85 | 5.22 | — | — |
| | 23 | 6.81 | 6.81 | 6.81 | — | — | — | 6.81 |
| | 24 | 55.71 | 55.71 | 55.71 | 55.71 | 35.45 | 35.45 | 55.71 |
| | 25 | 0.49 | 0.49 | 0.49 | 0.49 | 0.48 | 0.48 | 0.49 |
| BD | Spot Radius(μm) Ideal Value: 0.392 | 0.386 | 0.380 | 0.390 | 0.380 | 0.385 | 0.385 | 0.368 |
| | Light Use Efficiency (%) | 86.5 | 74.0 | 91.0 | 79.9 | 87.8 | 83.1 | 62.6 |
| DVD | Spot Radius(μm) Ideal Value: 0.907 | 0.909 | 0.916 | 0.888 | 0.915 | 0.913 | 0.897 | 0.930 |
| | Light Use Efficiency (%) | 71.0 | 77.1 | 67.8 | 79.6 | 68.1 | 73.6 | 69.4 |

Figure 15A:
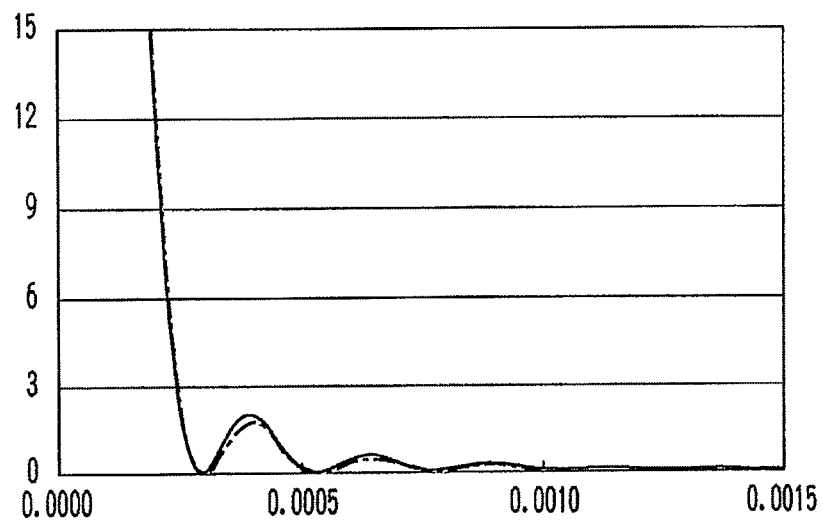
FIGS. 15A and 15B are graphs for making a comparison between an ideal beam spot and a beam spot formed in a first example.
Figure 15B:
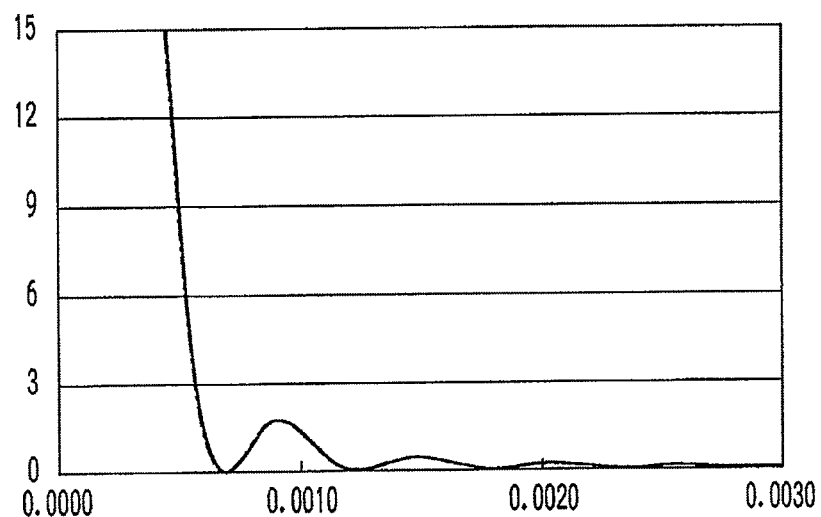
Figure 16A:
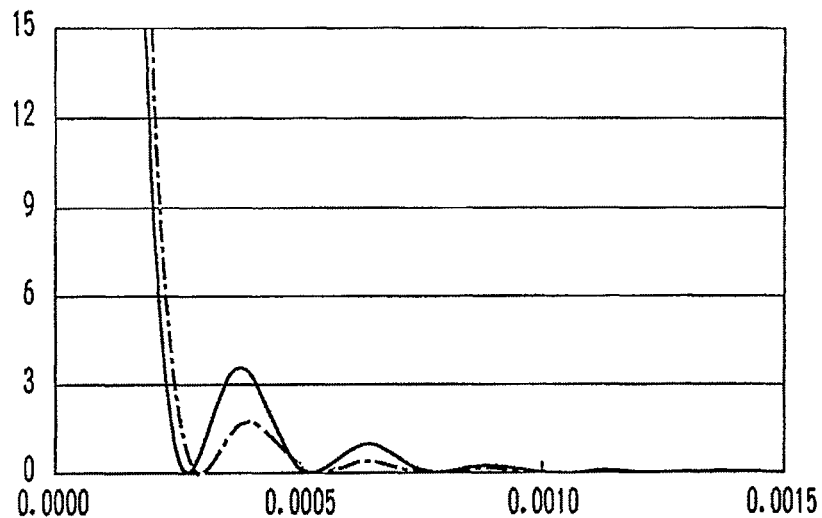
FIGS. 16A and 16B are graphs for making a comparison between the ideal beam spot and a beam spot formed in a comparative example.
Figure 16B:
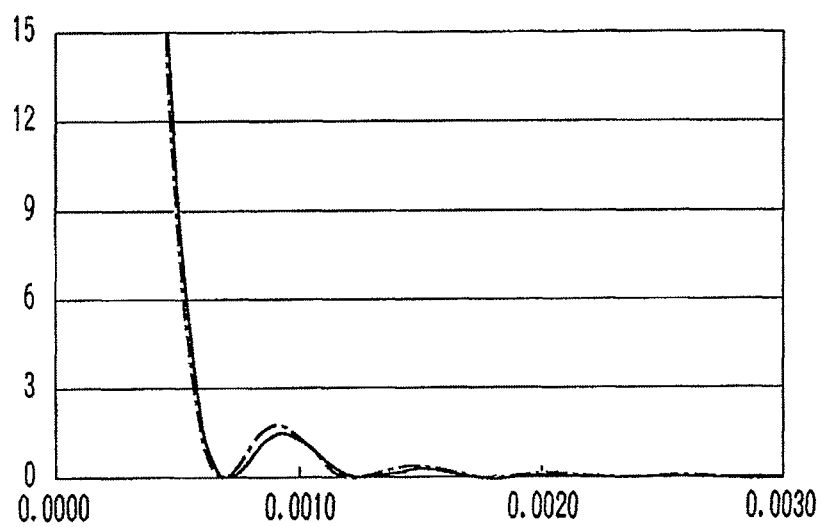
Figure 17A:
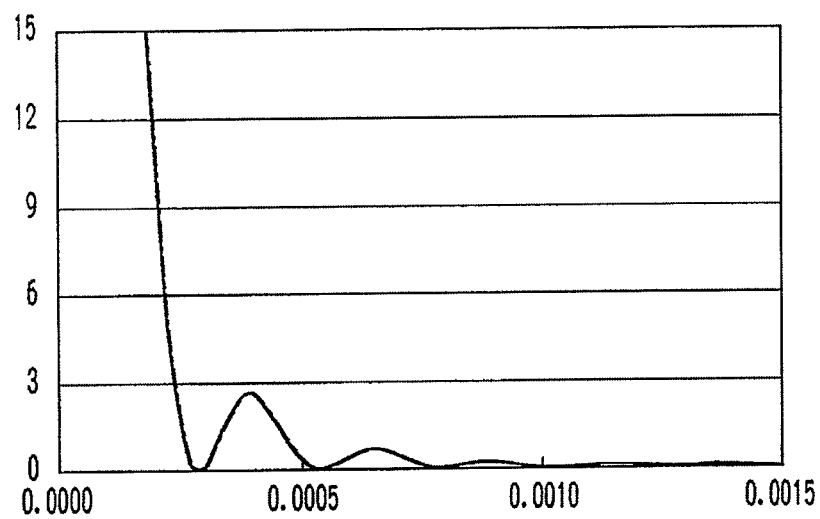
FIGS. 17A and 17B are graphs illustrating the intensity distribution of a beam spot formed in a second example.
Figure 17B:
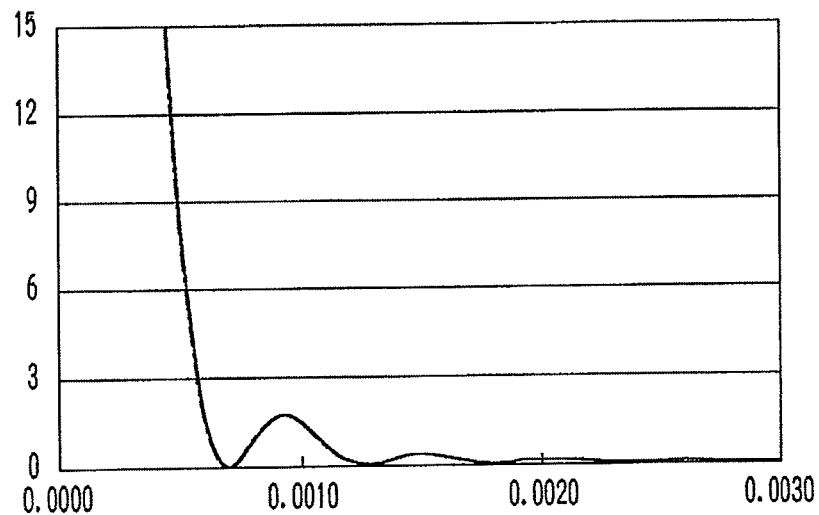
Figure 18A:
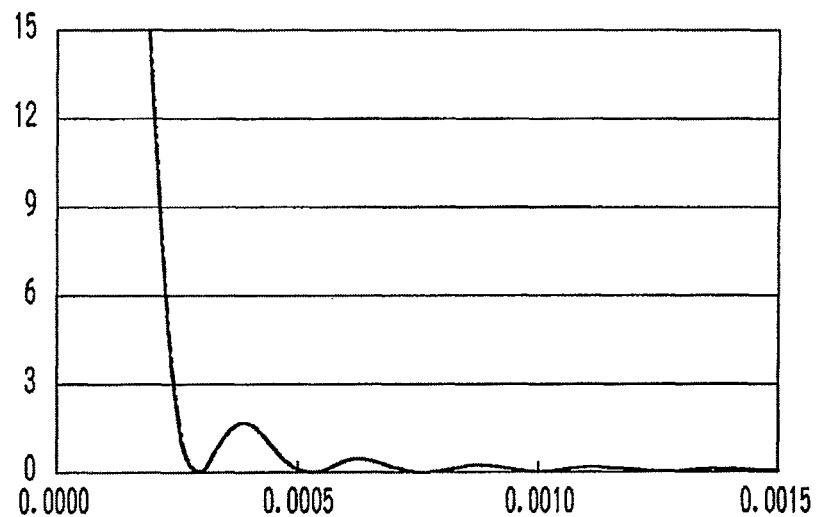
FIGS. 18A and 18B are graphs illustrating the intensity distribution of a beam spot formed in the third example.
Figure 18B:
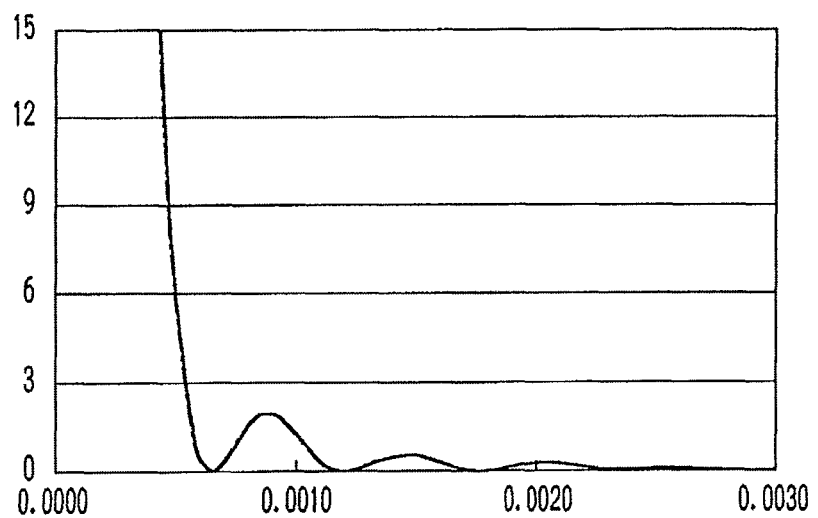
Figure 19A:
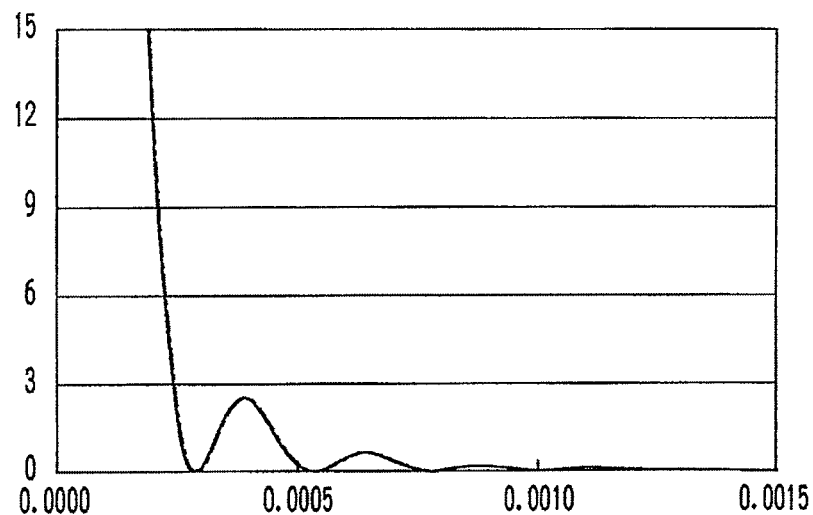
FIGS. 19A and 19B are graphs illustrating the intensity distribution of a beam spot formed in the fourth example.
Figure 19B:
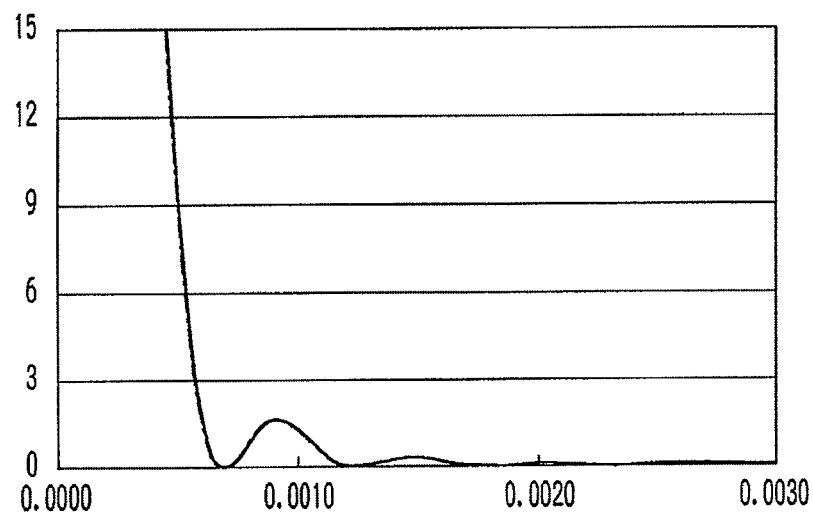
Figure 20A:
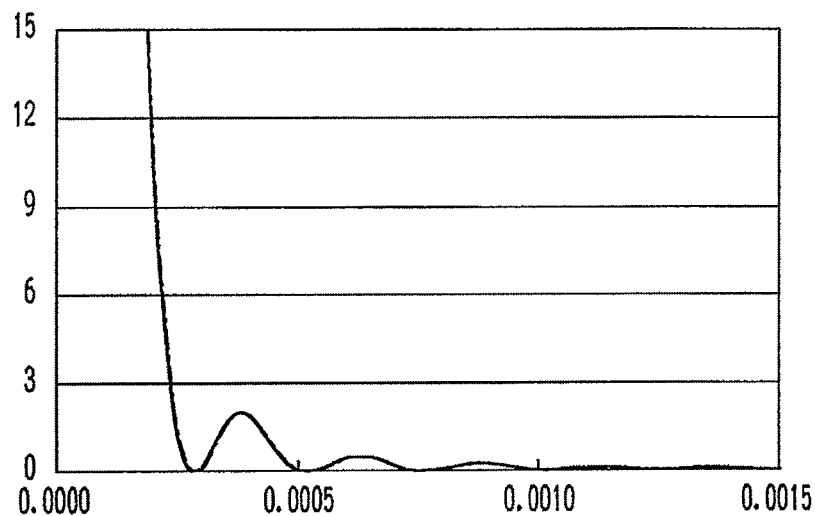
FIGS. 20A and 20B are graphs illustrating the intensity distribution of a beam spot formed in the fifth example.
Figure 20B:
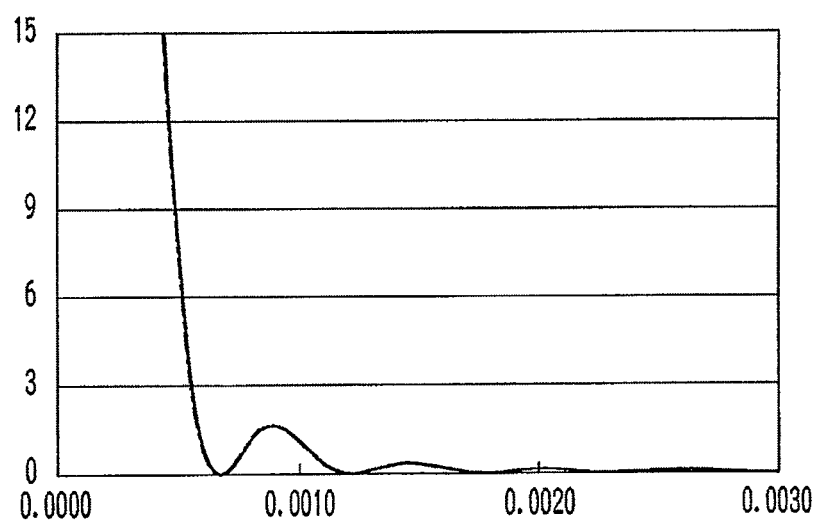
Figure 21A:
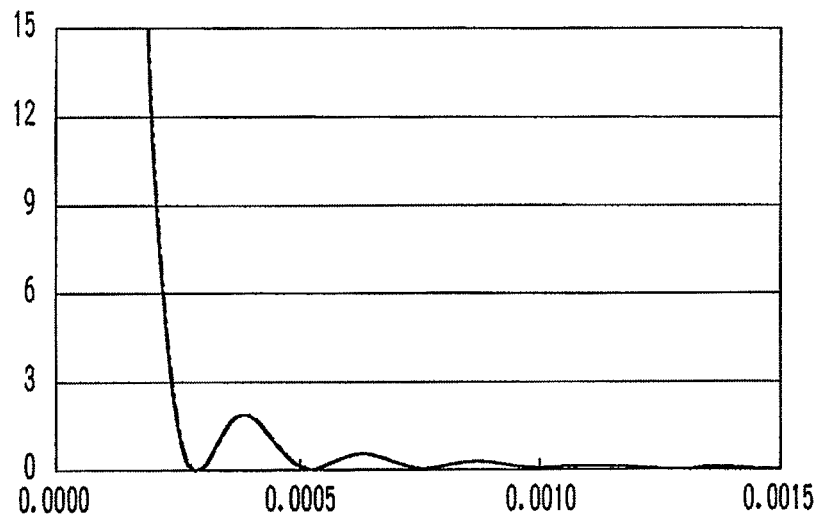
FIGS. 21A and 21B are graphs illustrating the intensity distribution of a beam spot formed in a sixth example.
Figure 21B:
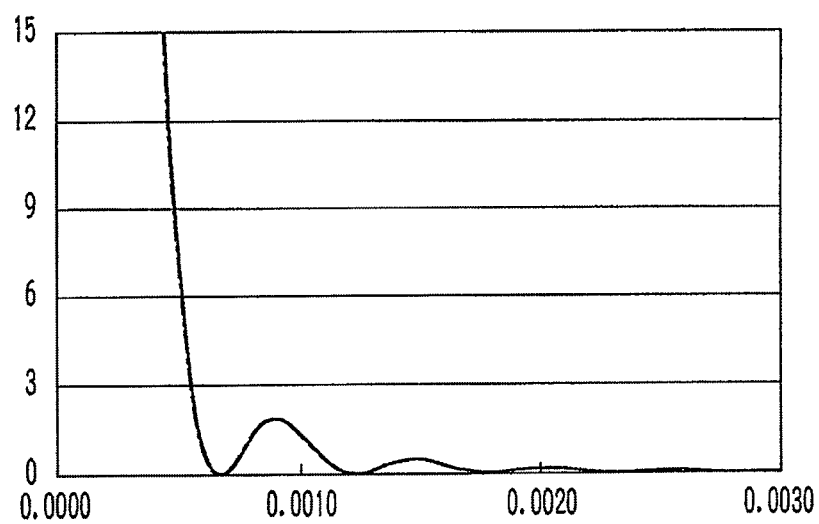

FIGS. 15A and 15B are graphs for making a comparison between the ideal beam spot and the beam spot formed in the first example. FIGS. 16A and 16B are graphs for making a comparison between the ideal beam spot and the beam spot formed in the comparative example. In each of FIGS. 15A, 15B, 16A and 16B, a curve indicated by a solid line represents the intensity distribution within the spot radius of the beam spot formed in the first example and the comparative example, and a curve indicated by a chain line represents the intensity distribution within the spot radius of the ideal beam spot. FIGS. 17A and 17B are graphs illustrating the intensity distribution within the spot radius of the beam spot formed in the second example, FIGS. 18A and 18B are graphs illustrating the intensity distribution within the spot radius of the beam spot formed in the third example, FIGS. 19A and 19B are graphs illustrating the intensity distribution within the spot radius of the beam spot formed in the fourth example, FIGS. 20A and 20B are graphs illustrating the intensity distribution within the spot radius of the beam spot formed in the fifth example, FIGS. 21A and 21B are graphs illustrating the intensity distribution within the spot radius of the beam spot formed in the sixth example. In each of FIGS. 15A to 21B, the vertical axis represents the intensity, and the horizontal axis represents the distance (unit: mm) from the spot center. Each of FIGS. 15A, 16A, 17A, 18A, 19A, 20A and 21A represents the intensity distribution within the spot radius of the beam spot formed on the recording surface of the optical disc D1, and each of FIGS. 15B, 16B, 17B, 18B, 19B, 20B and 21B represents the intensity distribution within the spot radius of the beam spot formed on the recording surface of the optical disc D2. It should be noted that actually each beam spot has the intensity distribution obtained by rotating each graph about the axis at the distance 0 (spot center).

As shown in Table 52, regarding the first to sixth examples, the conditions (1) to (3) or the conditions (12) to (14) are satisfied. Therefore, the adequate diffraction efficiency can be achieved for the information recording or the information reproducing for each optical disc, and a beam spot having the size close to the ideal spot size can be formed on the recording surface of each optical disc. Furthermore, as shown in FIGS. 15A and 15B (or FIGS. 17A to 21B), the beam spot formed on each of the optical discs D1 and D2 is not reduced excessively with respect to the ideal beam spot, and the side lobe is suppressed sufficiently.

By contrast, in the comparative example, the conditions (1) and (2) or the conditions (12) and (13) are not satisfied. Therefore, it becomes impossible to secure the adequate diffraction efficiency for the laser beam having the wavelength M, and deterioration of the spot property of the beam spot formed on the recording surface of the optical disc D1 is large. Furthermore, as shown in FIGS. 16A and 16B, the beam spot formed on the recording surface of each of the optical discs D1 and D2 is reduced excessively with respect to the ideal spot size, and the side lobe is increased. In particular, deterioration of the spot property caused by the super-resolution is large when the optical disc D1 is used.

FIGS. 22A to 22C are graphs illustrating the spherical aberration caused in the first or the second example. Specifically, FIG. 22A represents the spherical aberration caused on the recording surface of the optical disc D1 of NA1 (=0.85), FIG. 22B represents the spherical aberration caused on the recording surface of the optical disc D2 of NA2 (=0.60), and FIG. 22C represents the spherical aberration caused on the recording surface of the optical disc D3 of NA3 (=0.47).

FIGS. 23A to 23C are graphs illustrating the spherical aberration caused in the third example. Specifically, FIG. 23A represents the spherical aberration caused on the recording surface of the optical disc D1 of NA1 (=0.85), FIG. 23B represents the spherical aberration caused on the recording surface of the optical disc D2 of NA2 (=0.60), and FIG. 23C represents the spherical aberration caused on the recording surface of the optical disc D3 of NA3 (=0.47).

FIGS. 24A to 24C are graphs illustrating the spherical aberration caused in the fourth example. Specifically, FIG.

24A represents the spherical aberration caused on the recording surface of the optical disc D1 of NA1 (=0.85), FIG. 24B represents the spherical aberration caused on the recording surface of the optical disc D2 of NA2 (=0.60), and FIG. 24C represents the spherical aberration caused on the recording surface of the optical disc D3 of NA3 (=0.47).

Figures 25A, 25B, 25C:
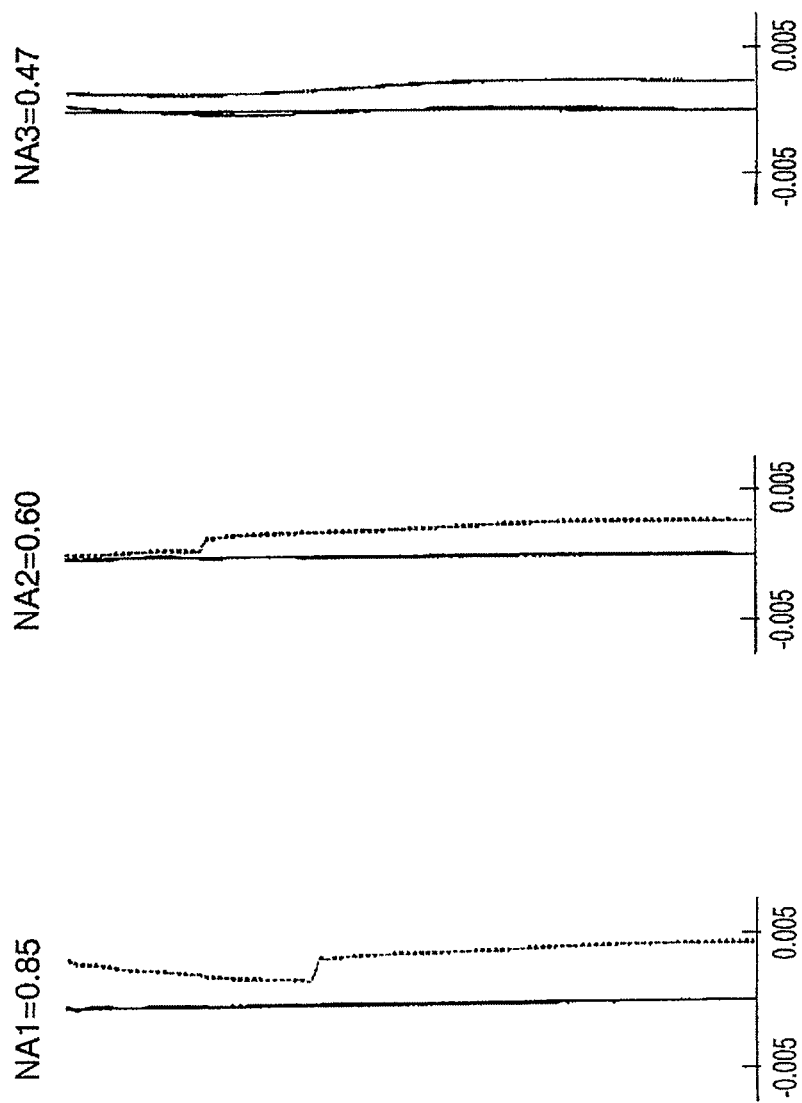
FIGS. 25A to 25C are graphs illustrating the spherical aberration caused in the fifth or sixth example.

FIGS. 25A to 25C are graphs illustrating the spherical aberration caused in the fifth or sixth example. Specifically, FIG. 25A represents the spherical aberration caused on the recording surface of the optical disc D1 of NA1 (=0.85), FIG. 25B represents the spherical aberration caused on the recording surface of the optical disc D2 of NA2 (~0.60), and FIG. 25C represents the spherical aberration caused on the recording surface of the optical disc D3 of NA3 (~0.47).

In each of FIGS. 22A to 25B, the vertical axis represents the pupil coordinate, and the horizontal axis represents the amount of spherical aberration (unit: mm). In each of FIGS. 22A to 25B, a curve indicated by a solid line represents the spherical aberration at the design wavelength, and a curve indicated by a dotted line represents the spherical aberration caused when the wavelength shifts by +5 nm from the design wavelength. Regarding each graph of the spherical aberration, the blazed wavelength is not considered. Therefore, regarding the first and second examples (or the fifth and sixth examples) where the numerical data other than the blazed wavelength are the same, the graph common to the spherical aberrations of the first and second examples (or the fifth and sixth examples) is shown.

As shown in FIGS. 22A to 25C and Table 52, each of the first to sixth examples is able to achieve the adequate diffraction efficiency for the information recording or information reproducing for each of the optical discs D1 to D3 and the suitable spot property, while suitably correcting the spherical aberration for each of the optical discs D1 to D3. It should be noted that, as shown in Table 52, each of the first to sixth examples also satisfies the conditions other than the conditions (1) to (3) or the conditions (12) to (14). Therefore, each of the first to sixth examples is able to provide further advantages by satisfying the conditions other than the conditions (1) to (3) or the conditions (12) to (14).

Although the present invention has been described in considerable detail with reference to certain preferred embodiments thereof, other embodiments are possible.

This application claims priority of Japanese Patent Application No. P2010-064974, filed on Mar. 19, 2010. The entire subject matter of the applications is incorporated herein by reference.

What is claimed is:

1. An objective optical system for an optical information recording/reproducing apparatus for recording information to and/or reproducing information from three types of optical discs including first, second and third optical discs differing in recording density by selectively using three types of light beams including first, second and third light beams respectively having first, second and third wavelengths, when $\lambda 1$ represents the first wavelength, $\lambda 2$ represents the second wavelength and $\lambda 3$ represents the third wavelength, the first, second and third wavelengths satisfying a condition:

$$\lambda 1 < \lambda 2 < \lambda 3,$$

when t1 represents a protective layer thickness of the first optical disc for which information recording or information reproducing is performed by using the first light beam, t2 represents a protective layer thickness of the second optical disc for which information recording or information reproducing is performed by using the second light beam, and t3 represents a protective layer thickness of the third optical disc for which information recording or information reproducing is performed by using the third light beam, t1, t2 and t3 satisfying conditions:

$$t1 < t2 < t3; \text{ and}$$

$$t3 - t1 \geq 1.0$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

$$NA1 > NA2 > NA3,$$

the objective optical system comprising an objective lens, wherein:

at least one of optical surfaces of the objective optical system comprises a diffraction surface having a diffraction structure defined by an optical path difference function:

$$\phi ik(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where h represents a height from an optical axis, $P_{ik2}$, $P_{ik4}$, $P_{ik6}$ . . . (i, k: natural numbers) represent optical path difference coefficients of $2^{nd}$ order, $4^{th}$ order, $6^{th}$ order, . . . of an i-th optical path difference function in a k-th region, $m_{ik}$ represents a diffraction order at which diffraction efficiency is maximized for an incident light beam in regard to the i-th optical path difference function of the k-th region, and $\lambda$ represents a use wavelength of the incident light beam;

the diffraction surface includes a first region contributing to converging the first, second and third light beams onto recording surfaces of the first, second and third optical discs, respectively;

the first region includes a diffraction structure defined by a first optical path difference function defined such that diffraction orders at which diffraction efficiencies are maximized respectively for the first, second and third light beams are 1st-orders;

when $\lambda B_{ik}$ represents a blazed wavelength of the i-th optical path difference function in the k-th region, the diffraction structure in the first region satisfies a condition:

$$0.03 < (\lambda B_{11} - \lambda 1)/\lambda 1 < 0.40$$

the diffraction surface includes a second region located outside the first region, the second region contributing to converging the first and second light beams onto the recording surfaces of the first and second optical discs, respectively, and not contributing to converging of the third light beam;

the second region comprises a diffraction structure defined by a first optical path difference function defined such that diffraction orders at which diffraction efficiencies are maximized respectively for the first and second light beams are 1st-orders;

the diffraction structure in the second region satisfies a condition:

$$-0.35 < (\lambda B_{12} - \lambda 11)/\lambda 1 < 0.35$$

the diffraction surface includes a third region located outside the second region, the third region contributing to converging the first light beam onto the recording surface of the first optical disc and not contributing to converging each of the second and third light beams, the third region comprises a diffraction structure defined by a first optical path difference function, the diffraction structure in the third region satisfies a condition:

$$-0.23 < m_{13} \times ((\lambda B_{13} - \lambda 1)/\lambda 1) < 0.23.$$

2. The objective optical system according to claim 1, wherein the first region of the diffraction surface satisfies a condition:

$$0.14 < (\lambda B_{11} - \lambda 1)/\lambda 1 < 0.37.$$

3. The objective optical system according to claim 1, wherein the third region of the diffraction surface satisfies a condition:

$$-0.14 < m_{13} \times (\lambda B_{13} - \lambda 1)/\lambda 1 < 0.14.$$

4. The objective optical system according to claim 1, wherein the second region of the diffraction surface satisfies a condition:

$$-0.17 < (\lambda B_{12} - \lambda B_{11})/\lambda 1 < 0.17.$$

5. The objective optical system according to claim 1, wherein:

the first region of the diffraction surface further comprises a diffraction structure defined by a second optical path difference function defined such that diffraction orders at which diffraction efficiencies are maximized for the first, second and third light beams are $2^{nd}$ order, $1^{st}$ order and $1^{st}$ order, respectively; and the diffraction surface satisfies a condition:

$$-0.12 < (\lambda B_{21} - \lambda 1)/\lambda 1 < 0.12.$$

6. The objective optical system according to claim 1, wherein:

the second region of the diffraction surface further comprises a diffraction structure defined by a second optical path difference function defined such that a diffraction order at which a diffraction efficiency is maximized for the first light beam is an odd order; and the diffraction surface satisfies a condition:

$$-0.28 < m_{22} \times ((\lambda B_{22} - \lambda 1)/\lambda 1) < 0.28.$$

7. The objective optical system according to claim 1, further comprising an optical element provided separately from the objective lens, wherein at least one of surfaces of the optical element has the diffraction surface.

8. The objective optical system according to claim 1, wherein at least one of surfaces of the objective lens has the diffraction surface.

9. The objective optical system according to claim 1, wherein the objective optical system satisfies a condition:

$$35 \leq vd \leq 80$$

where vd represents Abbe number of the objective lens at d-line.

10. An optical information recording/reproducing apparatus for recording information to and/or reproducing information from three types of optical discs including first, second and third optical discs differing in recording density by selectively using three types of light beams including first, second and third light beams respectively having first, second and third wavelengths, when $\lambda 1$ represents the first wavelength, $\lambda 2$ represents the second wavelength and $\lambda 3$ represents the third wavelength, the first, second and third wavelengths satisfying a condition:

$$\lambda 1 < \lambda 2 < \lambda 3,$$

when t1 represents a protective layer thickness of the first optical disc for which information recording or information reproducing is performed by using the first light beam, t2 represents a protective layer thickness of the second optical disc for which information recording or information reproducing is performed by using the second light beam, and t3 represents a protective layer thickness of the third optical disc for which information recording or information reproducing is performed by using the third light beam, t1, t2 and t3 satisfying conditions, where $\lambda 1$, $\lambda 2$, $\lambda 3$, t1, t2 and t3 are measured in common units of a common measurement system:

$$t1 \approx 0.1;$$

$$t2 \approx 0.6; \text{ and}$$

$$t3 \approx 1.2,$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

$$NA1 > NA2 > NA3,$$

the optical information recording/reproducing apparatus comprising:

light sources respectively emitting the first second and third light beams;

at least one coupling lens converting a degree of divergence or convergence of each of the first, second and third light beams;

an objective optical system having an objective lens, wherein:

at least one of optical surfaces of the objective optical system comprises a diffraction surface having a diffraction structure defined by an optical path difference function:

$$\phi ik(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where h represents a height from an optical axis, $P_{ik2}$, $P_{ik4}$, $P_{ik6}$ ... (i, k: natural numbers) represent optical path difference coefficients of $2^{nd}$ order, $4^{th}$ order, $6^{th}$ order, ... of an i-th optical path difference function in a k-th region, $m_{ik}$ represents a diffraction order at which diffraction efficiency is maximized for an incident light beam in regard to the i-th optical path difference function of the k-th region, and $\lambda$ represents a use wavelength of the incident light beam;

the diffraction surface includes a first region contributing to converging the first, second and third light beams onto recording surfaces of the first, second and third optical discs, respectively;

the first region includes a diffraction structure defined by a first optical path difference function defined such that diffraction orders at which diffraction efficiencies are maximized respectively for the first, second and third light beams are 1st-orders;

when $\lambda B_{ik}$ represents a blazed wavelength of the i-th optical path difference function in the k-th region, the diffraction structure in the first region satisfies a condition:

$$0.03<(\lambda B_{11}-\lambda 1)/\lambda 1<0.40$$

the diffraction surface includes a second region located outside the first region, the second region contributing to converging the first and second light beams onto the recording surfaces of the first and second optical discs, respectively, and not contributing to converging of the third light beam;

the second region comprises a diffraction structure defined by a first optical path difference function defined such that diffraction orders at which diffraction efficiencies are maximized respectively for the first and second light beams are 1st-orders;

the diffraction structure in the second region satisfies a condition:

$$-0.35<(\lambda B_{12}-\lambda B_{11})/\lambda 1<0.35$$

the diffraction surface includes a third region located outside the second region, the third region contributing to converging the first light beam onto the recording surface of the first optical disc and not contributing to converging each of the second and third light beams, the third region comprises a diffraction structure defined by a first optical path difference function, the diffraction structure in the third region satisfies a condition:

$$-0.23<m_{13}\times((\lambda B_{13}-\lambda 1)/\lambda 1)<0.23.$$

11. The optical information recording/reproducing apparatus according to claim 10, wherein, when n1 and n3 respectively represent refractive indexes of the objective lens with respect to the first and third wavelengths, the optical information recording/reproducing apparatus satisfies a condition:

$$0.4<(\lambda 1/(n3-1))/(\lambda 3/(n1-1))<0.6.$$

12. The optical information recording/reproducing apparatus according to claim 10, wherein the first region of the diffraction surface satisfies a condition:

$$0.14<(\lambda B_{11}-\lambda 1)/\lambda 1<0.37.$$

13. The optical information recording/reproducing apparatus according to claim 10, wherein the third region of the diffraction surface satisfies a condition:

$$-0.14<m_{13}\times((\lambda B_{13}-\lambda 1)/\lambda 1)<0.14.$$

14. The optical information recording/reproducing apparatus according to claim 10, wherein the second region of the diffraction surface satisfies a condition:

$$-0.17<(\lambda B_{12}-\lambda B_{11})/\lambda 1<0.17.$$

15. The optical information recording/reproducing apparatus according to claim 10, wherein:

the first region of the diffraction surface further comprises a diffraction structure defined by a second optical path difference function defined such that diffraction orders at which diffraction efficiencies are maximized for the first, second and third light beams are $2^{nd}$ order, $1^{st}$ order and $1^{st}$ order, respectively; and the diffraction surface satisfies a condition:

$$-0.12<(\lambda B_{21}-\lambda 1)/\lambda 1<0.12.$$

16. The optical information recording/reproducing apparatus according to claim 10, wherein:

the second region of the diffraction surface further comprises a diffraction structure defined by a second optical path difference function defined such that a diffraction order at which a diffraction efficiency is maximized for the first light beam is an odd order; and the diffraction surface satisfies a condition:

$$-0.28<m_{22}\times((\lambda B_{22}-\lambda 1)/\lambda 1)<0.28.$$

17. The optical information recording/reproducing apparatus according to claim 10, wherein:

the objective optical system comprises an optical element provided separately from the objective lens; and at least one of surfaces of the optical element has the diffraction surface.

18. The optical information recording/reproducing apparatus according to claim 10, wherein at least one of surfaces of the objective lens has the diffraction surface.

19. The optical information recording/reproducing apparatus according to claim 10, wherein the objective optical system satisfies a condition:

$$35 \leq vd \leq 80$$

where vd represents Abbe number of the objective lens at d-line.

* * * * *